United States Patent
Lee et al.

(10) Patent No.: US 11,466,213 B2
(45) Date of Patent: Oct. 11, 2022

(54) LIQUID-CRYSTALLINE MEDIUM

(71) Applicant: Merck Patent GmbH, Darmstadt (DE)

(72) Inventors: Jung-Min Lee, Seoul (KR); Hyun-Woo Bae, Seoul (KR); Dong-Mee Song, Hwaseong (KR); Yong-Kuk Yun, Hwaseong (KR)

(73) Assignee: Merck Patent GmbH, Darmstadt (DE)

( * ) Notice: Subject to any disclaimer, the term of this patent is extended or adjusted under 35 U.S.C. 154(b) by 46 days.

(21) Appl. No.: 16/343,147

(22) PCT Filed: Oct. 16, 2017

(86) PCT No.: PCT/EP2017/076314
§ 371 (c)(1),
(2) Date: Apr. 18, 2019

(87) PCT Pub. No.: WO2018/073160
PCT Pub. Date: Apr. 26, 2018

(65) Prior Publication Data
US 2019/0316037 A1    Oct. 17, 2019

(30) Foreign Application Priority Data
Oct. 19, 2016  (EP) ..................... 16194514

(51) Int. Cl.
*G02F 1/1333* (2006.01)
*C09K 19/34* (2006.01)
(Continued)

(52) U.S. Cl.
CPC ...... *C09K 19/3405* (2013.01); *C09K 19/3003* (2013.01); *C09K 19/601* (2013.01);
(Continued)

(58) Field of Classification Search
CPC ............ C09K 19/3405; C09K 19/3003; C09K 19/601; C09K 2019/3009;
(Continued)

(56) References Cited

U.S. PATENT DOCUMENTS 357,374 A     2/1887  Darling
4,514,045 A *  4/1985  Huffman ................. C09B 57/00
                                              252/299.1
(Continued)

FOREIGN PATENT DOCUMENTS

CN    104496767 A    4/2015
EP      0501268 B1    6/1996
(Continued)

OTHER PUBLICATIONS

International Search report PCT/EP2017/076314 dated Dec. 8, 2017 (pp. 1-3).
(Continued)

*Primary Examiner* — Geraldina Visconti
(74) *Attorney, Agent, or Firm* — Millen White Zelano & Branigan; Jennifer J. Branigan

(57) ABSTRACT

The invention relates to a liquid-crystalline medium having negative dielectric anisotropy comprising one or more compounds of formula I

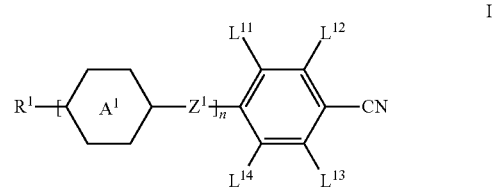

and
one or more compounds selected from the group of the compounds of the formulae IIA, IIB and IIC,

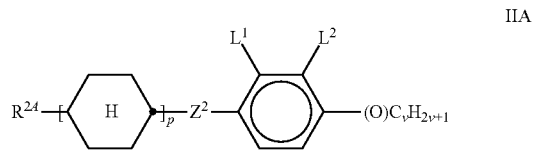

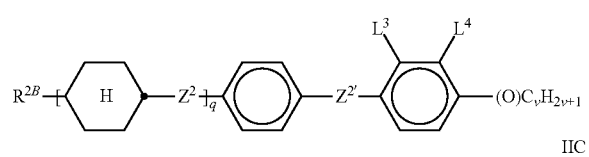

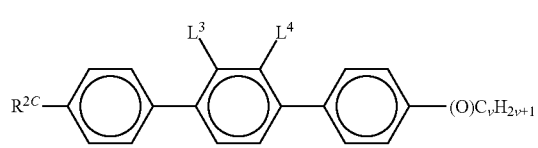

wherein the groups and parameters have the meanings indicated in claim 1, to a guest-host liquid crystal medium derived therefrom comprising one or more dichroic dyes and the use of said medium in devices such as light shutters, switchable windows, switchable mirrors and guest-host displays. The invention further relates to devices containing the liquid crystalline medium according to the invention.

18 Claims, No Drawings

(51) Int. Cl.
*C09K 19/30* (2006.01)
*C09K 19/60* (2006.01)
*G02F 1/137* (2006.01)

(52) U.S. Cl.
CPC ........ *G02F 1/137* (2013.01); *C09K 2019/301* (2013.01); *C09K 2019/3009* (2013.01); *C09K 2019/3016* (2013.01); *C09K 2019/3408* (2013.01); *G02F 1/13712* (2021.01); *G02F 1/13725* (2013.01)

(58) Field of Classification Search
CPC .... C09K 2019/3016; C09K 2019/3408; G02F 1/137; G02F 1/1333; G02F 1/13725; G02F 2001/13712
USPC ........................................................ 252/299.1
See application file for complete search history.

(56) References Cited

U.S. PATENT DOCUMENTS

| | | | |
|---|---|---|---|
| 5,328,637 | A | 7/1994 | Buchecker et al. |
| 6,692,657 | B1* | 2/2004 | Kato ................. C09K 19/0403 252/299.63 |
| 7,081,279 | B2 | 7/2006 | Kato et al. |
| 8,927,856 | B2 | 1/2015 | Debije et al. |
| 9,023,238 | B2 | 5/2015 | Junge |
| 9,650,573 | B2* | 5/2017 | Archetti ................. C09K 19/52 |
| 10,087,370 | B2 | 10/2018 | Tuffin et al. |
| 10,247,936 | B2 | 4/2019 | Powers et al. |
| 2015/0175886 | A1* | 6/2015 | Tuffin .................. C09K 19/588 349/139 |
| 2015/0315473 | A1 | 11/2015 | Junge et al. |
| 2016/0033807 | A1* | 2/2016 | Junge ..................... C09K 19/60 349/16 |
| 2017/0343840 | A1 | 11/2017 | Hosaka et al. |
| 2018/0244999 | A1 | 8/2018 | Chen et al. |

FOREIGN PATENT DOCUMENTS

| | | |
|---|---|---|
| EP | 0969071 B1 | 11/2003 |
| JP | 1066288 A | 3/1989 |
| JP | 2001100253 A | 4/2001 |
| JP | 2008248165 A | 10/2008 |
| JP | 2016505670 A | 2/2016 |
| TW | 201631131 A | 9/2016 |
| WO | 09141295 A1 | 11/2009 |
| WO | 10118422 A2 | 10/2010 |
| WO | 11144299 A1 | 11/2011 |
| WO | 13174481 A1 | 11/2013 |
| WO | 17041872 A1 | 3/2017 |

OTHER PUBLICATIONS

Office Action in corresponding JP Appln. 2019-520608 dated Nov. 11, 2021 (pp. 1-5—Eng).

* cited by examiner

LIQUID-CRYSTALLINE MEDIUM

The invention relates to a liquid-crystalline medium having negative dielectric anisotropy, a guest-host liquid crystal medium derived therefrom and the use of said medium in devices such as light shutters, switchable windows, switchable mirrors and guest-host displays.

Liquid crystals are used in particular as dielectrics in display devices, since the optical properties of such substances can be influenced by an applied voltage. Electro-optical devices based on liquid crystals are known to the person skilled in the art and can be based on various effects. Devices of this type are, for example, cells having dynamic scattering, DAP (deformation of aligned phases) cells, TN cells having a twisted nematic structure, STN ("supertwisted nematic") cells, SBE ("superbirefringence effect") cells, OMI ("optical mode interference") cells and guest-host cells.

The last-mentioned devices based on the guest-host effect were described for the first time by Heilmeier and Zanoni (G. H. Heilmeier et al., Appl. Phys. Lett., 1968, 13, 91f) and have since then found widespread use, principally in LC display elements. In a guest-host system, the LC medium comprises one or more dichroic dyes in addition to the liquid crystal. Owing to the directional dependence of the absorption by the dye molecules, the transparency of the liquid crystal to light can be modulated if the dyes change their alignment together with the liquid crystal, i.e. the maximum contrast between the clear and dark states of an LC cell depends on the alignment of the dichroic dyes. Dichroic dyes have the ability to align themselves with nematic liquid crystal molecules when mixed together. When an electric field is applied to such a guest-host mixture, the nematic liquid crystal host molecules reorient and align either with or perpendicular to the electric field in order to minimize the torque they experience from the electric field. The dichroic dye (guest) molecules may not be directly affected by the external electric field but can align themselves with the liquid crystal host molecules. It is their interaction with the liquid crystal molecules that forces them to reorient.

Especially initial bright state liquid crystal cells switching from bright to dark using negative delta-epsilon LC are desirable because of their transparent (bright) state when no voltage is applied, making this mode particularly useful for windows that are usually transparent and only dimmed on demand for a comparatively short period of time. This mode is therefore more energy efficient compared to a mode that consumes energy when a transparent state has to be actively switched on.

Using liquid crystalline media with negative dielectric anisotropy enables a liquid crystal cell where (i) in the absence of an electrical field across the substrates, the long axes of the liquid crystal and dye molecules line up relative to the substrates in a way which causes the dye molecules not to absorb most of the light that is directed through the guest-host liquid crystal mixture normal to the substrates, whether the light passing therethrough is polarized or not, whereby the liquid crystal cell remains in a relatively clear state in the absence of the electric field, and (ii) in the presence of the electric field across the substrates, the long axes of the liquid crystal and dye molecules line up relative to the substrates in a way which causes the dye molecules to absorb at least some light that is directed through the guest-host liquid crystal mixture normal to the substrates, so long as the last mentioned light is polarized along the long axes of the dye molecules, whereby the liquid crystal cell darkens in the presence of the electric field.

A guest-host vertical alignment LC display is described for example in JP 2001100253, and U.S. Pat. No. 357,374.

Besides use in LC displays, devices of this type are known as switching elements for regulating the passage of light or energy (light shutter), for example from WO 2009/141295 and WO 2010/118422; an example of an application are switchable windows that can be darkened on demand by means of an electrical field. Furthermore, switchable mirrors e.g. for rear view mirrors for automotive applications using guest-host liquid crystals are proposed in DE 3340670.

For a good dark state, a high concentration of dyes and low cell gap are preferred. However, many dyes have only limited solubility in liquid crystalline media known from the state of the art. At the same time, there is only a limited selection of dyes available having sufficient solubility in liquid crystalline media and at the same time an absorption spectrum suitable for achieving a high colour purity, ideally with small fluorescence in the VIS region of the electromagnetic spectrum because such an emission additionally has a negative influence in the colour purity. Poor colour purity is particularly undesired in window applications where, for architectonic reasons, the aesthetic impression is important and the purest colours possible are desired. For achieving an acceptable black colour, mixtures of dyes have to be employed in order to cover the whole range of the visible part of the electromagnetic spectrum. Especially upon gray scale switching it is undesired to have any colour cast at all.

It is an object of the present invention to provide improved liquid crystalline media in which dichroic dyes have a suitably high solubility, in particular in view of applications.

To solve the problem, the present invention provides new liquid crystalline media in which dichroic dyes are surprisingly well soluble.

The invention relates to liquid crystal media comprising one or more compounds of formula I,

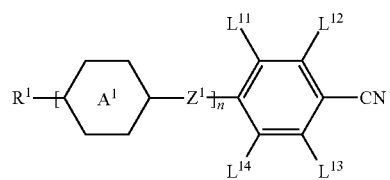

I wherein
$R^1$ denotes alkyl or alkenyl having up to 12 C atoms, wherein one or more non adjacent $CH_2$ groups may be replaced by —O— and/or a cycloalkyl ring having 3 to 5 C atoms, and wherein one or more H atoms may be replaced by F,
$A^1$ on each occurrence, identically or differently, denotes
(a) a trans-1,4-cyclohexylene radical, in which one or more non-adjacent $CH_2$ groups may be replaced by —O— and/or —S—,
(b) a 1,4-phenylene radical, in which one or two CH groups may be replaced by N,
(c) trans-1,4-cyclohexenylene,
(d) a radical from the group consisting of 1,4-bicyclo [2.2.2]octylene, naphthalene-2,6-diyl, decahydronaphthalene-2,6-diyl and 1,2,3,4-tetra-hydronaphthalene-2,6-diyl,
where the radicals (a) to (d) may be substituted by one or two fluorine atoms, $Z^1$ on each occurrence, independently of one another, —CO—O—, —O—CO—, —CH$_2$O—, —OCH$_2$—, —CH$_2$CH$_2$—, —CH=CH—, —C≡C—, —(CH$_2$)$_4$—, —OCF$_2$—, —CF$_2$O—, —CF$_2$CF$_2$—, or a single bond, $L^{11}$, $L^{12}$, $L^{13}$ and $L^{14}$ each, independently of one another, denote H, Cl, or F, n is 1, 2 or 3;

and one or more compounds selected from the group of the compounds of the formulae IIA, IIB and IIC,

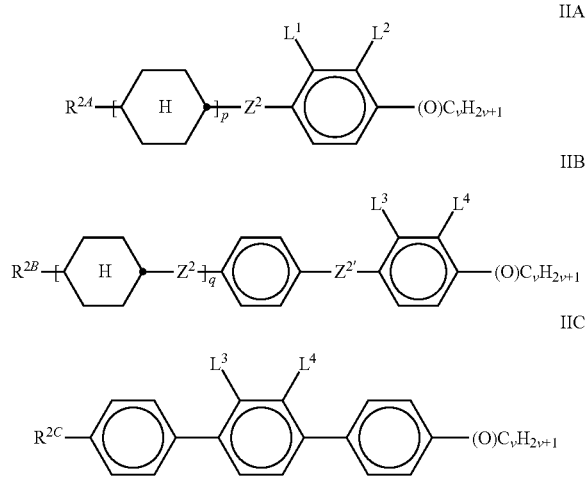

in which $R^{2A}$, $R^{2B}$ and $R^{2C}$ each, independently of one another, denote H, an alkyl or alkenyl radical having up to 15 C atoms which is un-substituted, monosubstituted by CN or CF$_3$ or at least monosubstituted by halogen, where, in addition, one or more CH$_2$ groups in these radicals may be replaced by —O—, —S—, —C≡C—, —CF$_2$O—, —OCF$_2$—, —OC—O— or —O—CO— in such a way that O atoms are not linked directly to one another, or a cycloalkyl ring having 3 to 6 C atoms, $L^{1-4}$ each, independently of one another, denote F, Cl, CF$_3$ or CHF$_2$, $Z^2$ and $Z^{2'}$ each, independently of one another, denote a single bond, —CH$_2$CH$_2$—, —CH=CH—, —CF$_2$O—, —OCF$_2$—, —CH$_2$O—, —OCH$_2$—, —C(O)O—, —OC(O)—, —C$_2$F$_4$—, —CF=CF—, —CH=CHCH$_2$O—, p denotes 1 or 2, q denotes 0 or 1, and v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —C$_2$H$_4$— or —CH$_2$O— bridge.

If in the formula IIB $Z^2$=—C$_2$H$_4$— or —CH$_2$O—, $Z^{2'}$ is preferably a single bond or, if $Z^{2'}$=—C$_2$H$_4$— or —CH$_2$O—, $Z^2$ is preferably a single bond. In the compounds of the formulae IIA and IIB, (O)C$_v$H$_{2v+1}$ preferably denotes OC$_v$H$_{2v+1}$, furthermore C$_v$H$_{2v+1}$. In the compounds of the formula IIC, (O)C$_v$H$_{2v+1}$ preferably denotes C$_v$H$_{2v+1}$. In the compounds of the formula IIC, $L^3$ and $L^4$ preferably each denote F.

Halogen denotes F, Cl, Br or I.

The invention further relates to a liquid crystalline medium comprising one or more dichroic dyes having an absorption maximum in the visible wavelength range.

The dichroic dye is defined as a compound which is dissolved in a host liquid crystal with the purpose of absorbing light. The absorption maximum of the dichroic dye or dyes used in the liquid crystalline media according to the present invention not specifically limited, but it is preferred to have an absorption maximum in the yellow region (Y), magenta region (M), or cyan region (C). The dichroic dye used in the liquid crystal medium of the present invention may be a single compound or a combination of a plurality of dyes. When several dyes are mixed it is preferred to use a mixture of the dichroic dyes having absorption maxima in the Y, M, and C regions, respectively. Dichroic dyes are known to the person skilled in the art and are reviewed in for example Cowling, Stephen J., Liquid Crystal Dyes, in: Handbook of Liquid Crystals, Wiley-VCH Verlag GmbH & Co. KGaA (2014). Methods of displaying a full colour by mixing a yellow dye, a magenta dye and a cyan dye is specifically described in "Colour Chemistry" (by Sumio Tokita, Maruzen Company, Limited, 1982). The yellow region is the range of 430 to 490 nm, the magenta region is the range of 500 to 580 nm, and the cyan region is the range of 600 to 700 nm.

The chromophore used in the dichroic dye is not particularly limited, but it is preferred to use azo dyes, azulene dyes, anthraquinone dyes, benzoquinone dyes, napthoquinone dyes, benzothiazole dyes, dithiobenzoquinone, perylene dyes, merocyanine dyes, azomethine dyes, phthaloperylene dyes, indigo dyes, azulene dyes, dioxazine dyes, tetrazine dyes, polythiophene dyes, naphthimidazo-4,9-dione dyes and phenoxazine dyes.

Preferred dyes according to the present invention are azo dyes, perylene dyes, anthraquinone dyes, and benzothiazole dyes, particularly preferred azo dyes.

The azo dyes may contain any number of azo groups such as monoazo dyes, bisazo dyes, trisazo dyes, tetrakisazo dyes, and pentakisazo dyes, and preferably monoazo dyes, bisazo dyes, and trisazo dyes.

Cyclic structures contained in the azo dyes are aryl groups and/or heteroaryl groups.

Preferred aryl groups are derived, for example, from the parent structures benzene, biphenyl, terphenyl, naphthalene, anthracene, phenanthrene, pyrene, dihydropyrene, chrysene, perylene, fluorene, indene, etc.

Preferred heteroaryl groups are, for example, 5-membered rings, such as pyrrole, pyrazole, imidazole, 1,2,3-triazole, 1,2,4-triazole, furan, thiophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, benzimidazole, benzotriazole, purine, naphthimidazole, phenanthrimidazole, pyridimidazole, pyrazinimidazole, quinoxalinimidazole, benzoxazole, naphthoxazole, anthroxazole, phen-anthroxazole, isoxazole, benzothiazole, benzofuran, isobenzofuran, dibenzofuran, quinoline, isoquinoline, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dihydrothieno [3,4-b]-1,4-dioxin, isobenzothiophene, dibenzothiophene, benzothiadiazothiophene, or combinations of these groups.

The aryl and heteroaryl groups may also be substituted by alkyl, cycloalkyl, alkoxy, thioalkyl, alkylamino, dialkylamino, fluorine, fluoroalkyl or further aryl or heteroaryl groups.

Examples of especially suitable and preferred dyes are the azo dyes F355®, F357® and F593® (from Nippon Kankoh Shikiso Kenkyusho Ltd., Okayama, Japan) of the following structures:

but the present invention is not limited thereto, and other types of dyes known to have an equivalent effect to the above-described dyes may also be used.

The concentration of the dichroic dye or dyes in the medium is preferably 1% by weight or more, particularly preferably 1.5% by weight or more and very particularly 2% by weight or more.

Preferred compounds of formula I are selected from the group of compounds of the formulae I-1 and I-2:

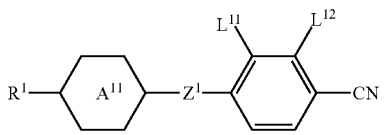

I-1

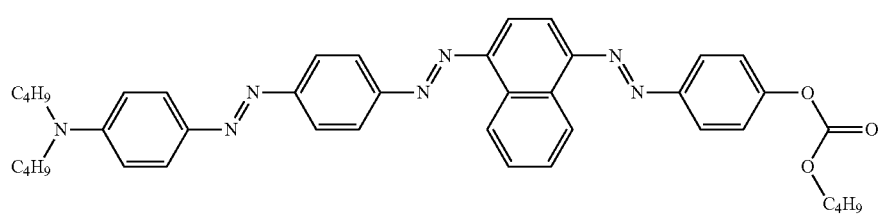

Dye-1

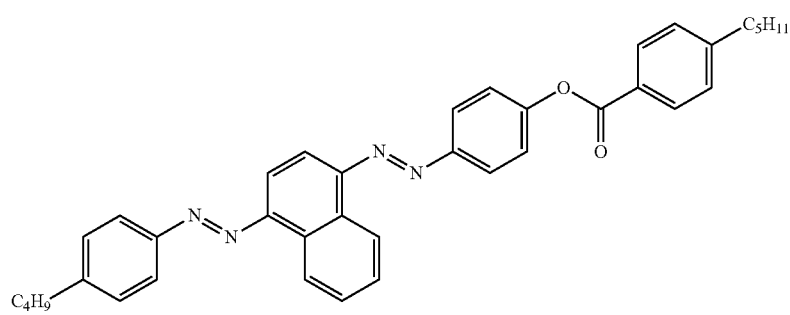

Dye-2

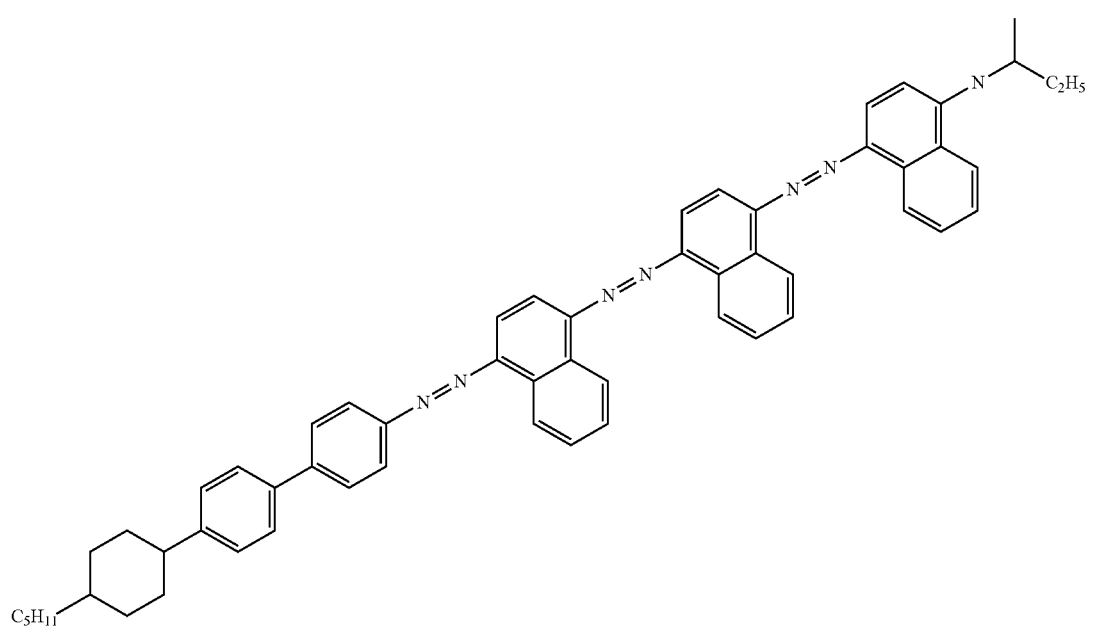

Dye-3

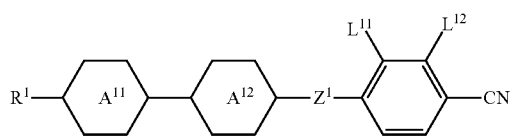

wherein
R¹ denotes alkyl or alkenyl having up to 7 C atoms,
A¹¹ and A¹² identically or differently, denote

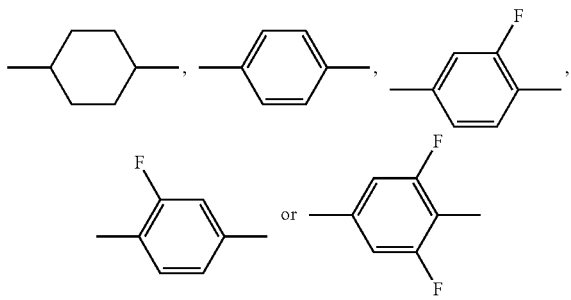

preferably

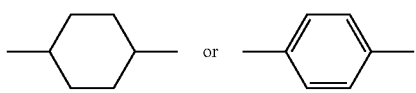

L¹¹ and L¹² independently of one another, denote H or F, and
Z¹ —CO—O—, —O—CO—, —CH₂O—, —OCH₂—, —CH₂CH₂—, —OCF₂—, —CF₂O—, or a single bond, preferably a single bond.

Particularly preferred compounds of formula I are selected from the group of compounds of formulae I-1 to I-8, very particularly preferred of formula I-1:

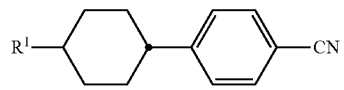

I-1

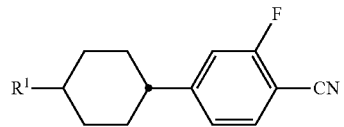

I-2

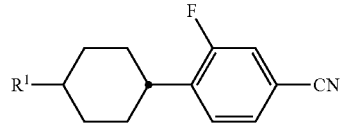

I-3

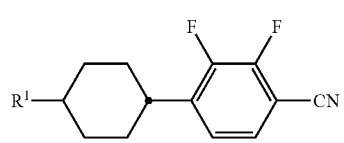

I-4

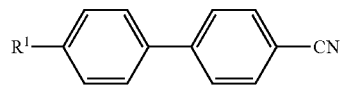

I-5

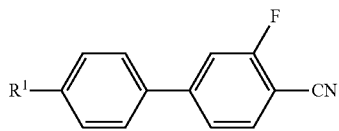

I-6

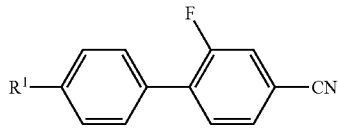

I-7

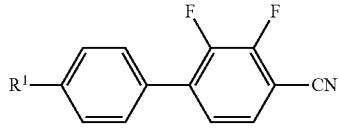

I-8

Preferred compounds of the formulae IIA, IIB and IIC are indicated below:

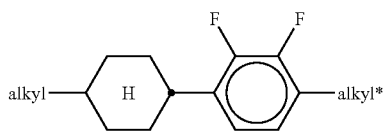

IIA-1

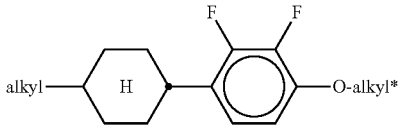

IIA-2

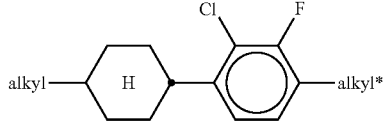

IIA-3

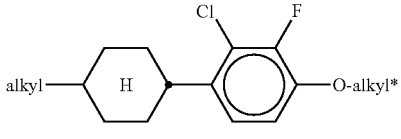

IIA-4

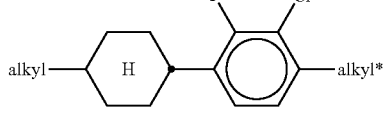

IIA-5

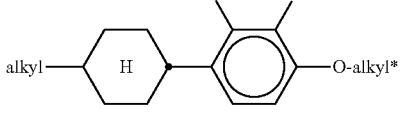

IIA-6

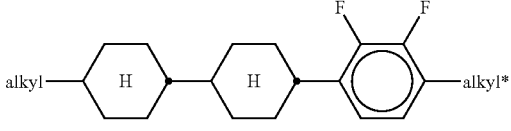

IIA-7

IIA-8
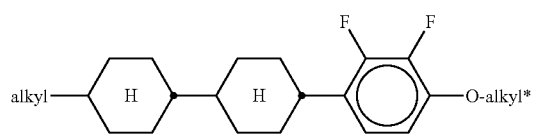
IIA-9
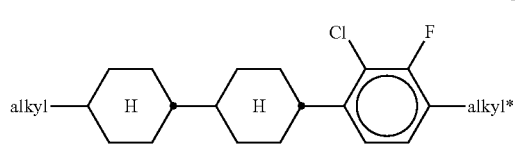
IIA-10
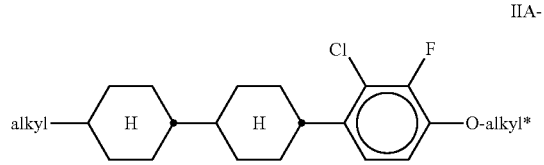
IIA-11
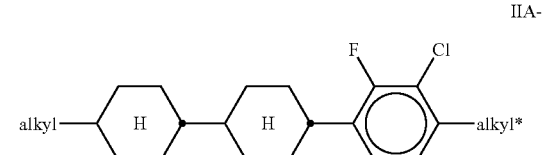
IIA-12
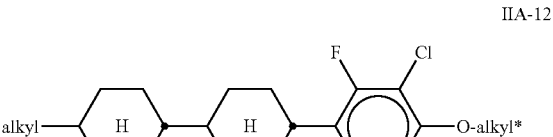
IIA-13
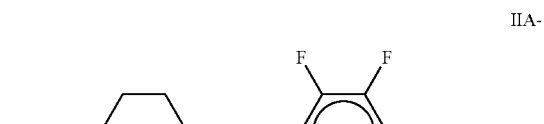
IIA-14
IIA-15
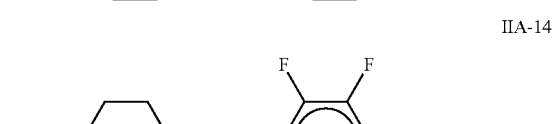
IIA-16
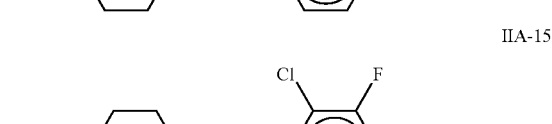
IIA-17
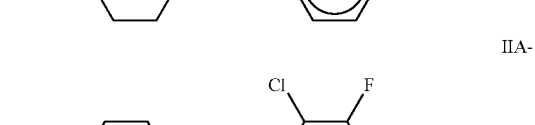
IIA-18
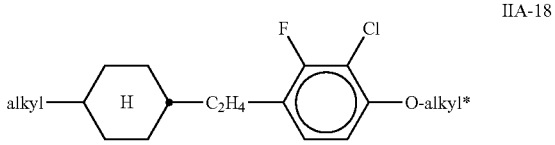
IIA-19
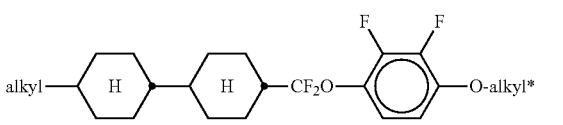
IIA-20
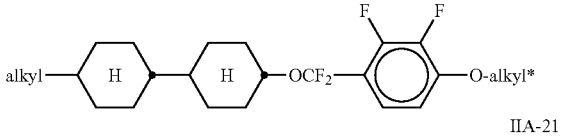
IIA-21
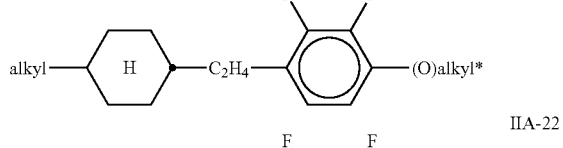
IIA-22
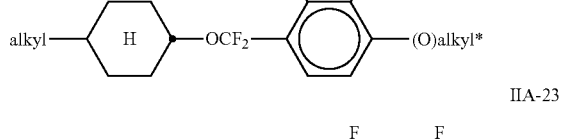
IIA-23
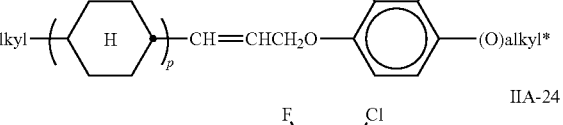
IIA-24
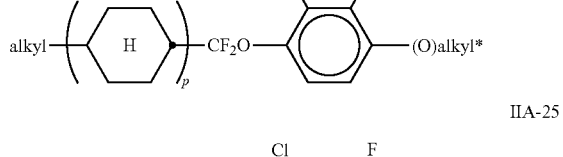
IIA-25
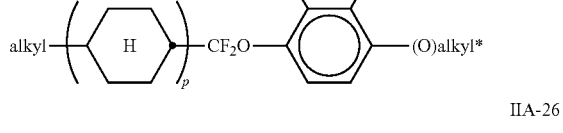
IIA-26
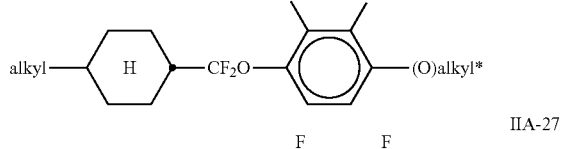
IIA-27
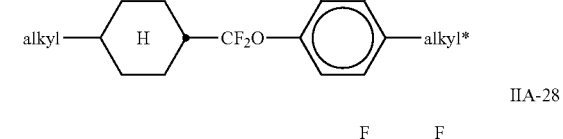
IIA-28
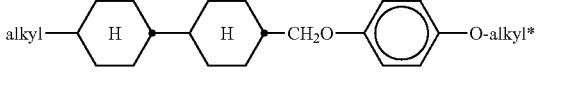

IIA-29
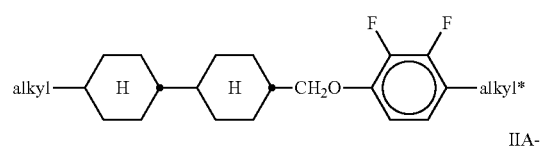
IIA-30
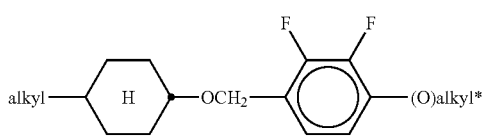
IIA-31
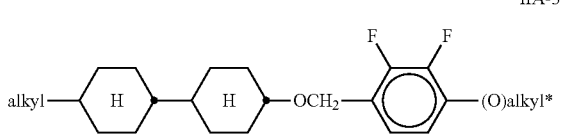
IIA-32
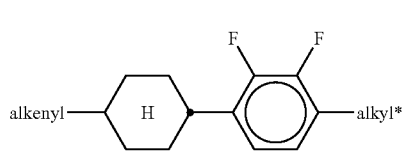
IIA-33
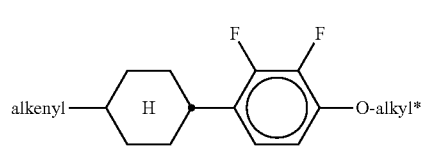
IIA-34
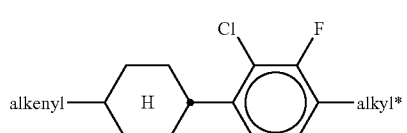
IIA-35
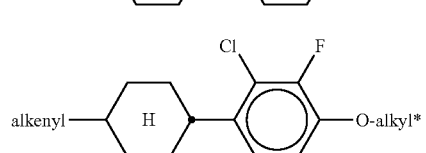
IIA-36
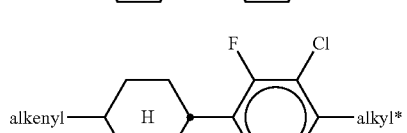
IIA-37
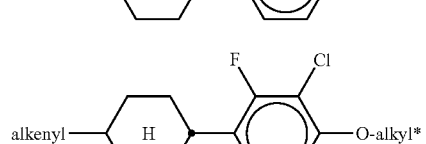
IIA-38
IIA-39
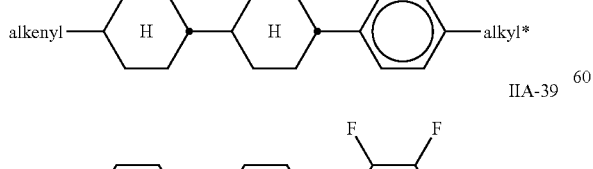
IIA-40
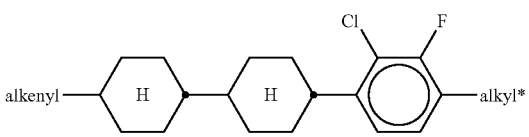
IIA-41
IIA-42
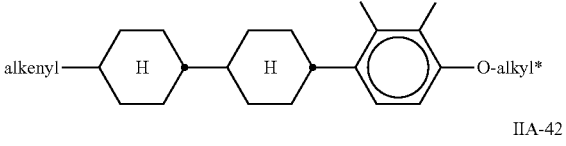
IIA-43
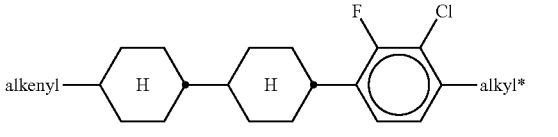
IIA-44
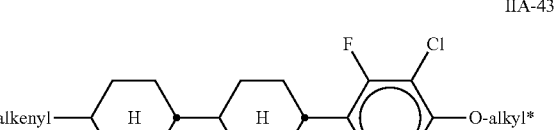
IIA-45
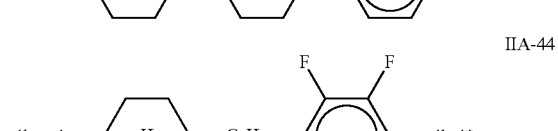
IIA-46
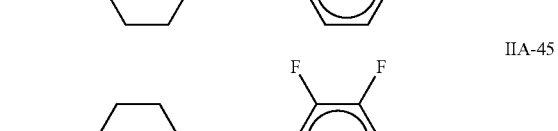
IIA-47
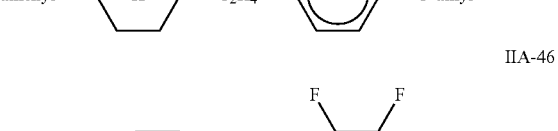
IIA-48
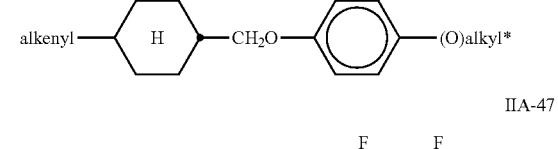
IIA-49
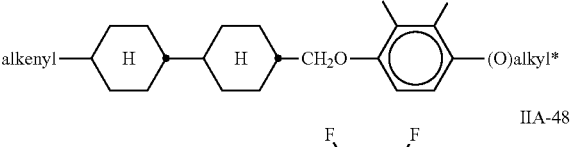

IIA-50
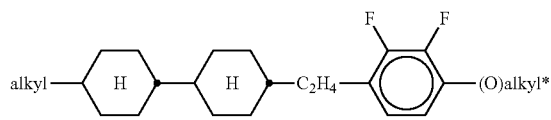

IIB-1
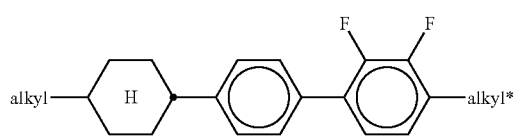

IIB-2
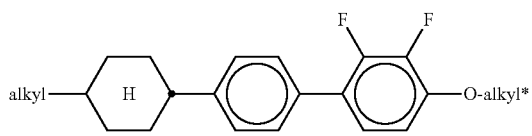

IIB-3
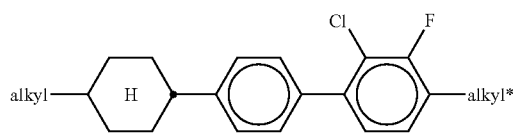

IIB-4
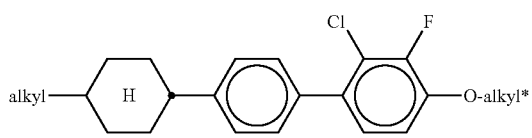

IIB-5
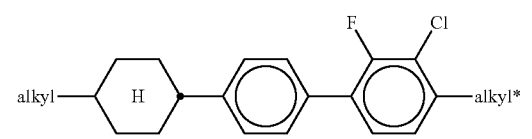

IIB-6
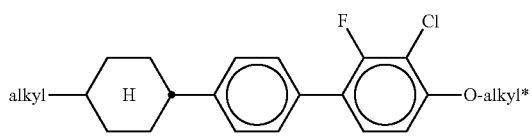

IIB-7
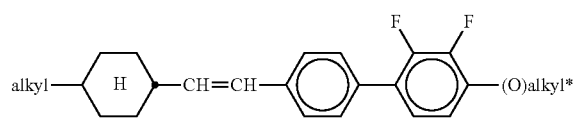

IIB-8
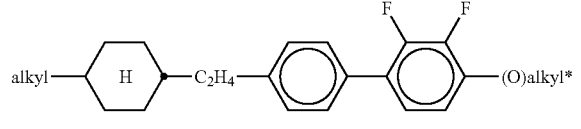

IIB-9
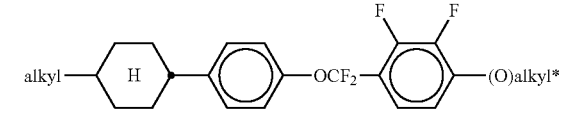

IIB-10
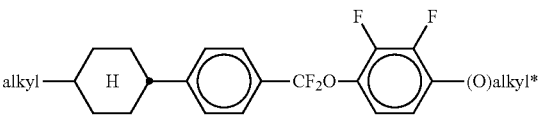

IIB-11
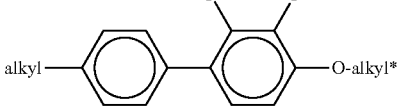

IIB-12
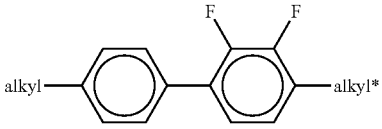

IIB-13
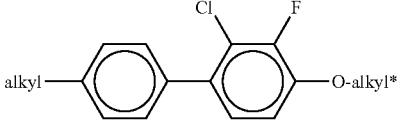

IIB-14
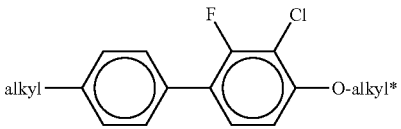

IIB-15
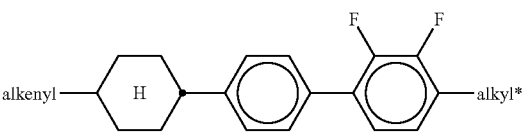

IIB-16
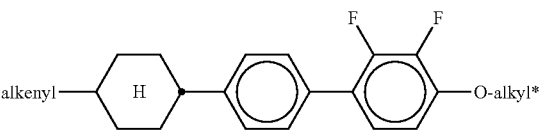

IIC-1
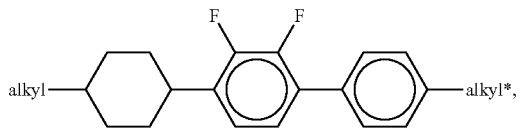

wherein alkyl and alkyl* each, independently of one another, denote a straight-chain alkyl radical having 1-6 C atoms, alkenyl denotes a straight chain alkenyl radical having 2 to 6 C atoms, and (O) denotes —O— or a single bond.

Particularly preferred mixtures according to the invention comprise one or more compounds of the formulae IIA-2, IIA-8, IIA-14, IIA-26, IIA-28, IIA-33, IIA-39, IIA-45, IIA-46, IIA-47, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

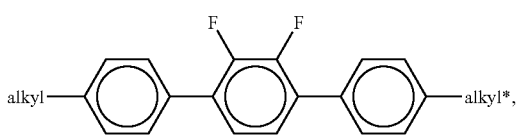

in which alkyl and alkyl* have the meanings indicated above, preferably in amounts of >3% by weight, in particular >5% by weight and particularly preferably 5-30% by weight.

The mixtures according to the invention are distinguished by a high solubility of dichroic dyes therein.

The mixtures according to the invention preferably exhibit very broad nematic phase ranges with clearing points ≥75° C., preferably ≥85° C., very favourable values of the capacitive threshold, relatively high values of the holding ratio and at the same time very good low-temperature stabilities at −20° C. and −30° C., as well as low rotational viscosities and short response times. The mixtures according to the invention are furthermore distinguished by the fact that, in addition to the improvement in the rotational viscosity $\gamma_1$, relatively high values of the elastic constants $K_{33}$ for improving the response times can be observed.

Some preferred embodiments of the mixtures according to the invention are indicated below.

The compound of the formula I is preferably employed in the liquid-crystalline medium in amounts of ≥0.5% by weight, preferably ≥3% by weight, based on the mixture as a whole. Particular preference is given to liquid-crystalline media which comprise 2-20% by weight, very particularly preferably 5-10% by weight, of the compound of the formula I.

The compound of the formula I is preferably employed in the liquid-crystalline medium in amounts of 20% by weight or less, preferably 15% by weight, or less, particularly preferably 12% by weight or less.

Preferred embodiments of the liquid-crystalline medium according to the invention are indicated below:

a) Liquid-crystalline medium which additionally comprises one or more compounds of the formula III,

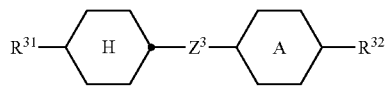

in which
$R^{31}$ and $R^{32}$ each, independently of one another, denote a straight-chain alkyl, alkenyl, alkoxyalkyl or alkoxy radical having up to 12 C atoms, and

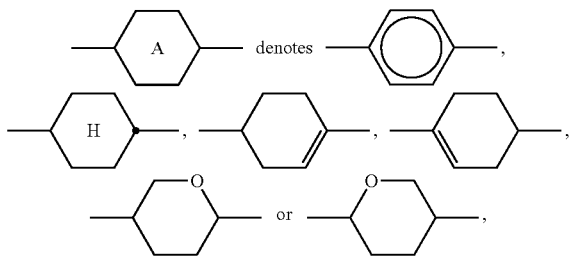

$Z^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, —CF═CF—.

Preferred compounds of formula III are selected from the group of compounds of the following sub-formulae:

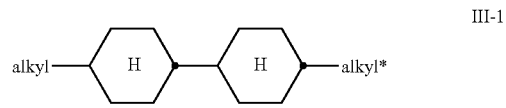

III-1

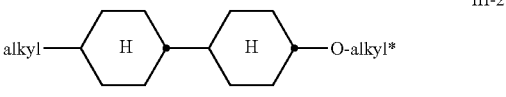

III-2

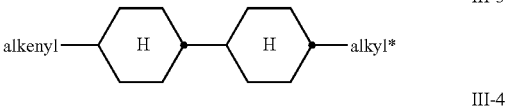

III-3

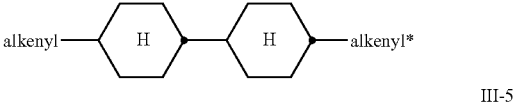

III-4

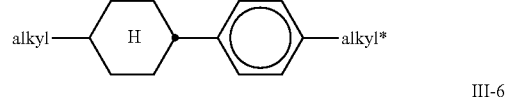

III-5

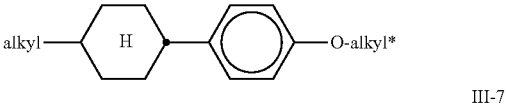

III-6

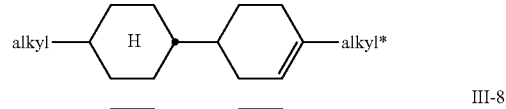

III-7

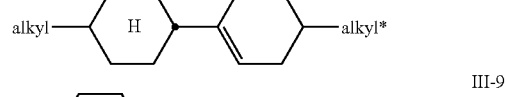

III-8

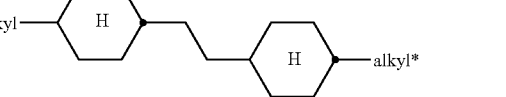

III-9

III-10

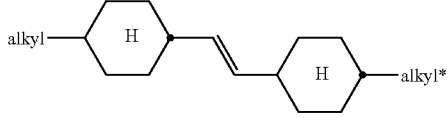

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$═CH—, CH$_2$═CHCH$_2$CH$_2$—, CH$_3$—CH═CH—, CH$_3$—CH$_2$—CH═CH—, CH$_3$—(CH$_2$)$_2$—CH═CH—, CH$_3$—(CH$_2$)$_3$—CH═CH— or CH$_3$—CH═CH—(CH$_2$)$_2$—.

Especially preferred are compounds of formula III-1 and III-3.

The proportion of compounds of the formula III in the mixture as a whole is preferably at least 5% by weight.

Particularly preferred compounds of the formula III-1 are the following:

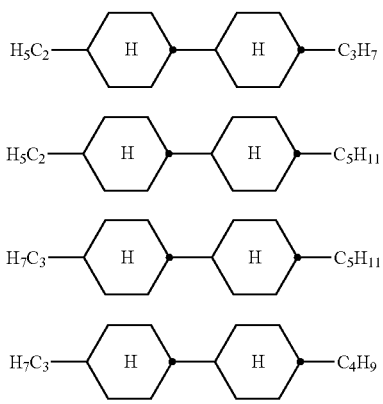

III-1a
III-1b
III-1c
III-1d

Particularly preferred compounds of the formula III-3 are the following:

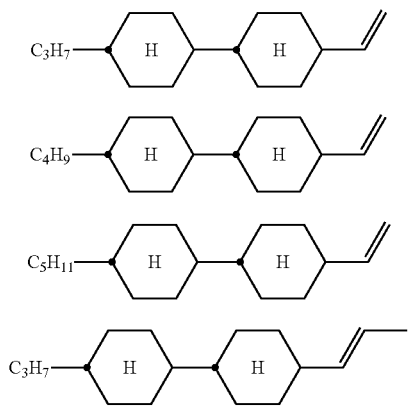

III-3a
III-3b
III-3c
III-3d b) Liquid-crystalline medium which additionally comprises one or more tetracyclic compounds of the formulae

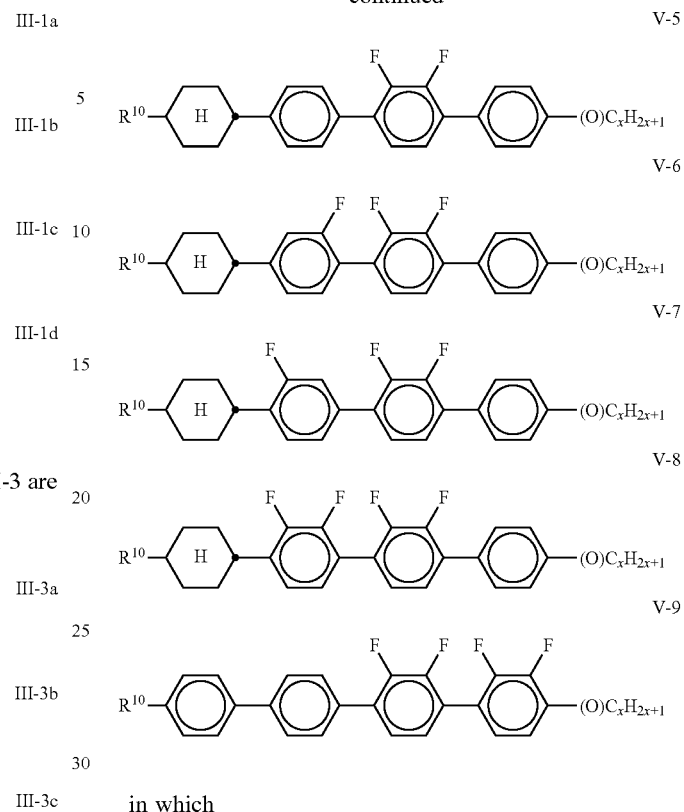

V-1
V-2
V-3
V-4
V-5
V-6
V-7
V-8
V-9 in which $R^{7-10}$ each, independently of one another, have one of the meanings indicated for $R^{2A}$ in claim 2, and w and x each, independently of one another, denote 1 to 6.

Particular preference is given to mixtures comprising at least one compound of the formula V-9.

c) Liquid-crystalline medium which additionally comprises one or more compounds of the formulae Y-1 to Y-6,

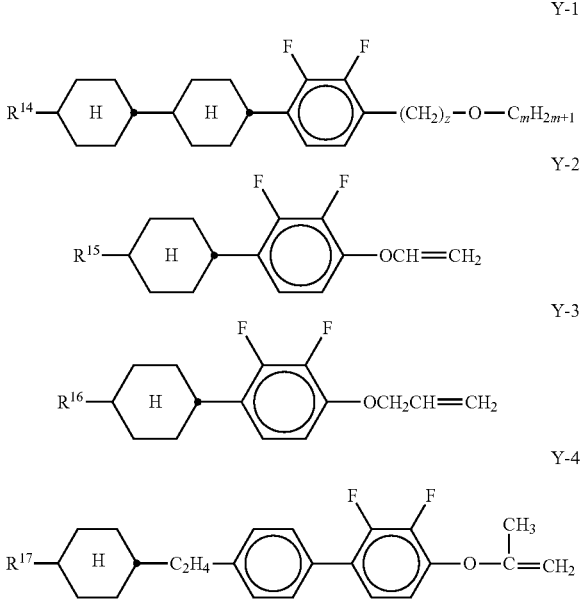

Y-1
Y-2
Y-3
Y-4

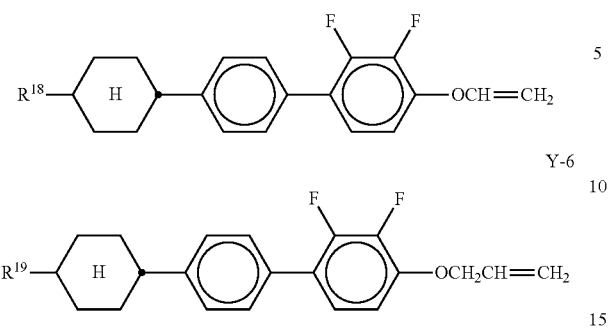

in which $R^{14}$-$R^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

d) Liquid-crystalline medium additionally comprising one or more fluorinated terphenyls of the formulae T-1 to T-21,

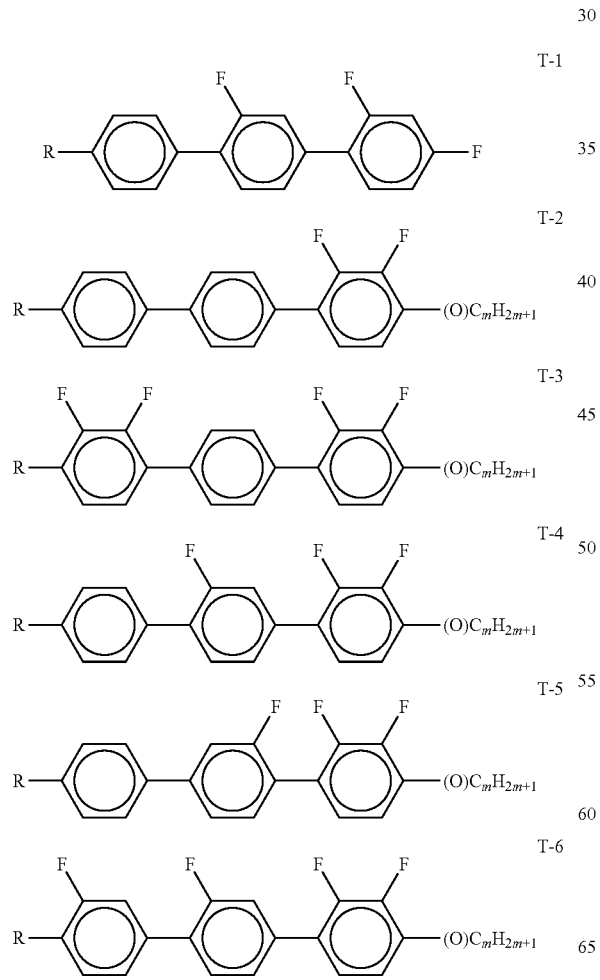

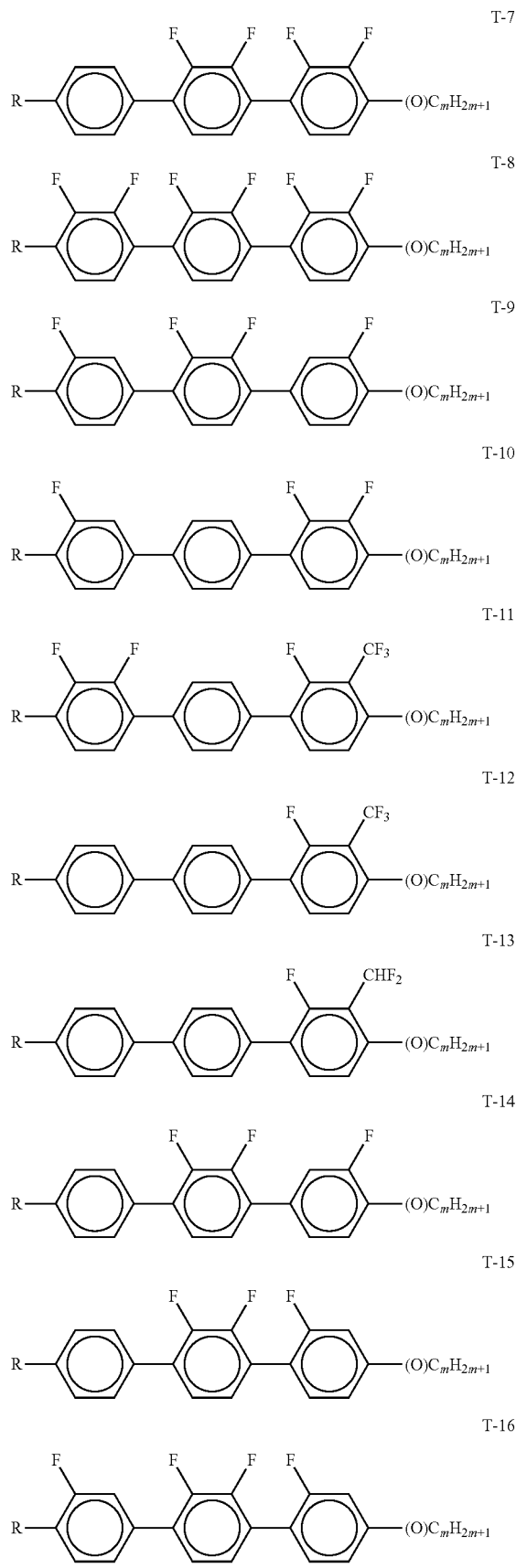

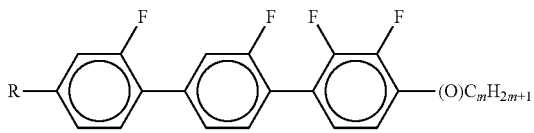
T-17

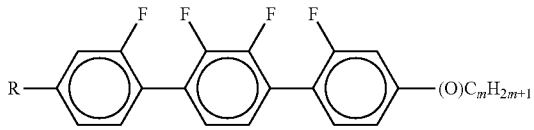
T-18

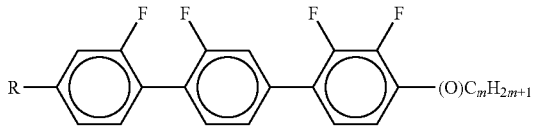
T-19

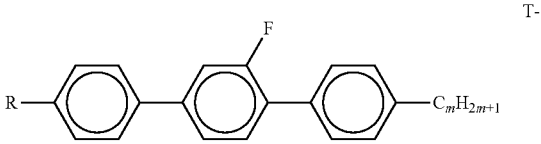
T-20

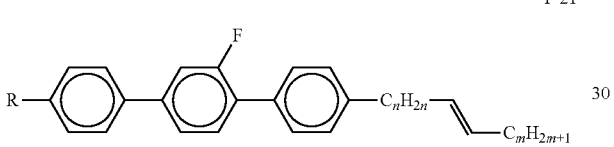
T-21 in which
R denotes a straight-chain alkyl or alkoxy radical having 1-7 C atoms or alkenyl having 2-7 C atoms,
and m=0, 1, 2, 3, 4, 5 or 6 and n denotes 0, 1, 2, 3 or 4.
R preferably denotes methyl, ethyl, propyl, butyl, pentyl, hexyl, meth-oxy, ethoxy, propoxy, butoxy, pentoxy.
The medium according to the invention preferably comprises the terphenyls of the formulae T-1 to T-21 in amounts of 2-30% by weight, in particular 5-20% by weight.
Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.
The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

e) Liquid-crystalline medium additionally comprising one or more biphenyls of the formulae B-1 to B-4,

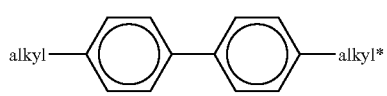
B-1

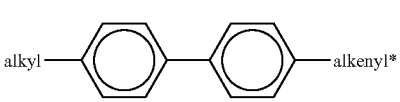
B-2

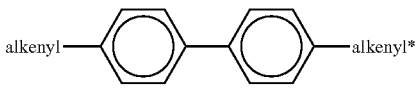
B-3

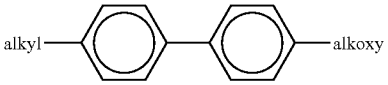
B-4 in which
alkyl and alkyl* each, independently of one another, denote a straight-chain alkyl radical having 1-6 C atoms,
alkenyl and alkenyl* each, independently of one another, denote a straight-chain alkenyl radical having 2-6 C atoms, and
alkoxy denotes a straight-chain alkoxy radical having 1-6 C atoms.
The proportion of the biphenyls of the formulae B-1 to B-4 in the mixture as a whole is preferably at least 3% by weight, in particular ≥5% by weight.
Of the compounds of the formulae B-1 to B-4, the compounds of the formula B-2 are particularly preferred.
Particularly preferred biphenyls are

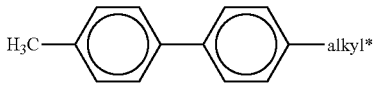
B-1a

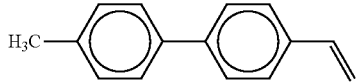
B-2a

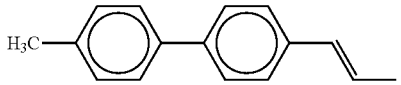
B-2b

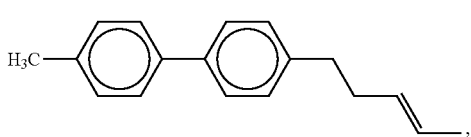
B-2c in which alkyl* denotes an alkyl radical having 1-6 C atoms. The medium according to the invention particularly preferably comprises one or more compounds of the formulae B-1a and/or B-2c.

f) Liquid-crystalline medium comprising at least one compound of the formulae Z-1 to Z-7,

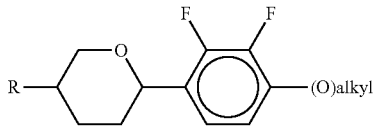
Z-1

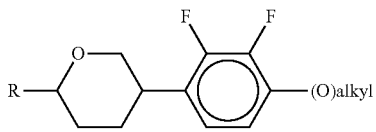
Z-2

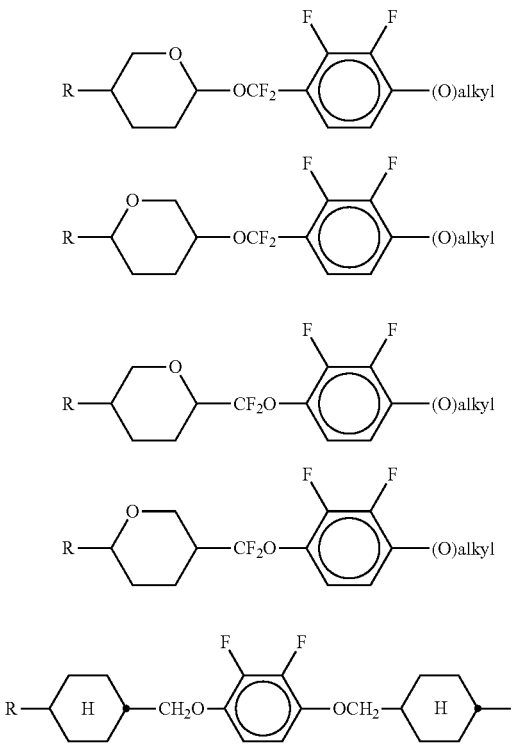

in which
R denotes a straight-chain alkyl or alkoxy radical having 1-7 C atoms or an alkenyl radical having 2-7 C atoms,
alkyl denotes an alkyl radical having 1-6 C atoms, and
(O)alkyl denotes alkyl or Oalkyl (alkoxy).

g) Liquid-crystalline medium comprising at least one compound of the formulae O-1 to O-16,

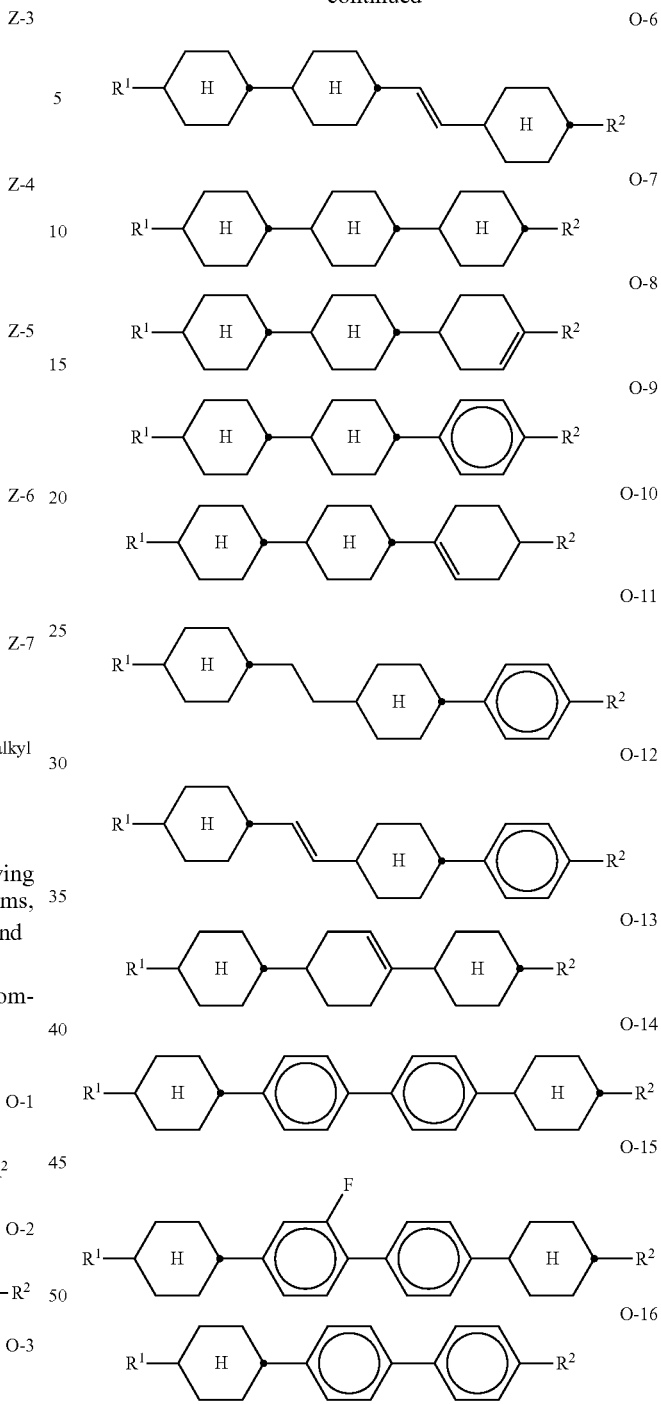

in which $R^1$ and $R^2$ have the meanings indicated for $R^{2A}$. $R^1$ and $R^2$ preferably each, independently of one another, denote straight-chain alkyl having 1-6 C atoms or $R^1$ denotes straight-chain alkyl having 1-6 C atoms and $R^2$ denotes alkenyl having 2-6 C atoms.

Preferred media comprise one or more compounds of the formulae O-1, O-3, O-4, O-5, O-9, O-12, O-14, O-15, and/or O-16.

Mixtures according to the invention very particularly preferably comprise the compounds of the formulae O-9, O-12 and/or O-16 in particular in amounts of 5-30%.

Preferred compounds of the formula 0-9 are indicated below:

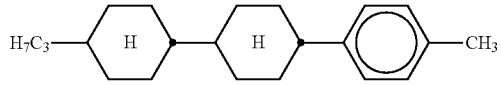

O-9a

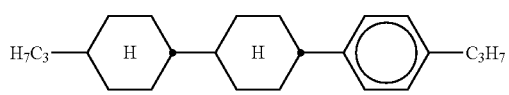

O-9b h) Liquid-crystalline medium comprising one or more compounds of the formula BA

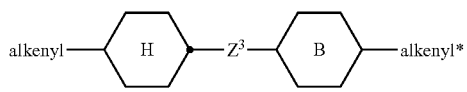

BA in which alkenyl und alkenyl* each, independently of one another, denote a straight-chain alkenyl radical having 2-12 C atoms,

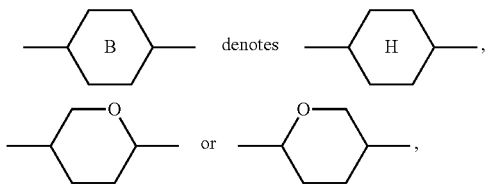

$Z^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, —CF═CF—.

Preferred compounds of the formula BA are indicated below:

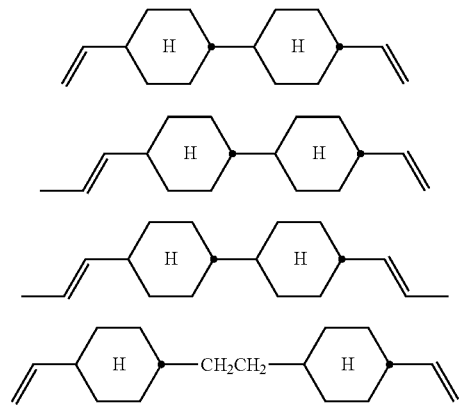

BA-1

BA-2

BA-3

BA-4

BA-5

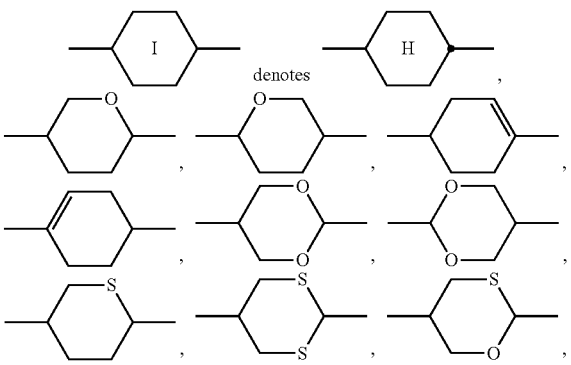

i) Preferred mixtures comprise one or more indane compounds of the formula In,

In in which $R^{11}$, $R^{12}$, $R^{13}$ each, independently of one another, denote a straight-chain alkyl, alkoxy, alkoxyalkyl or alkenyl radical having 1-6 C atoms or 2-6 C atoms respectively, $R^{12}$ and $R^{13}$ additionally denote halogen, preferably F,

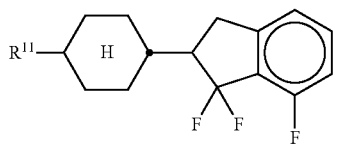

denotes

,

,

,

,

,

,

,

,

, i denotes 0, 1 or 2.

Preferred compounds of the formula In are the compounds of the formulae In-1 to In-16 indicated below:

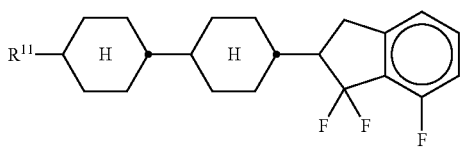

In-1

In-2

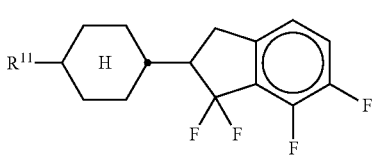

In-3

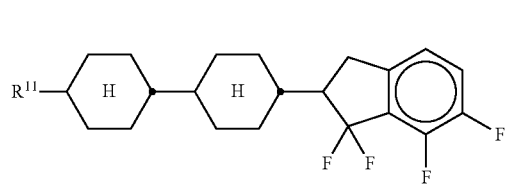
In-4

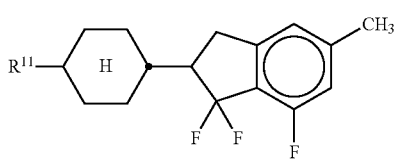
In-5

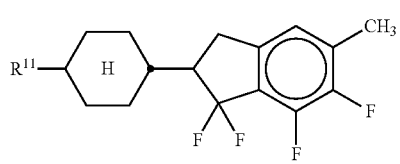
In-6

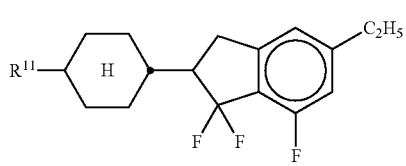
In-7

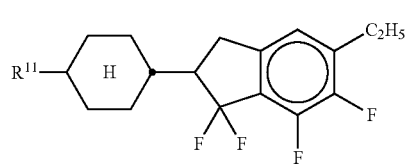
In-8

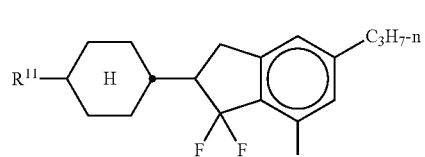
In-9

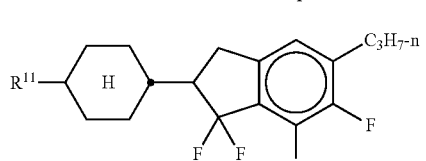
In-10

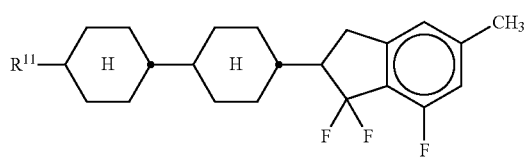
In-11

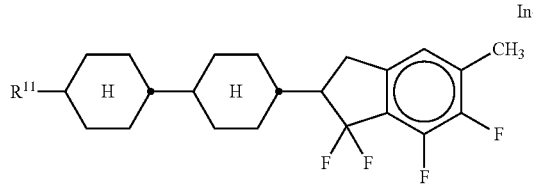
In-12

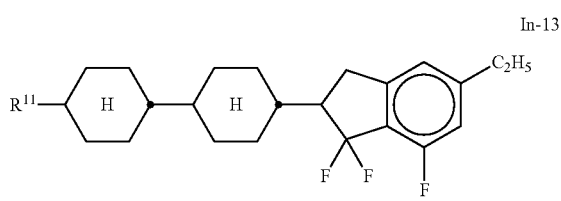
In-13

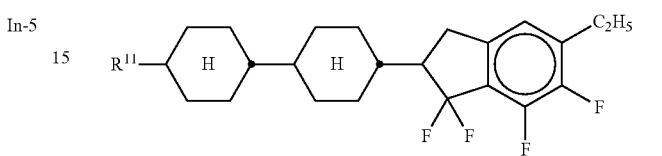
In-14

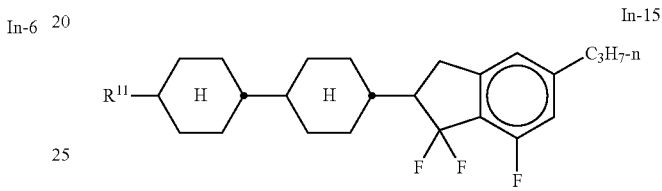
In-15

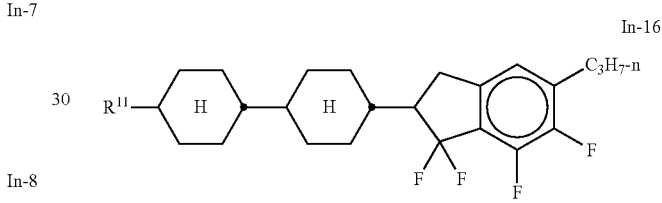
In-16

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

j) The medium additionally comprises one or more compounds selected from the following formulae:

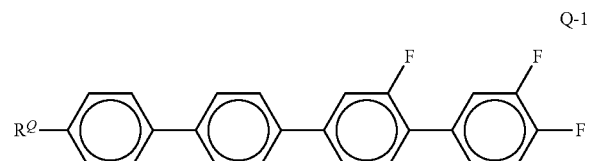
Q-1

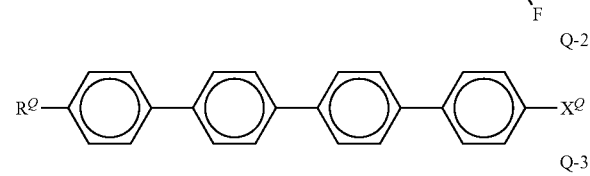
Q-2

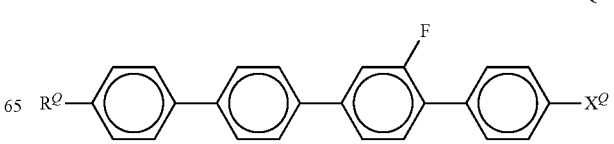
Q-3

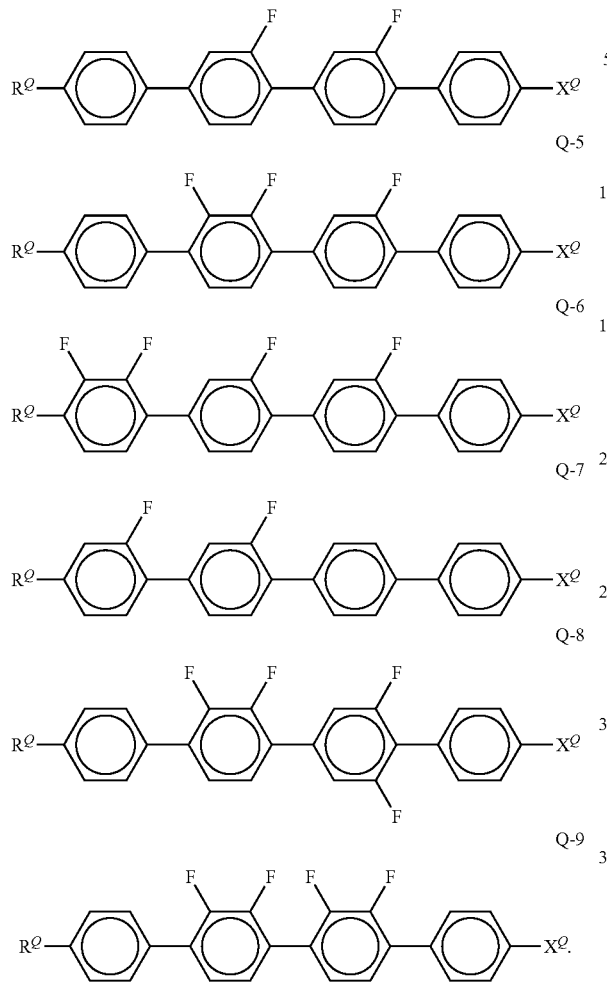

In the compounds of the formulae Q-1 to Q-9, $R^Q$ and $X^Q$ each, independently of one another, have the meanings of $R^{2,4}$ in claim 2. $R^Q$ and $X^Q$ preferably denote a straight-chain alkyl radical having 1-6 C atoms, in particular having 2-5 C atoms.

Particularly preferred mixture concepts are indicated below: (the acronyms used are explained in Tables 1-3 and in Table A. n and m here each, independently of one another, are an integer from 1 to 6).

The mixtures according to the invention preferably comprise
the compound of the formula I in combination with one or more compounds of the formula CPY-n-Om, in particular CPY-2-O2, CPY-3-O2 and/or CPY-5-O2, preferably in concentrations >5%, in particular 10-30%, based on the mixture as a whole,
and/or
CY-n-Om, preferably CY-3-O2, CY-3-O4, CY-5-O2 and/or CY-5-O4, preferably in concentrations >5%, in particular 15-50%, based on the mixture as a whole,
and/or
CCY-n-Om, preferably CCY-4O-2, CCY-3O-2, CCY-3-O3, CCY-3-O1 and/or CCY-5O-2, preferably in concentrations >5%, in particular 10-30%, based on the mixture as a whole, Preference is furthermore given to mixtures according to the invention which comprise the following mixture concepts:
(n and m each, independently of one another, are an integer from 1 to 6)
CPY-n-Om and CY-n-Om, preferably in concentrations of 10-80%, based on the mixture as a whole,
and/or
CPY-n-Om and CK-n-F, preferably in concentrations of 10-70%, based on the mixture as a whole,
and/or
CPY-n-Om and PY-n-Om, preferably CPY-2O-2 and/or CPY-3O-2 and PY-3O-2, preferably in concentrations of 10-40%, based on the mixture as a whole,
and/or
CBCnm and/or CBC-nmF in a total concentration of 2 to 10%, based on the mixture as a whole,
and/or
PGIY-n-Om, preferably in amounts of 3-15%,
and/or
PGIGI-n-F, preferably in amounts of 3-15%, The invention furthermore relates to an electro-optical device based on the guest host effect containing a liquid crystalline medium according to the invention, such as light shutter, switchable windows, switchable mirrors, LC displays, guest-host polymer dispersed liquid crystal (GHPDLC) films, guest-host polymer network liquid crystal (GHPNLC) films, guest-host dynamic scattering liquid crystal (GHDSLC) films.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "to have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K.

The values of the birefringence Δn in the liquid-crystal mixture are generally between 0.07 and 0.16, preferably between 0.08 and 0.13.

The liquid-crystal mixture according to the invention has a Δε of −0.5 to −8.0, in particular −1.0 to −6.0, where Δε denotes the dielectric anisotropy.

The rotational viscosity $\gamma_1$ at 20° C. is preferably ≤500 mPa·s, in particular ≤250 mPa·s.

The liquid-crystal media according to the invention have relatively small values for the threshold voltage ($V_0$). They are preferably in the range from 1.7 V to 4.0 V, particularly preferably ≤3.0 V and very particularly preferably ≤2.7 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\varepsilon > 1.5$, the term "dielectrically neutral compounds" denotes those where $-1.5 \leq \Delta\varepsilon \leq 1.5$ and the term "dielectrically negative compounds" denotes those having $\Delta\varepsilon < -1.5$. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

Besides one or more compounds of the formula I, the phases preferably comprise 4 to 15, in particular 5 to 12, and particularly preferably <10, compounds of the formulae IIA, IIB and/or IIC.

Besides compounds of the formula I and the compounds of the formulae IIA, IIB and/or IIC, other constituents may also be present, for example in an amount of up to 45% of the mixture as a whole, but preferably up to 35%, in particular up to 10%.

In addition, these liquid-crystal phases may also comprise more than 18 components, preferably 18 to 25 components.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV, $$R^{20}\text{-L-G-E-}R^{21} \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydro-quinazoline,

| G denotes | —CH═CH— | —N(O)═N— |
|---|---|---|
| | —CH═CQ- | —CH═N(O)— |
| | —C≡C— | —CH$_2$—CH$_2$— |
| | —CO—O— | —CH$_2$—O— |
| | —CO—S— | —CH$_2$—S— |
| | —CH═N— | —COO-Phe-COO— |
| | —CF$_2$O— | —CF═CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the liquid crystalline according to the invention may also comprise compounds in which, for example, H, N, O, Cl and F have been replaced by the corresponding isotopes.

Polymerisable compounds, either non-mesogenic or mesogenic, the latter referred to as reactive mesogens (RMs), for example as disclosed in U.S. Pat. No. 6,861,107, preferably non-mesogenic, may furthermore be added to the mixtures according to the invention in concentrations of preferably 10-50% by weight, particularly preferably 20-40% by weight, based on the mixture. The polymerisable compounds are preferably selected from 2-ethylhexyl acrylate (EHA), 1,3,3-trimethylhexyl acrylate (TMHA), trimethylol propane triacrylatehexanediol diacrylate (HDDA), hexanediol dimethacrylate (HDDMA), and the like, and also from metylmethacrylate (MMA), ethylacrylate (EA), ethylmethacrylate (EMA) and 6-(4'-cyanobiphenyl-4-yloxy) hexyl acrylate (6CBA), a mesogenic monomer. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0-1%. Mixtures of this type can be used for so-called guest-host polymer dispersed liquid crystals (GHPDLC). A GHPDLC display is described in JP 06-324309 A. A GHPDLC polymer film is published in P. Malik, K. K. Raina, Physica B 405 (2010) 161-166.

The prerequisite for this is that the liquid-crystal mixture itself comprises no polymerisable components which likewise polymerise under the conditions where the compounds of the formula M polymerise.

The polymerisation is preferably carried out under the following conditions: the polymerisable components are polymerised in a cell using a UV-A lamp of defined intensity for a defined period and applied voltage (typically 10 to 30 V alternating voltage, frequencies in the range from 60 Hz to 1 kHz). The UV-A light source employed is typically a metal-halide vapour lamp or high-pressure mercury lamp having an intensity of 50 mW/cm$^2$. These are conditions where, for example, liquid-crystalline compounds containing an alkenyl or alkenyloxy side chain, such as, for example, the compounds of the formula

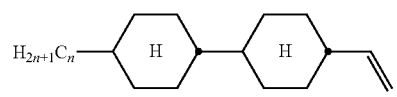

where n=2, 3, 4, 5 or 6,
do not polymerise.

The mixtures according to the invention may furthermore comprise conventional additives, such as, for example, stabilisers, antioxidants, UV absorbers, nanoparticles, microparticles, etc.

In a preferred embodiment of the present invention the liquid crystalline medium comprises one or more chiral dopants.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

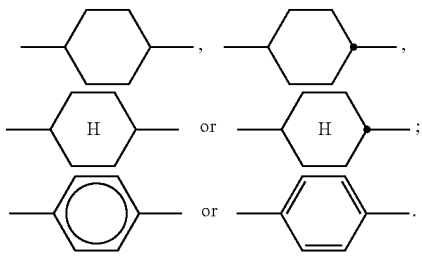

The cyclohexylene rings are trans-1,4-cyclohexylene rings.

Throughout the patent application and in the working examples, the structures of the liquid-crystal compounds are indicated by means of acronyms.

Unless indicated otherwise, the transformation into chemical formulae is carried out in accordance with Tables 1-3. All radicals $C_nH_{2n+1}$, $C_mH_{2m+1}$ and $C_{m'}H_{2m'+1}$ or $C_nH_{2n}$ and $C_mH_{2m}$ are straight-chain alkyl radicals or alkylene radicals, in each case having n, m, m' or z C atoms respectively. n, m, m' and z each, independently of one another, denote 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

TABLE 1

Ring elements

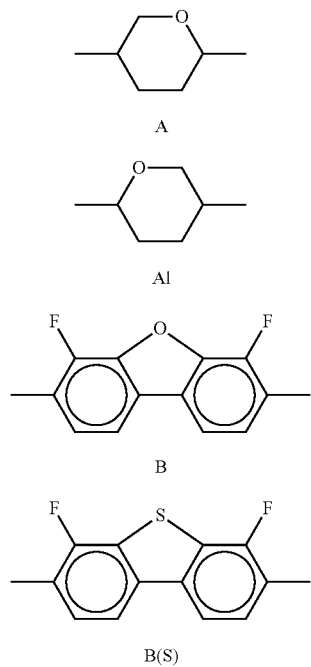

TABLE 1-continued

Ring elements

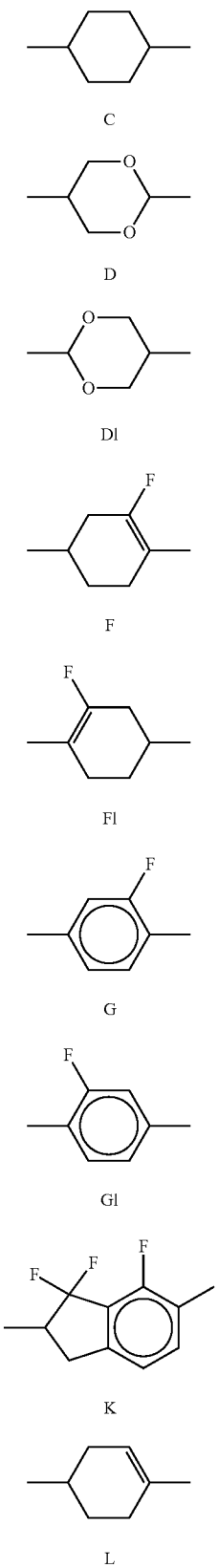

TABLE 1-continued

Ring elements

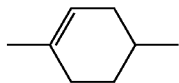

L1

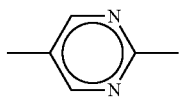

M

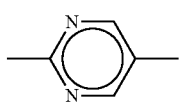

M1

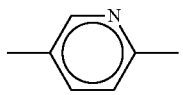

N

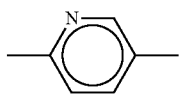

N1

P

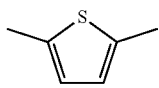

TABLE 1-continued

Ring elements

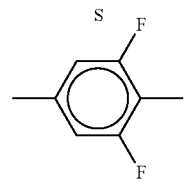

U

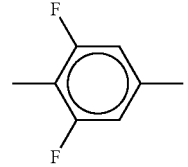

U1

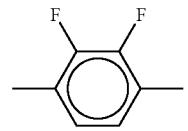

Y

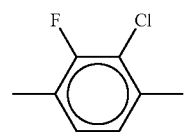

Y(F,Cl)

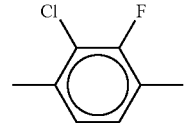

Y(Cl,F)

TABLE 2

| | Bridging members | | |
|---|---|---|---|
| E | —CH$_2$CH$_2$— | | |
| V | —CH=CH— | | |
| T | —C≡C— | | |
| W | —CF$_2$CF$_2$— | | |
| Z | —COO— | ZI | —OCO— |
| O | —CH$_2$O— | OI | —OCH$_2$— |
| Q | —CF$_2$O— | QI | —OCF$_2$— |

TABLE 3

Side chains

| Left-hand side chain | | Right-hand side chain | |
|---|---|---|---|
| n- | C$_n$H$_{2n+1}$— | -n | —C$_n$H$_{2n+1}$ |
| nO- | C$_n$H$_{2n+1}$—O— | -On | —O—C$_n$H$_{2n+1}$ |
| V— | CH$_2$=CH— | —V | —CH=CH$_2$ |
| nV- | C$_n$H$_{2n+1}$—CH=CH— | -nV | —C$_n$H$_{2n}$—CH=CH$_2$ |
| Vn- | CH$_2$=CH—C$_n$H$_{2n}$— | -Vn | —CH=CH—C$_n$H$_{2n+1}$ |
| nVm- | C$_n$H$_{2n+1}$—CH=CH—C$_m$H$_{2m}$— | -nVm | —C$_n$H$_{2n}$—CH=CH—C$_m$H$_{2m+1}$ |
| N— | N≡C— | —N | —C≡N |

TABLE 3-continued

| Side chains | | | |
|---|---|---|---|
| Left-hand side chain | | Right-hand side chain | |
| F— | F— | —F | —F |
| Cl— | Cl— | —Cl | —Cl |
| M- | CFH$_2$— | -M | —CFH$_2$ |
| D- | CF$_2$H— | -D | —CF$_2$H |
| T- | CF$_3$— | -T | —CF$_3$ |
| MO- | CFH$_2$O— | -OM | —OCFH$_2$ |
| DO- | CF$_2$HO— | -OD | —OCF$_2$H |
| TO- | CF$_3$O— | -OT | —OCF$_3$ |
| T- | CF$_3$— | -T | —CF$_3$ |
| A- | H—C≡C— | -A | —C≡C—H |

Besides the compounds of the formulae IIA and/or IIB and/or IIC and one or more compounds of the formula I, the mixtures according to the invention preferably comprise one or more of the compounds from Table A indicated below.

TABLE A

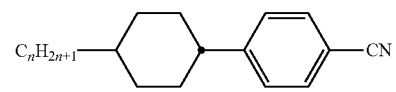

PCH-n

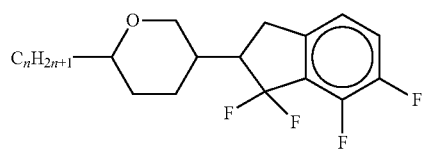

AlK-n-F

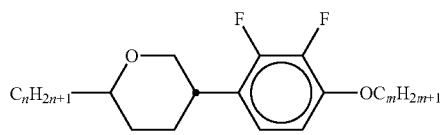

AlY-n-Om

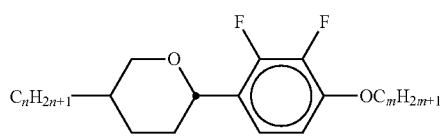

AY-n-Om

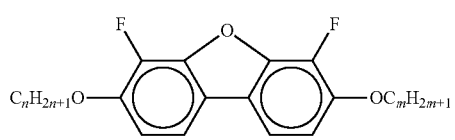

B-nO-Om

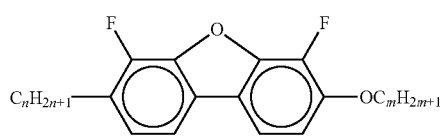

B-n-Om

TABLE A-continued
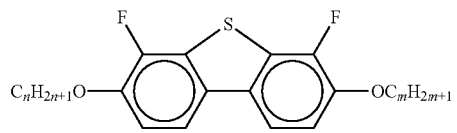
B(S)-nO-Om
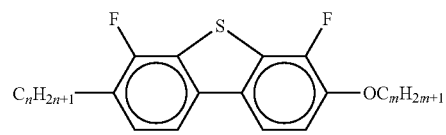
B(S)-n-Om
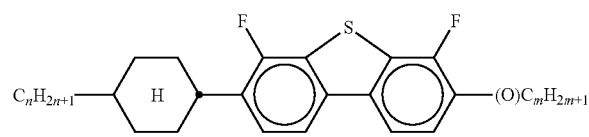
CB(S)-n-(O)m
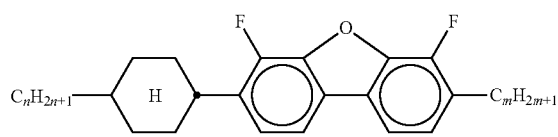
CB-n-m
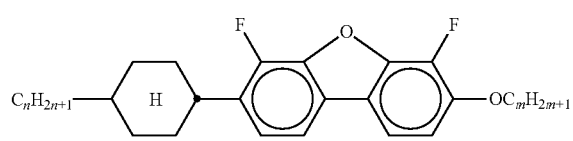
CB-n-Om
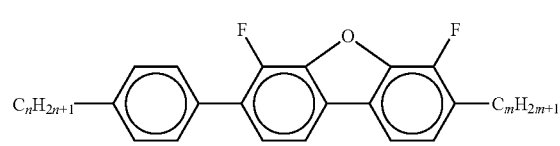
PB-n-m
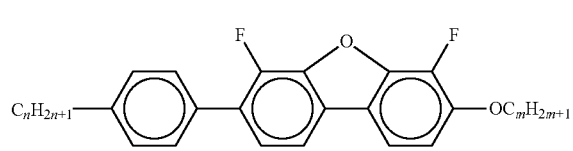
PB-n-Om
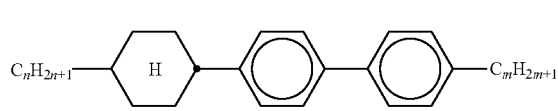
BCH-nm
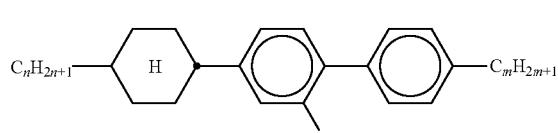
BCH-nmF TABLE A-continued
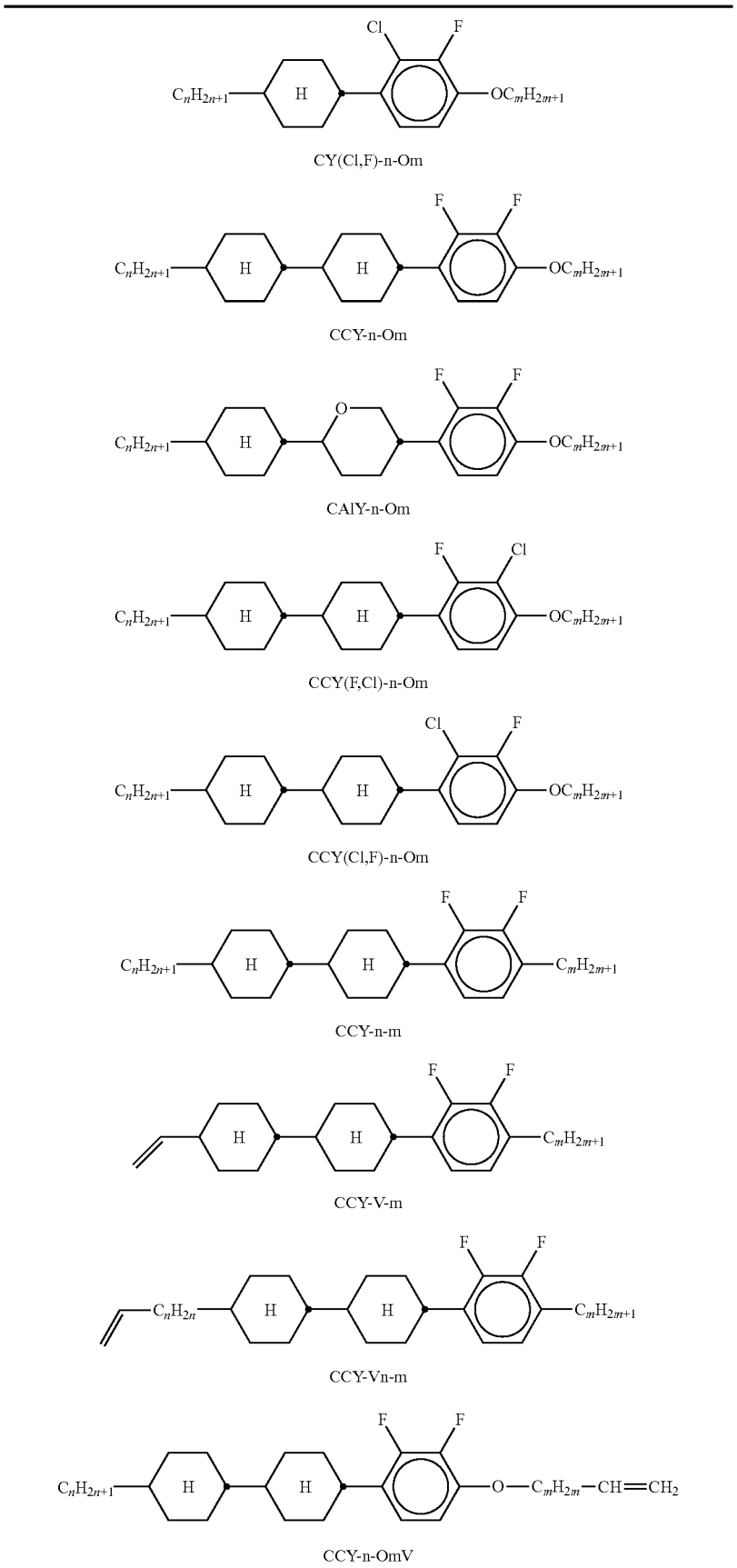

TABLE A-continued
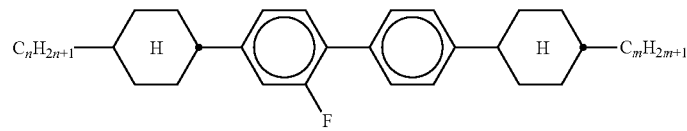
CBC-nmF
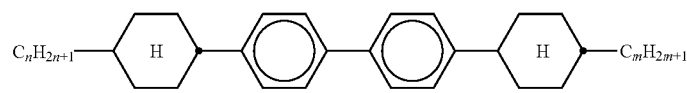
CBC-nm
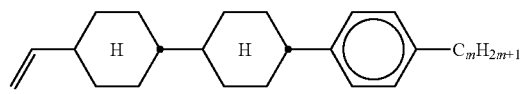
CCP-V-m
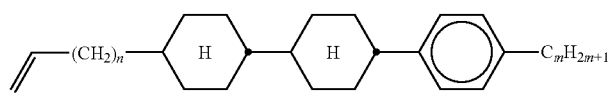
CCP-Vn-m
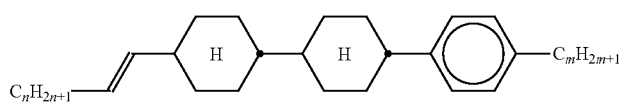
CCP-nV-m
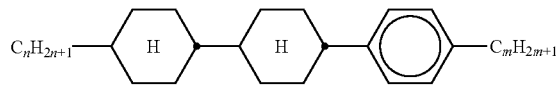
CCP-n-m
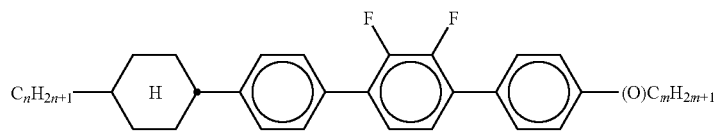
CPYP-n-(O)m
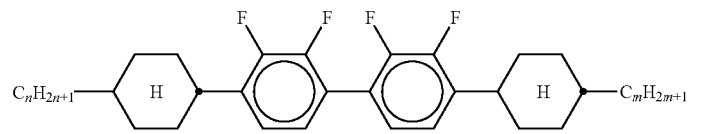
CYYC-n-m
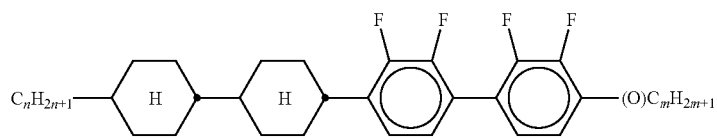
CCYY-n-(O)m
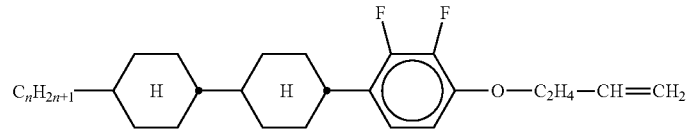
CCY-n-O2V TABLE A-continued
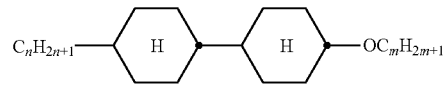
CCH-nOm
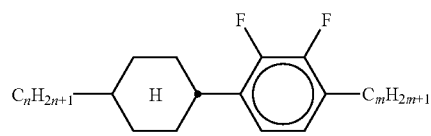
CY-n-m
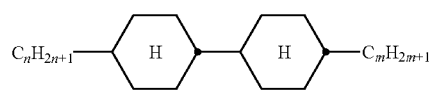
CCH-nm
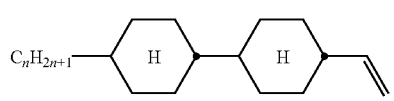
CC-n-V
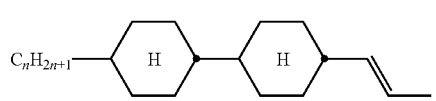
CC-n-V1
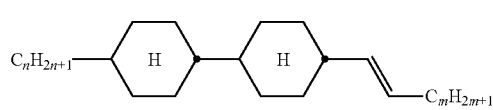
CC-n-Vm
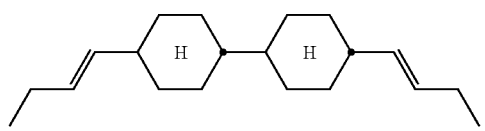
CC-2V-V2
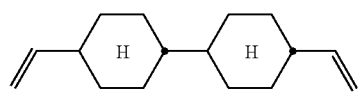
CC-V-V
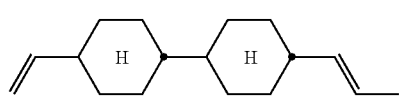
CC-V-V1
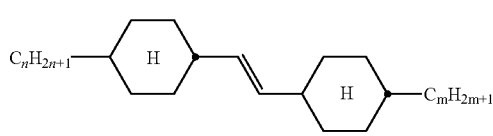
CVC-n-m TABLE A-continued
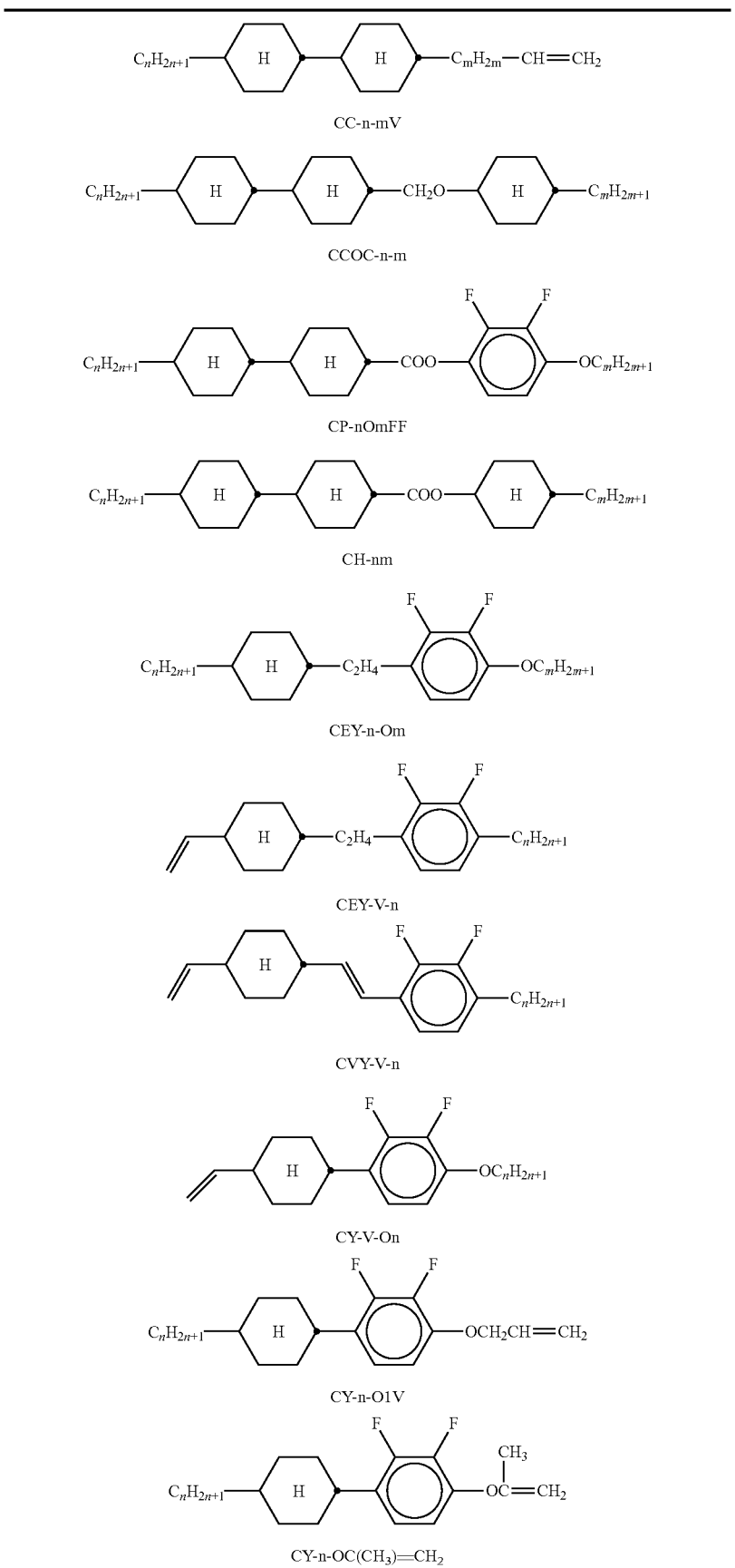

TABLE A-continued
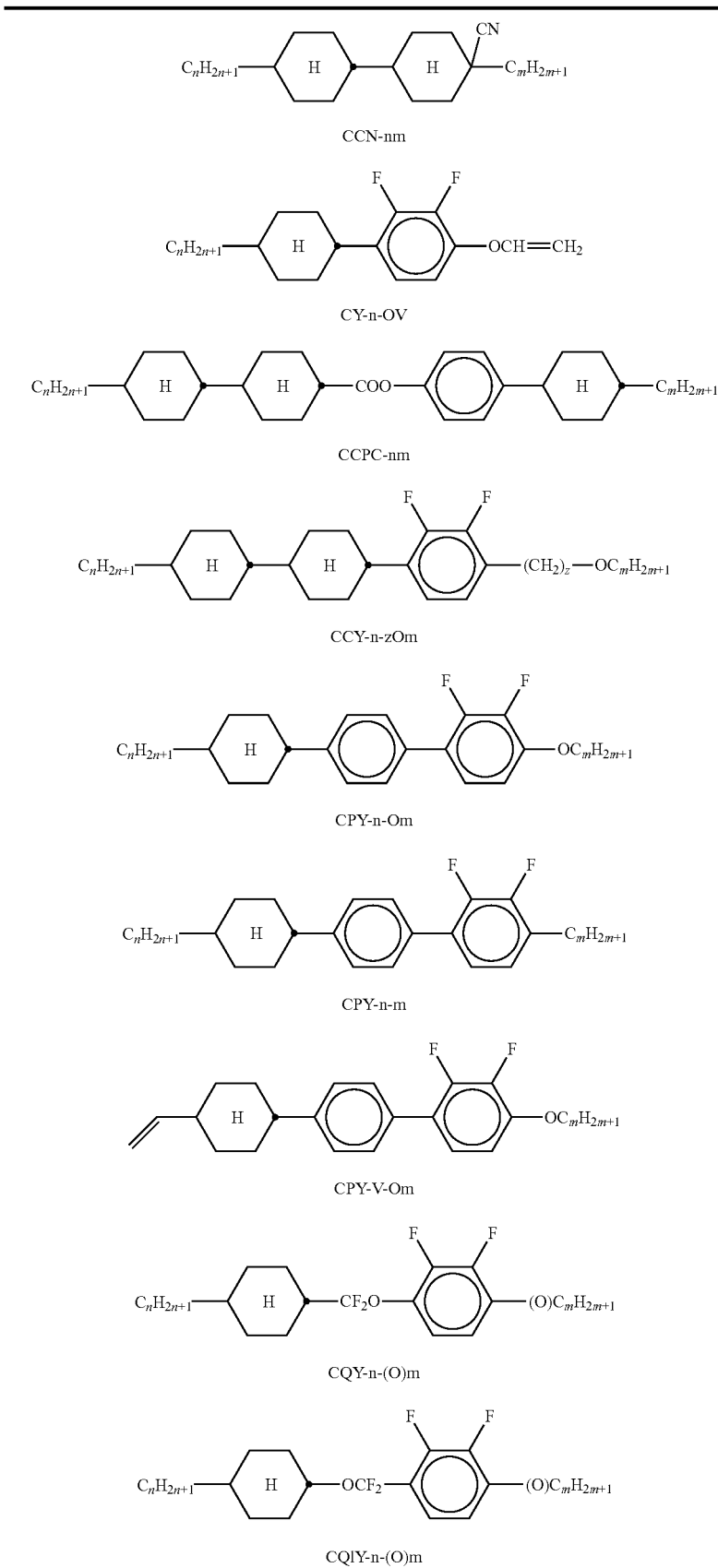

TABLE A-continued
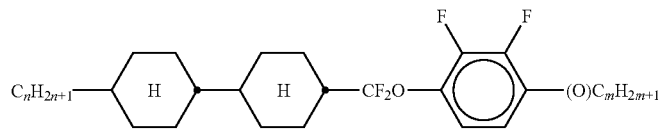
CCQY-n-(O)m
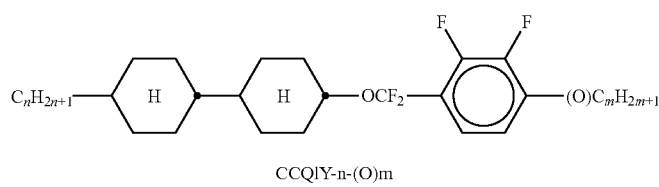
CCQIY-n-(O)m
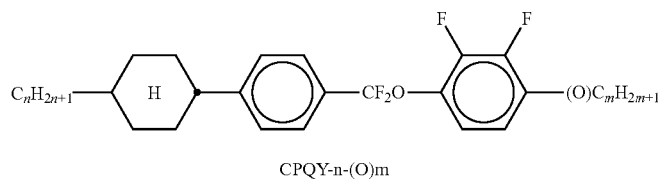
CPQY-n-(O)m
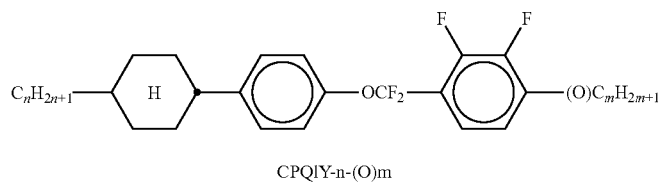
CPQIY-n-(O)m
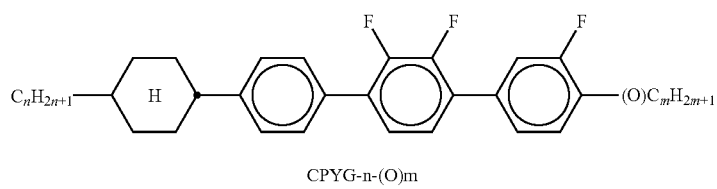
CPYG-n-(O)m
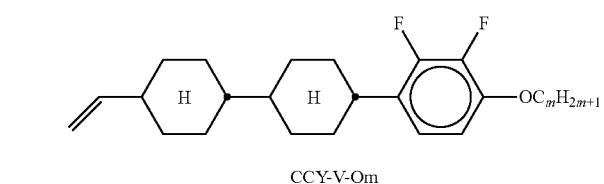
CCY-V-Om
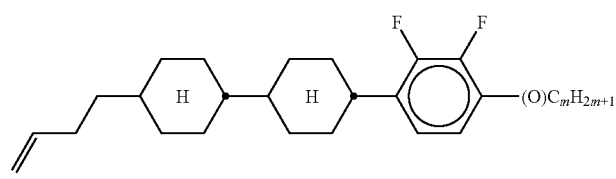
CCY-V2-(O)m
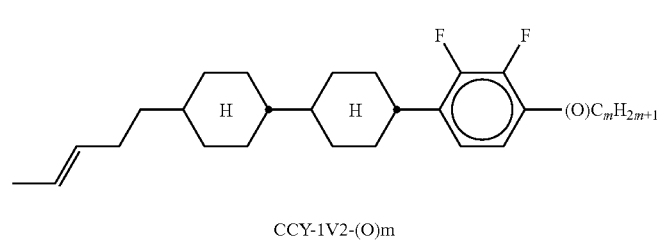
CCY-1V2-(O)m TABLE A-continued
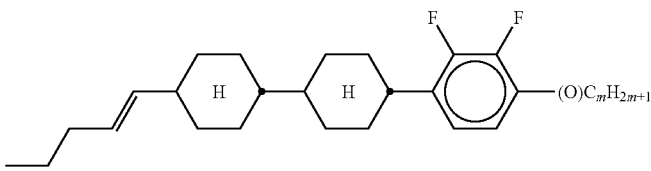
CCY-3V-(O)m
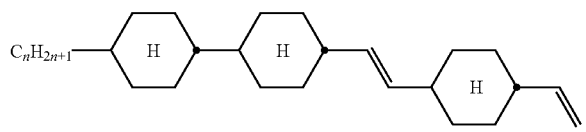
CCVC-n-V
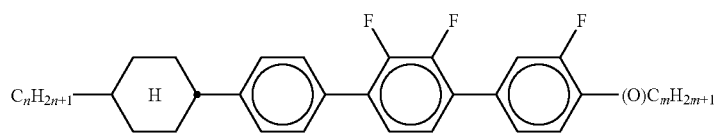
CPYG-n-(O)m
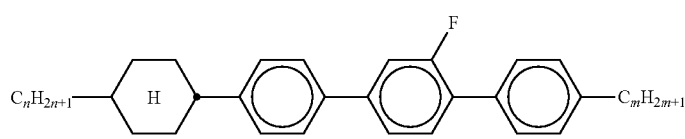
CPGP-n-m
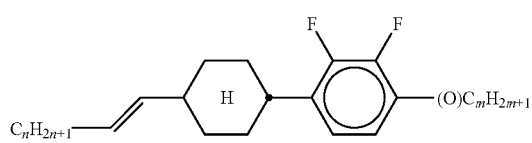
CY-nV-(O)m
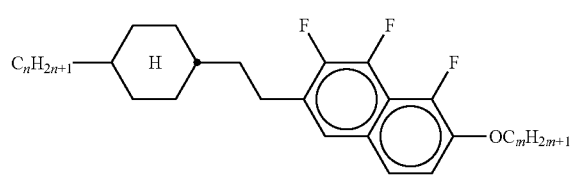
CENaph-n-Om
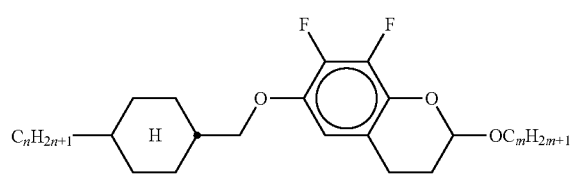
COChrom-n-Om
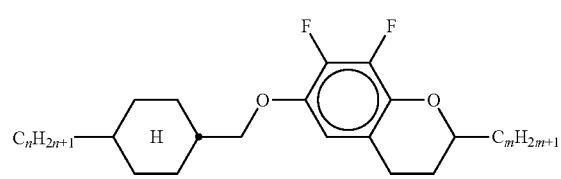
COChrom-n-m TABLE A-continued
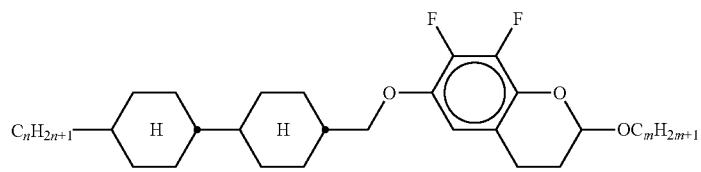
CCOChrom-n-Om
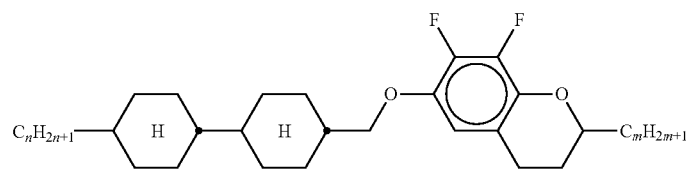
CCOChrom-n-m
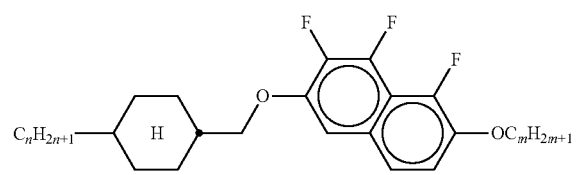
CONaph-n-Om
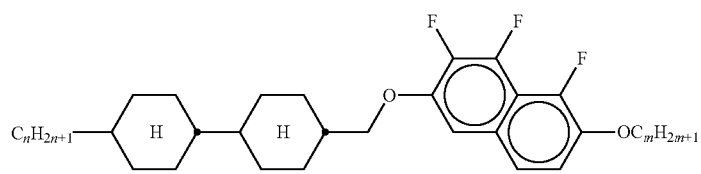
CCONaph-n-Om
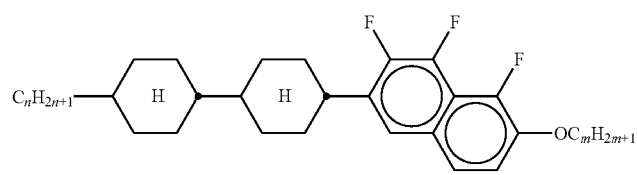
CCNaph-n-Om
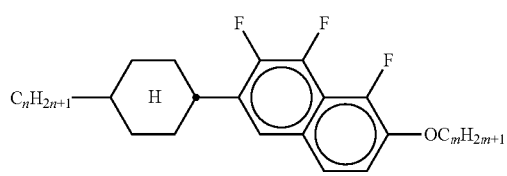
CNaph-n-Om
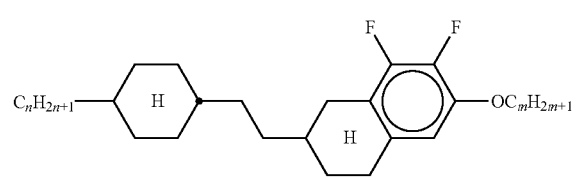
CETNaph-n-Om TABLE A-continued
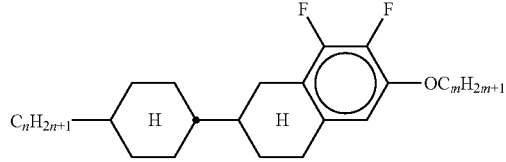
CTNaph-n-Om
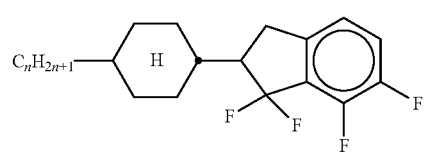
CK-n-F
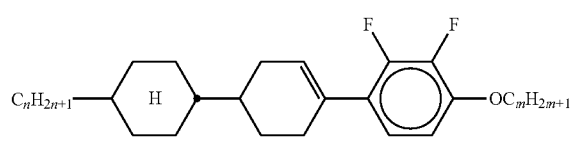
CLY-n-Om
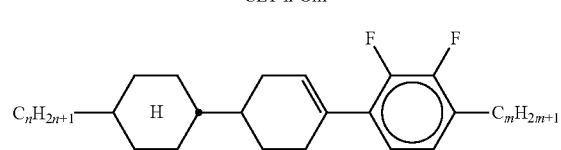
CLY-n-m
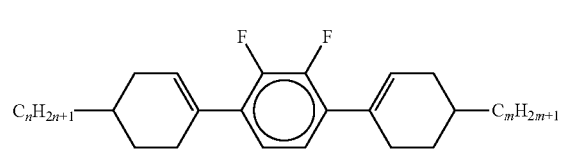
LYLI-n-m
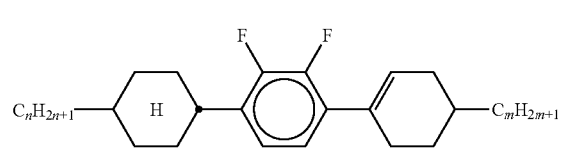
CYLI-n-m
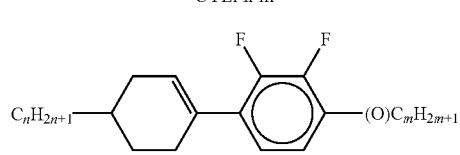
LY-n-(O)m
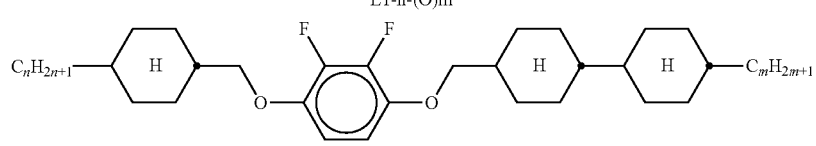
COYOlCC-n-m
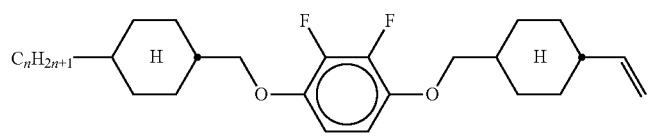
COYOlC-n-V TABLE A-continued
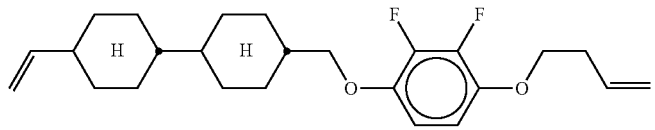
CCOY-V-O2V
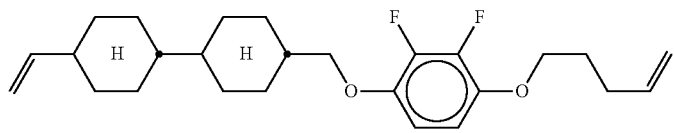
CCOY-V-O3V
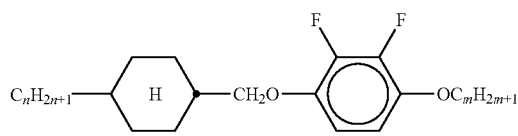
COY-n-Om
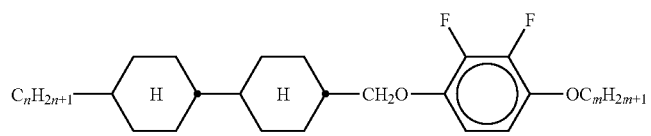
CCOY-n-Om
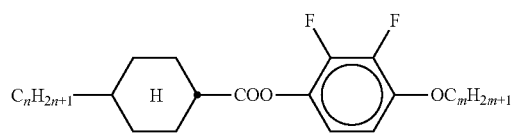
D-nOmFF
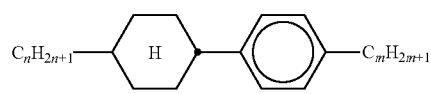
PCH-nm
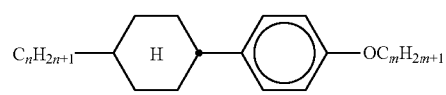
PCH-nOm
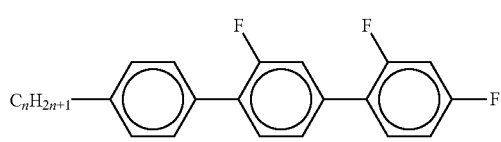
PGIGl-n-F
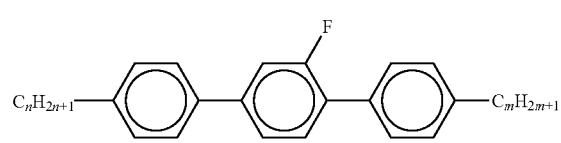
PGP-n-m TABLE A-continued
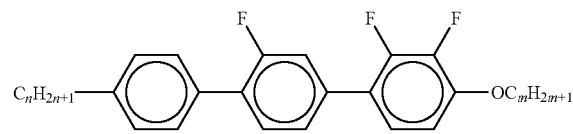
PG1Y-n-Om
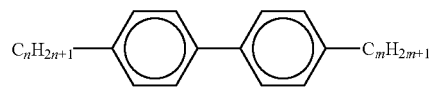
PP-n-m
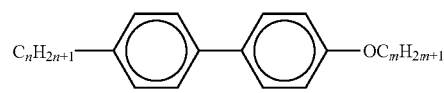
PP-n-Om
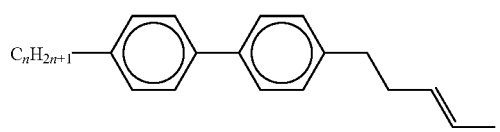
PP-n-2V1
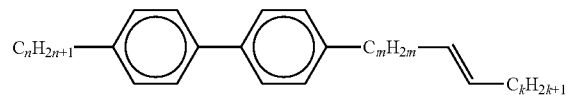
PP-n-mVk
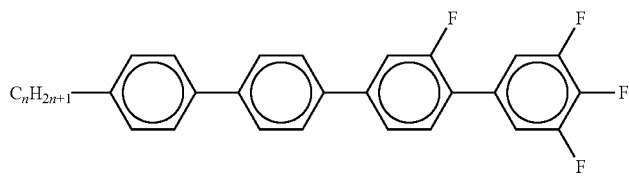
PPGU-n-F
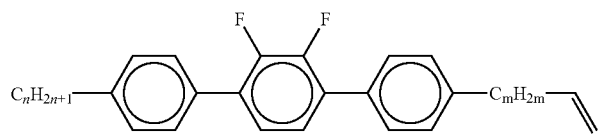
PYP-n-mV
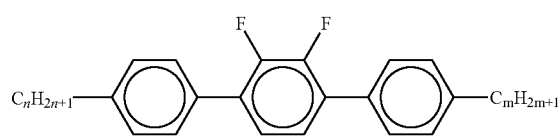
PYP-n-m
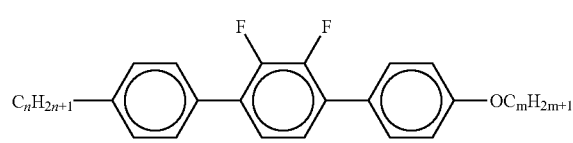
PYP-n-Om TABLE A-continued
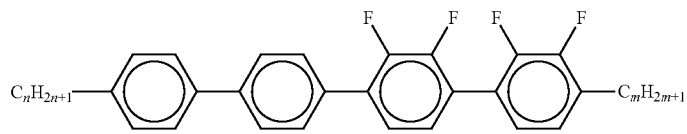
PPYY-n-m
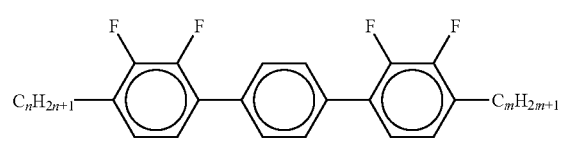
YPY-n-m
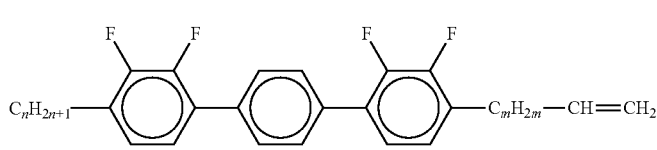
YPY-n-mV
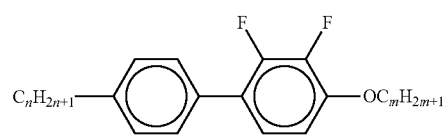
PY-n-Om
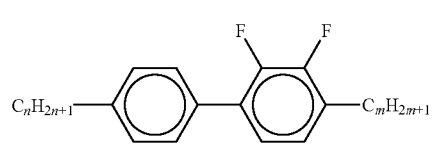
PY-n-m
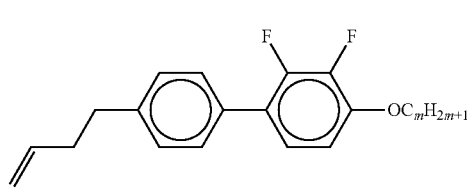
PY-V2-Om
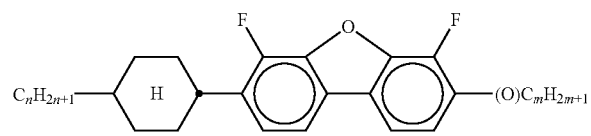
C-DFDBF-n-(O)m
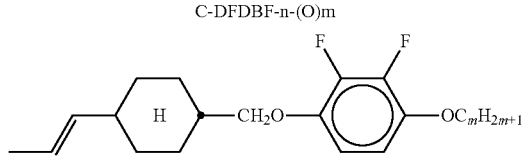
COY-1V-Om
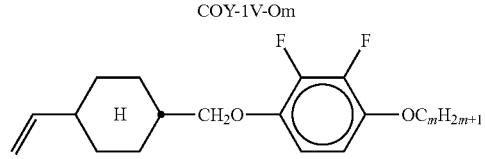
COY-V-Om TABLE A-continued
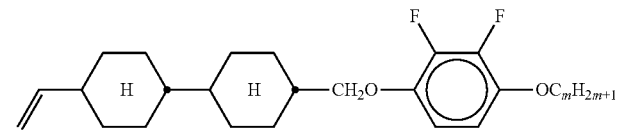
CCOY-V-Om
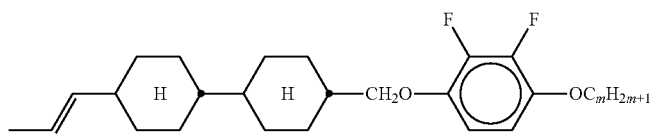
CCOY-1V-Om
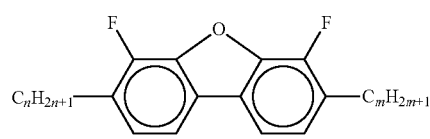
B-n-m
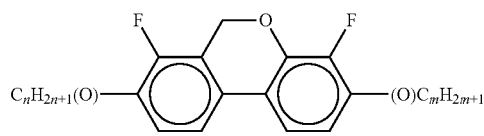
DFDBC-n(O)-(O)m
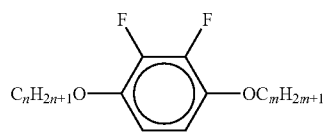
Y-nO-Om
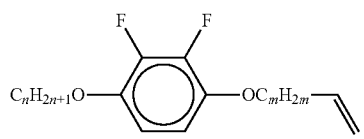
Y-nO-OmV
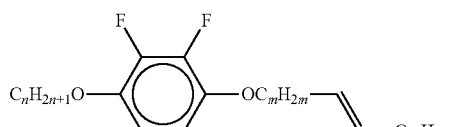
Y-nO-OmVm'
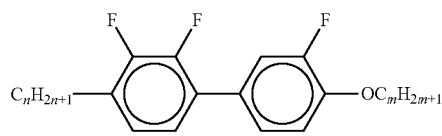
YG-n-Om
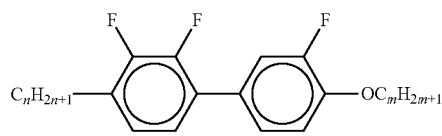
YG-nO-Om TABLE A-continued

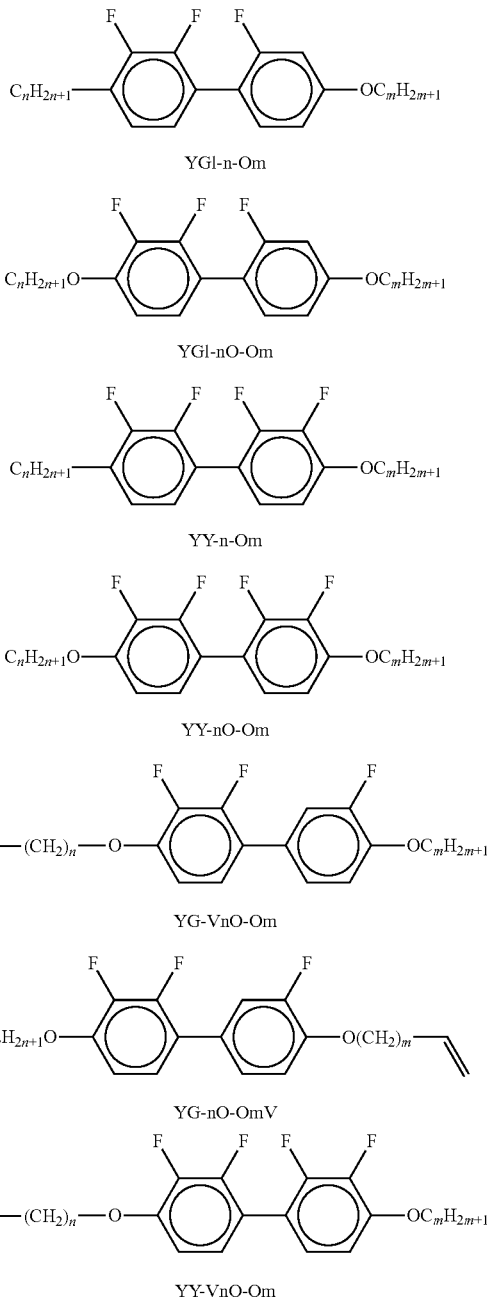

The following abbreviations are used:

(n, m, m', z: each, independently of one another, 1, 2, 3, 4, 5 or 6; (O)$C_mH_{2m+1}$ means $OC_mH_{2m+1}$ or $C_mH_{2m+1}$)

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants, nanoparticles and free-radical scavengers. For example, stabilisers or chiral dopants may be added. Suitable stabilisers for the mixtures according to the invention are, in particular, those listed in Table B.

For example, conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

TABLE B
| | |
|---|---|
| 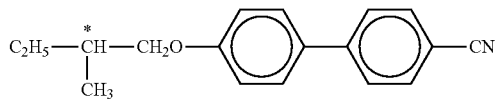 | C 15 |
| 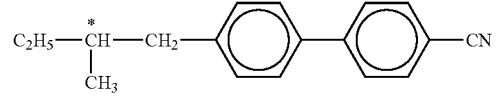 | CB 15 |
| 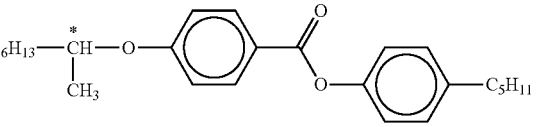 | CM 21 |
| 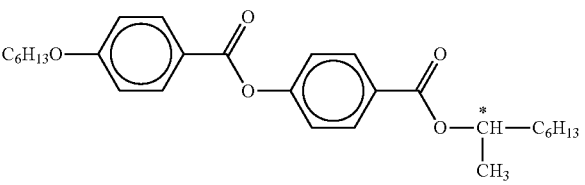 | R/S-811 |
| 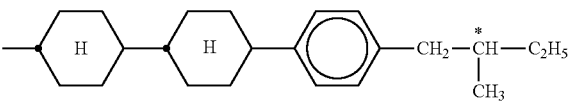 | CM 44 |
| 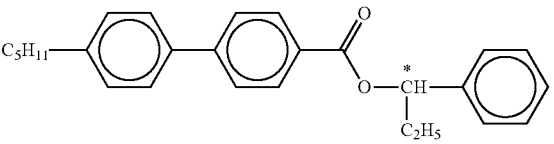 | CM 45 |
| 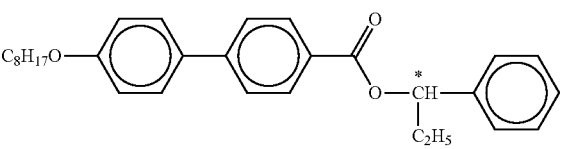 | CM 47 |
| 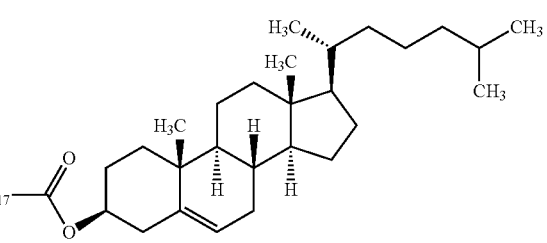 | CN |
| 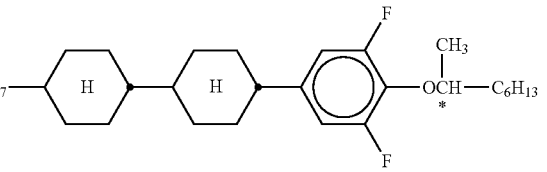 | R/S-2011 |
| 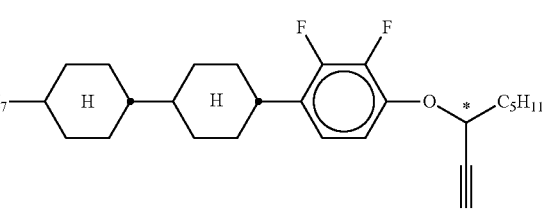 | R/S-3011 |

TABLE B-continued

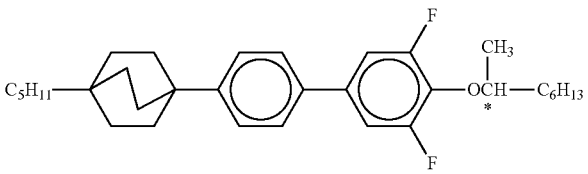
R/S-4011

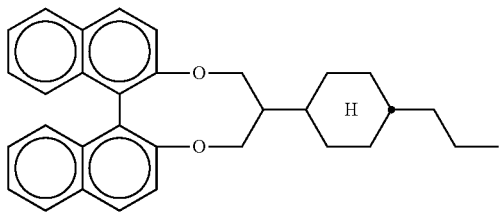
R/S-5011

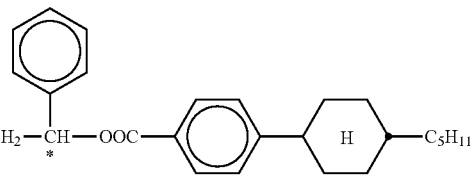
R/S-1011

Table B shows possible dopants which are generally added to the mixtures according to the invention. The mixtures preferably comprise 0-10% by weight, in particular 0.01-5% by weight and particularly preferably 0.01-3% by weight of dopants. If the mixtures comprise only one dopant, it is employed in amounts of 0.01-4% by weight, preferably 0.1-1.0% by weight.

TABLE C

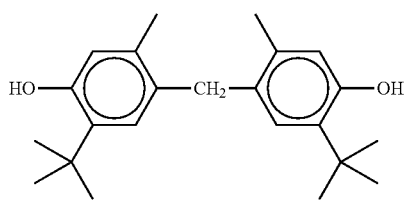

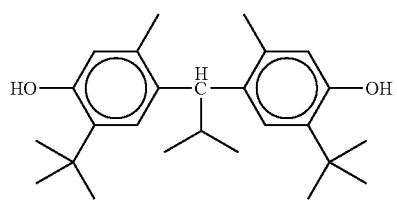

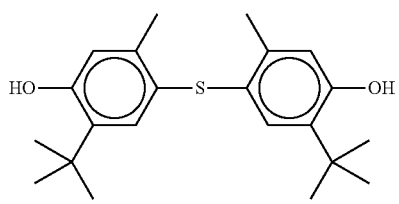

TABLE C-continued
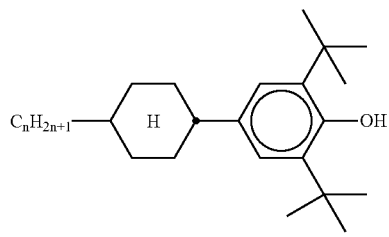
n = 1, 2, 3, 4, 5, 6 or 7
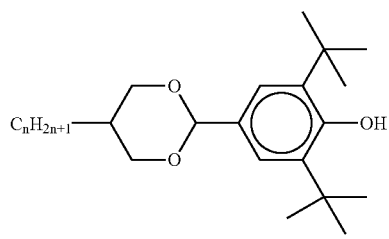
n = 1, 2, 3, 4, 5, 6 or 7
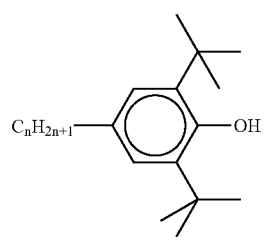
n = 1, 2, 3, 4, 5, 6 or 7
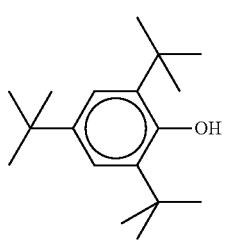
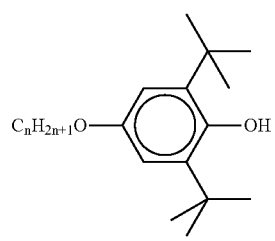
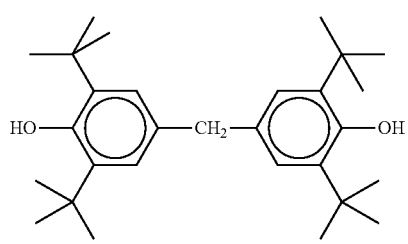

TABLE C-continued
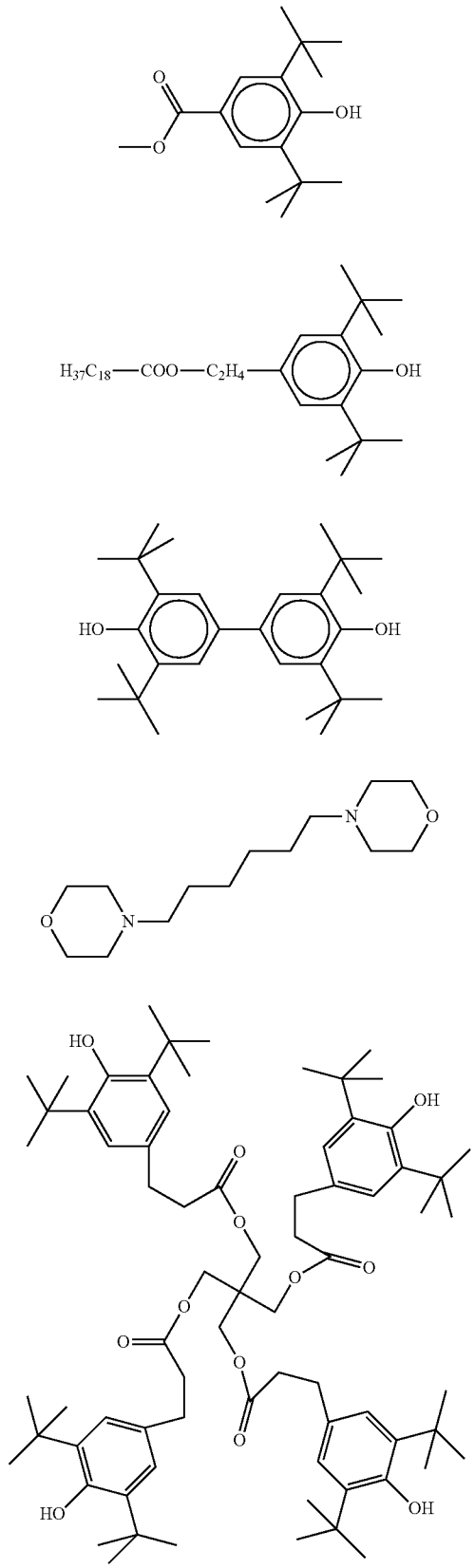

TABLE C-continued
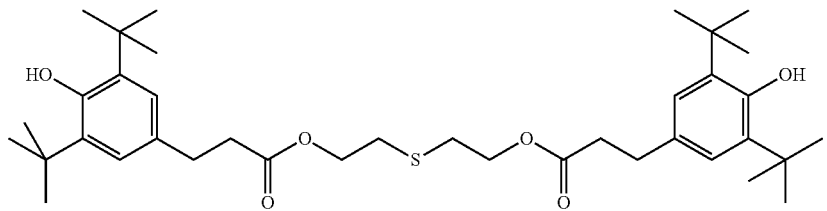 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
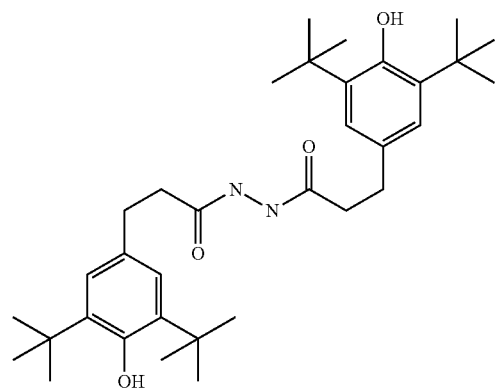 [SMILES: CC(C)(C)c1cc(CCC(=O)NNC(=O)CCc2cc(C(C)(C)C)c(O)c(C(C)(C)C)c2)cc(C(C)(C)C)c1O]
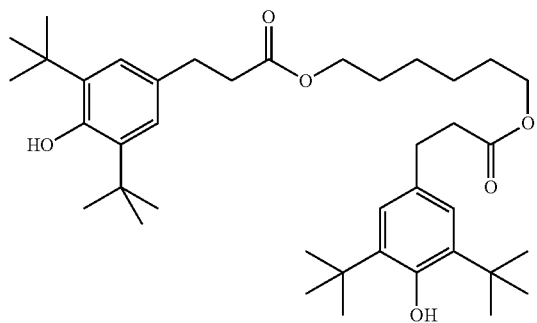 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
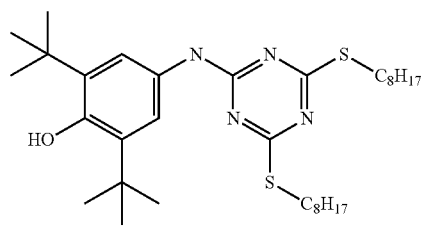

TABLE C-continued
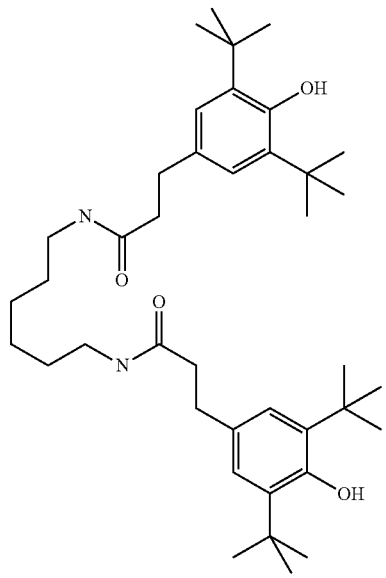 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
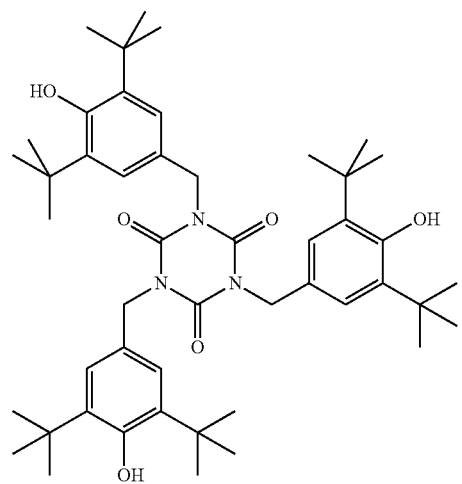 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
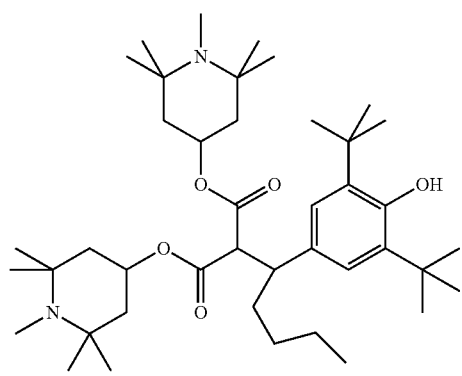 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
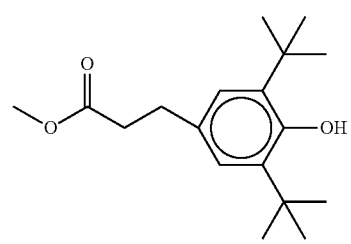

TABLE C-continued
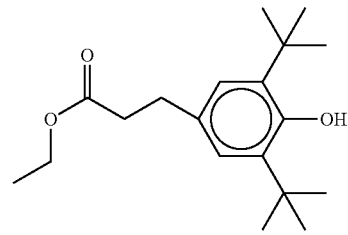
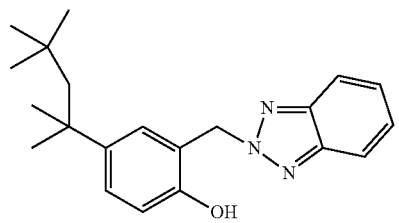 [SMILES: CC(C)(C)CC(C)(C)c1ccc(O)c(Cn2nc3ccccc3n2)c1]
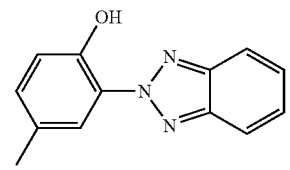 [SMILES: Cc1ccc(O)c(-n2nc3ccccc3n2)c1]
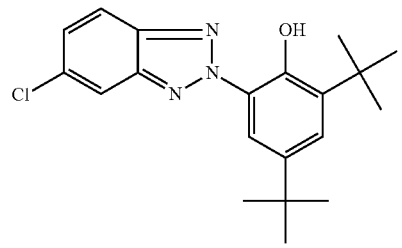 [SMILES: CC(C)(C)c1cc(-n2nc3ccc(Cl)cc3n2)c(O)c(C(C)(C)C)c1]
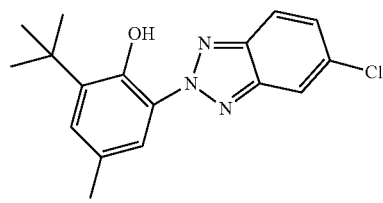 [SMILES: Cc1cc(-n2nc3ccc(Cl)cc3n2)c(O)c(C(C)(C)C)c1]
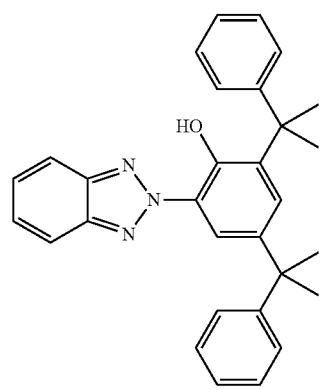 [SMILES: CC(C)(c1ccccc1)c1cc(-n2nc3ccccc3n2)c(O)c(C(C)(C)c2ccccc2)c1]

TABLE C-continued
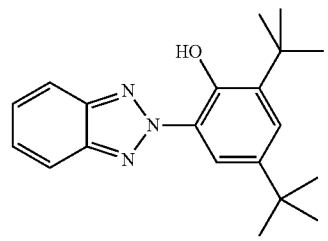 [SMILES: CC(C)(C)c1cc(-n2nc3ccccc3n2)c(O)c(C(C)(C)C)c1]
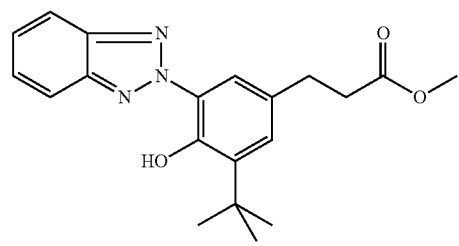 [SMILES: COC(=O)CCc1cc(-n2nc3ccccc3n2)c(O)c(C(C)(C)C)c1]
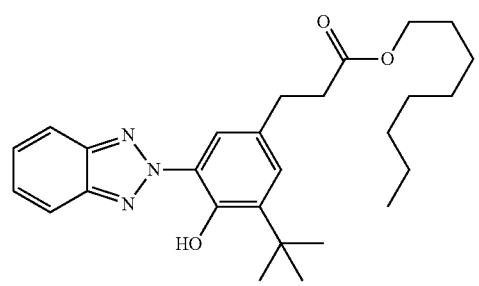 [SMILES: CCCCCCCCOC(=O)CCc1cc(-n2nc3ccccc3n2)c(O)c(C(C)(C)C)c1]
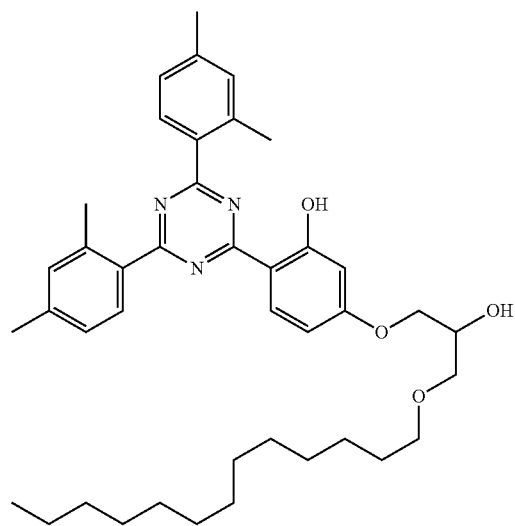 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
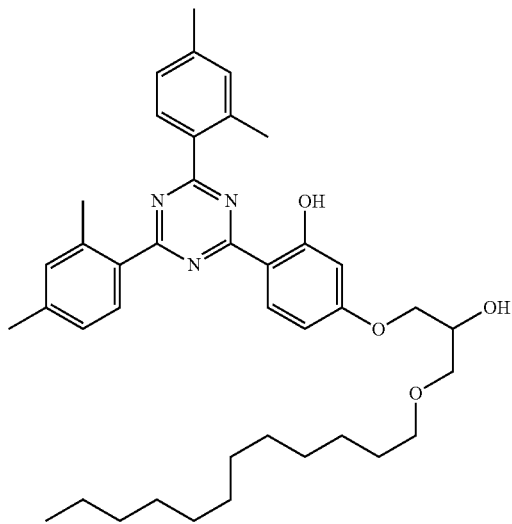 [SMILES: CCCCCCCCCCCCOCC(O)COc1ccc(-c2nc(-c3ccc(C)cc3C)nc(-c3ccc(C)cc3C)n2)c(O)c1]
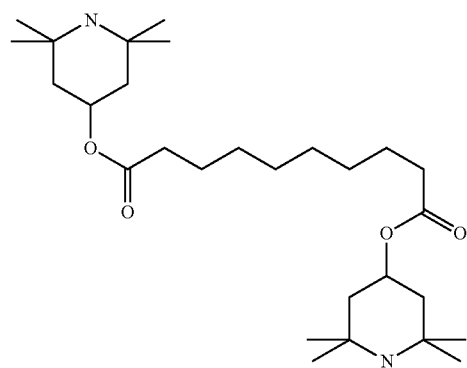
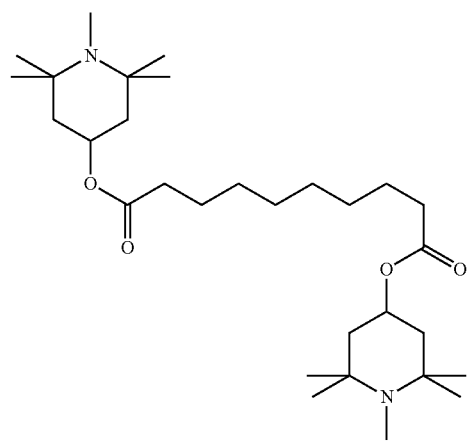

TABLE C-continued

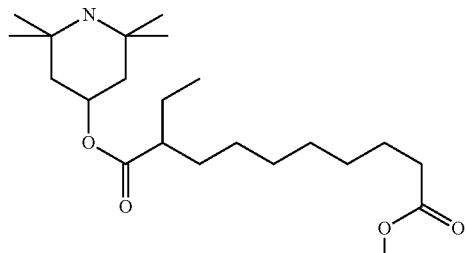

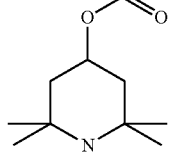

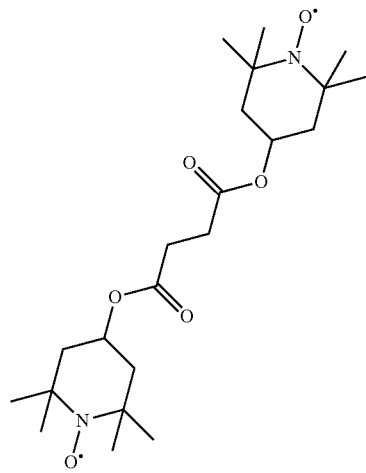

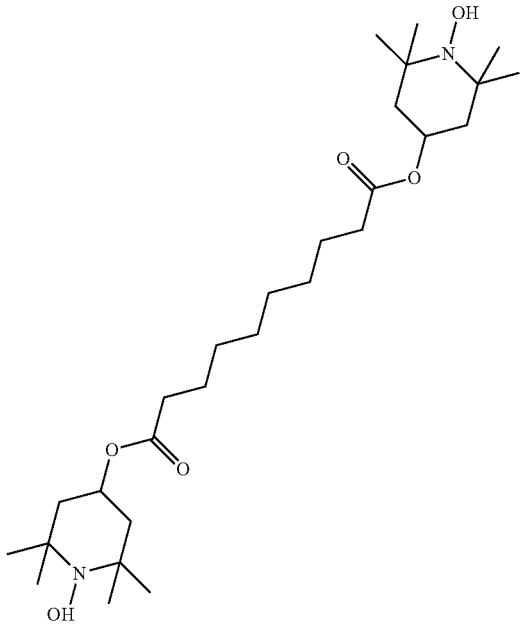

Stabilisers which can be added, for example, to the mixtures according to the invention in amounts of 0-10% by weight are shown below.

The medium according to the invention particularly preferably comprises Tinuvin® 770 (bis(2,2,6,6-tetramethyl-4-piperidyl) sebacate), preferably in amounts of 0.001-5% by weight, based on the liquid-crystalline medium.

Examples of preferred further dichroic dyes which may be used in the liquid crystalline media according to the invention are listed in Table D:

TABLE D
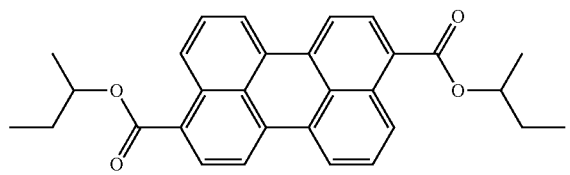 [SMILES: CCC(C)OC(=O)c1ccc2c3cccc4c(C(=O)OC(C)CC)ccc(c5cccc1c52)c43]
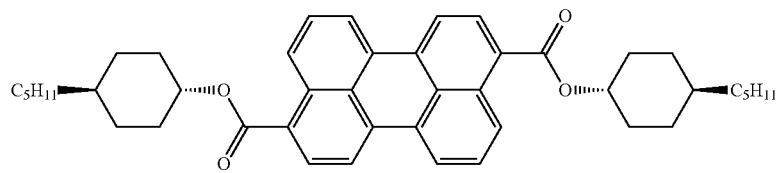
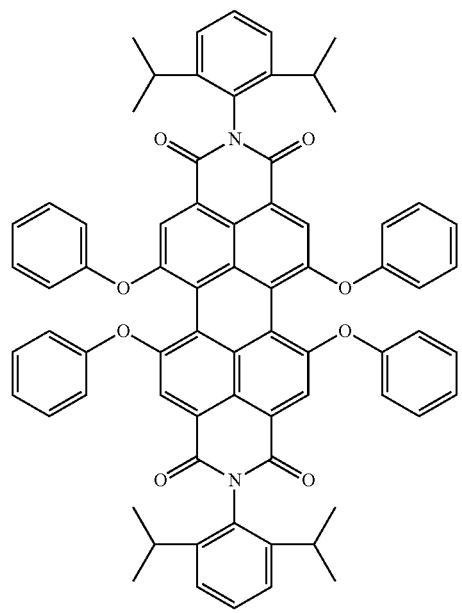 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]
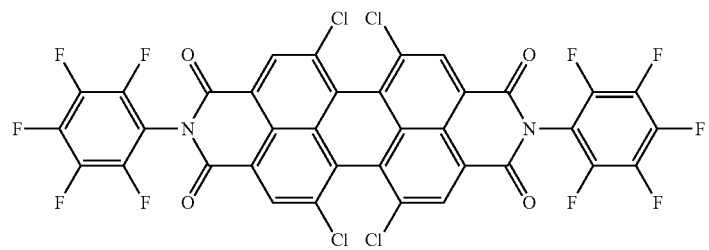 [SMILES: O=C1c2cc(Cl)c3c4c(Cl)cc5c6c(cc(Cl)c(c7c(Cl)cc(c2c37)C(=O)N1c1c(F)c(F)c(F)c(F)c1F)c64)C(=O)N(c1c(F)c(F)c(F)c(F)c1F)C5=O]
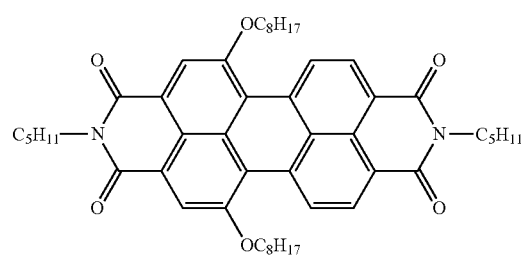
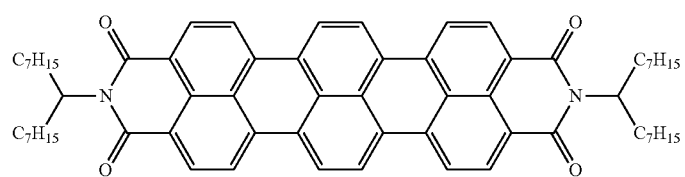

TABLE D-continued
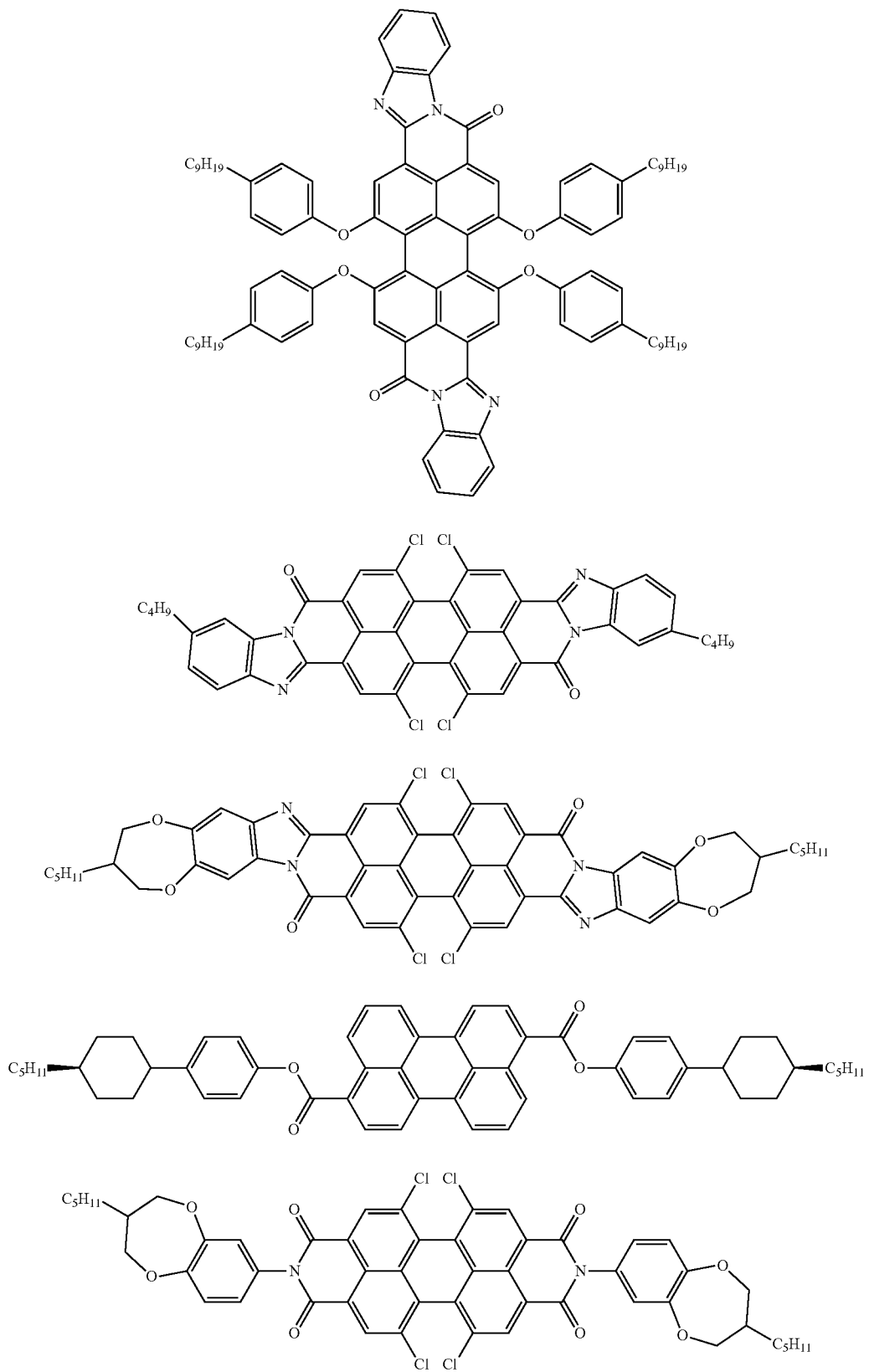

TABLE D-continued
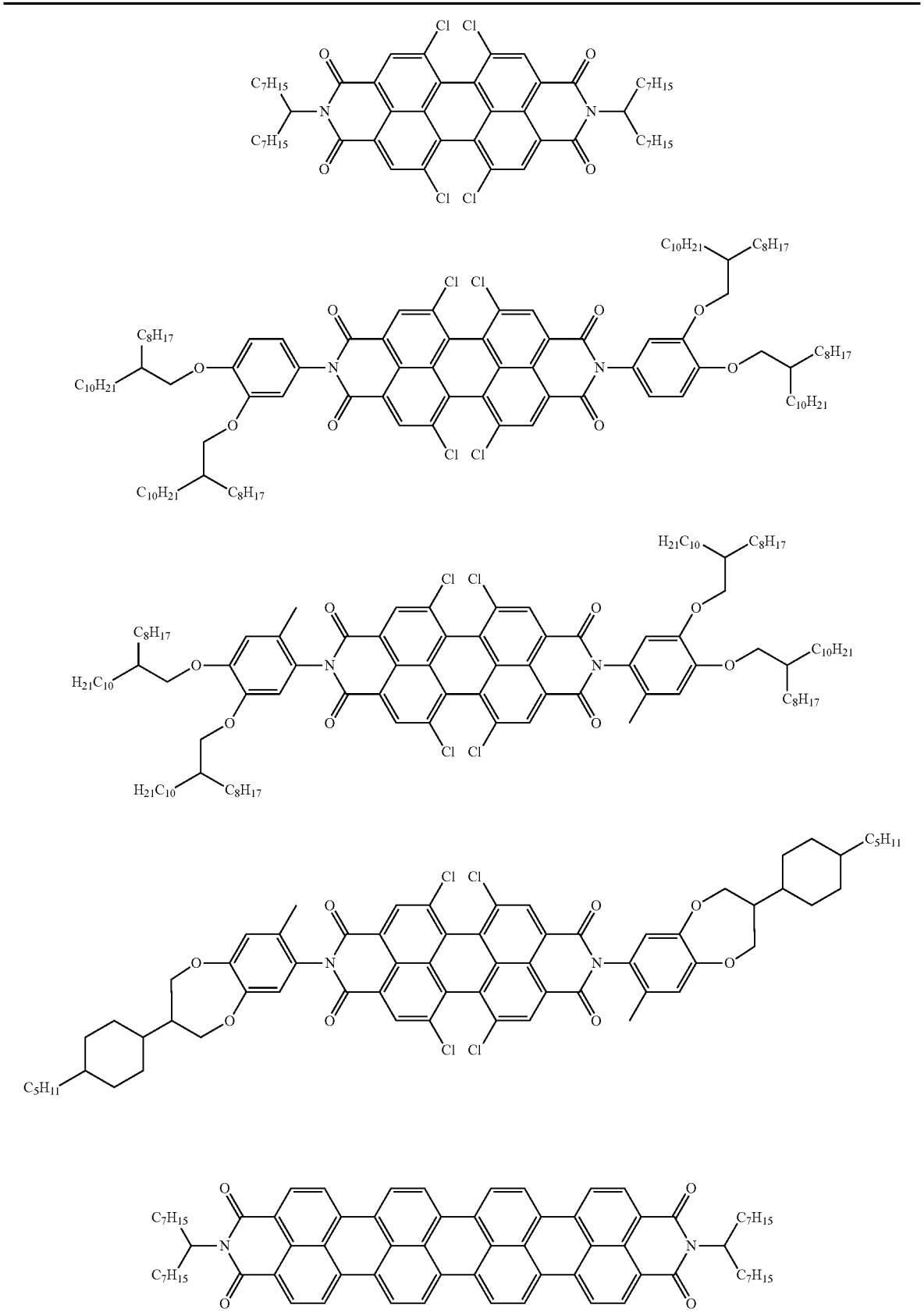

TABLE D-continued
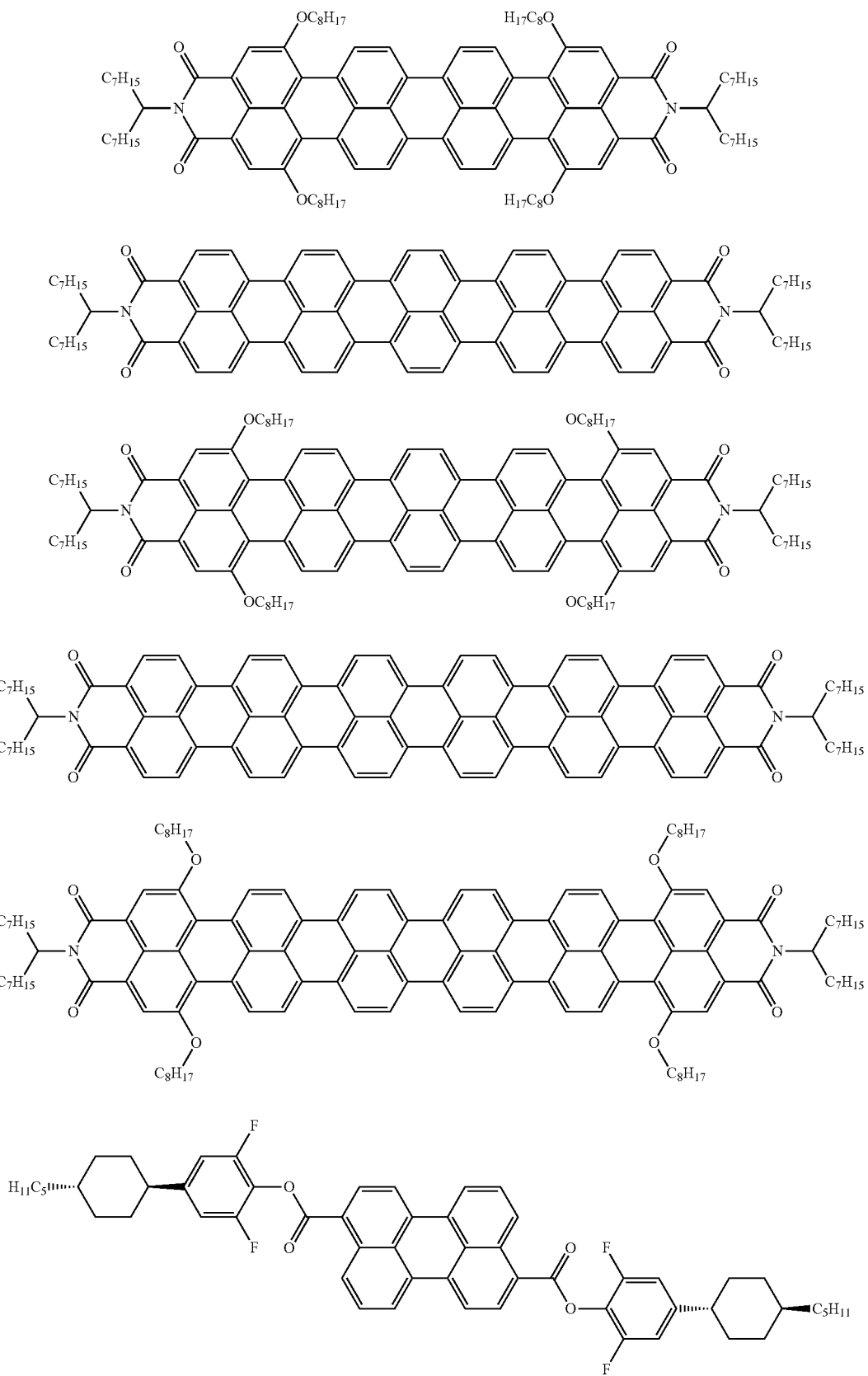

TABLE D-continued

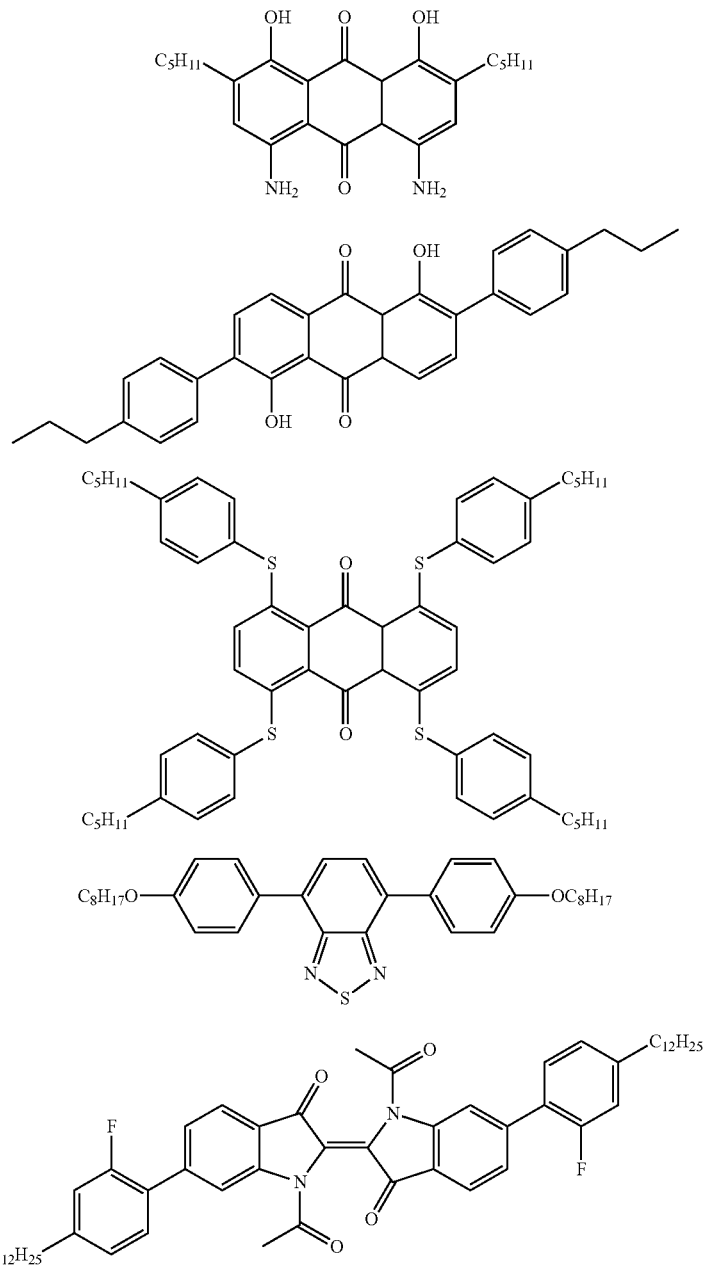

WORKING EXAMPLES

The following examples are intended to explain the invention without limiting it. In the examples, m.p. denotes the melting point and C denotes the clearing point of a liquid-crystalline substance in degrees Celsius; boiling temperatures are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius.

The host mixture used for determination of the optical anisotropy Δn of the compounds of the formula I is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below, the symbols and abbreviations have the following meanings:

$V_o$ threshold voltage, capacitive [V] at 20° C.

Δn the optical anisotropy measured at 20° C. and 589 nm

Δε the dielectric anisotropy at 20° C. and 1 kHz
cl.p. clearing point [° C.]
$K_1$ elastic constant, "splay" deformation at 20° C. [pN]
$K_3$ elastic constant, "bend" deformation at 20° C. [pN]
$\gamma_1$ rotational viscosity measured at 20° C. [mPa·s], determined by the rotation method in a magnetic field
LTS low-temperature stability (nematic phase), determined in test cells.

The display used for measurement of the threshold voltage has two plane-parallel outer plates at a separation of 20 μm and electrode layers with alignment layers comprising SE-1211 (Nissan Chemicals) on top on the insides of the outer plates, which effect a homeotropic alignment of the liquid crystals.

All concentrations in this application, unless explicitly indicated otherwise, relate to the corresponding mixture or mixture component. All physical properties are determined in accordance with "Merck Liquid Crystals, Physical Properties of Liquid Crystals", status November 1997, Merck KGaA, Germany, and apply to a temperature of 20° C., unless explicitly indicated otherwise.

MIXTURE EXAMPLES

Comparative Example C1

| | | | |
|---|---|---|---|
| CBC-33 | 3.0% | Clearing point [° C.]: | 112.5 |
| CBC-33F | 3.0% | Δn [589 nm, 20° C.]: | 0.1995 |
| CCY-3-O1 | 3.0% | Δε [1 kHz, 20° C.]: | −4.9 |
| CCY-3-O2 | 11.0% | $\varepsilon_\parallel$ [1 kHz, 20° C.]: | 4.1 |
| CPY-2-O2 | 12.0% | $K_1$ [pN, 20° C.]: | 18.0 |
| CPY-3-O2 | 12.0% | $K_3$ [pN, 20° C.]: | 22.8 |
| PGIGI-3-F | 8.0% | | |
| PY-3-O2 | 20.0% | | |
| PYP-2-3 | 14.0% | | |
| PYP-2-4 | 14.0% | | |

Example M1

| | | | |
|---|---|---|---|
| PCH-3 | 10.0% | Clearing point [° C.]: | 100.5 |
| CBC-33 | 3.0% | Δn [589 nm, 20° C.]: | 0.1865 |
| CBC-33F | 2.0% | Δε [1 kHz, 20° C.]: | −1.4 |
| CCY-3-O1 | 3.0% | $\varepsilon_\parallel$ [1 kHz, 20° C.]: | 7.4 |
| CCY-3-O2 | 10.0% | $K_1$ [pN, 20° C.]: | 13.5 |
| CPY-2-O2 | 11.0% | $K_3$ [pN, 20° C.]: | 18.8 |
| CPY-3-O2 | 11.0% | $\gamma_1$ [mPa·s, 20° C.]: | 65 |
| PGIGI-3-F | 7.0% | | |
| PY-3-O2 | 18.0% | | |
| PYP-2-3 | 13.0% | | |
| PYP-2-4 | 12.0% | | |

Example M2

| | | | |
|---|---|---|---|
| PCH-3 | 6.0% | Clearing point [° C.]: | 102 |
| CCY-3-O1 | 8.0% | Δn [589 nm, 20° C.]: | 0.1880 |
| CCY-3-O2 | 11.0% | Δε [1 kHz, 20° C.]: | −3.1 |
| CPY-2-O2 | 12.0% | $\varepsilon_\parallel$ [1 kHz, 20° C.]: | 6.2 |
| CPY-3-O2 | 12.0% | $K_1$ [pN, 20° C.]: | 13.9 |
| PGIGI-3-F | 8.0% | $K_3$ [pN, 20° C.]: | 19.3 |
| PY-3-O2 | 15.0% | $V_0$ [20° C., V]: | 2.65 |
| PYP-2-3 | 14.0% | | |
| PYP-2-4 | 14.0% | | |

Example M3

| | | | |
|---|---|---|---|
| PCH-3 | 6.0% | Clearing point [° C.]: | 111 |
| CCY-3-O1 | 8.0% | Δn [589 nm, 20° C.]: | 0.1912 |
| CCY-3-O2 | 11.0% | Δε [1 kHz, 20° C.]: | −2.9 |
| CPY-2-O2 | 12.0% | $\varepsilon_\parallel$ [1 kHz, 20° C.]: | 6.1 |
| CPY-3-O2 | 15.0% | | |
| PGIGI-3-F | 8.0% | | |
| PY-3-O2 | 10.0% | | |
| PYP-2-3 | 15.0% | | |
| PYP-2-4 | 15.0% | | |

From the Mixtures C1, M1, M2 and M3, guest-host liquid crystal mixtures GHC1, GH1, GH2, GH3 and GH4 are prepared having the compositions given in the tables below, using a dye mixture consisting of the following components Dye-1, Dye-2 and Dye-3, whose different absorption characteristics together result in a black colour, and in the case of GH3, the additives Add-1 and Add-2.

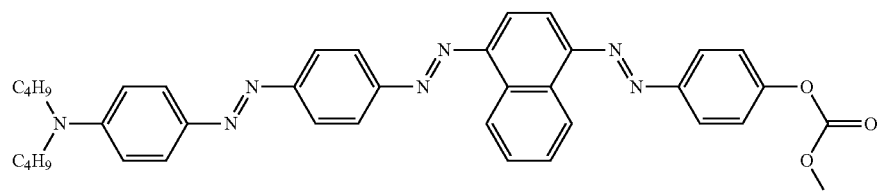

Dye-1

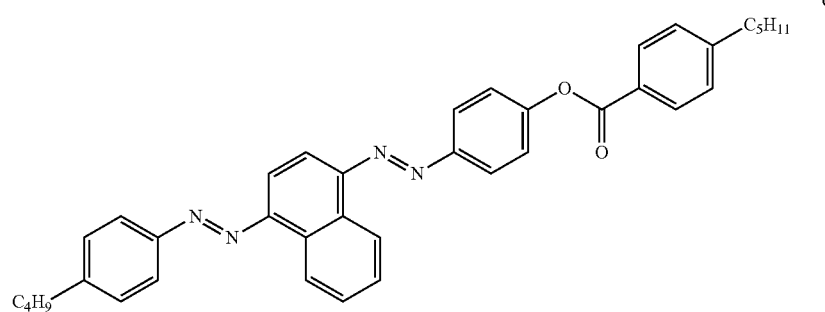

Dye-2

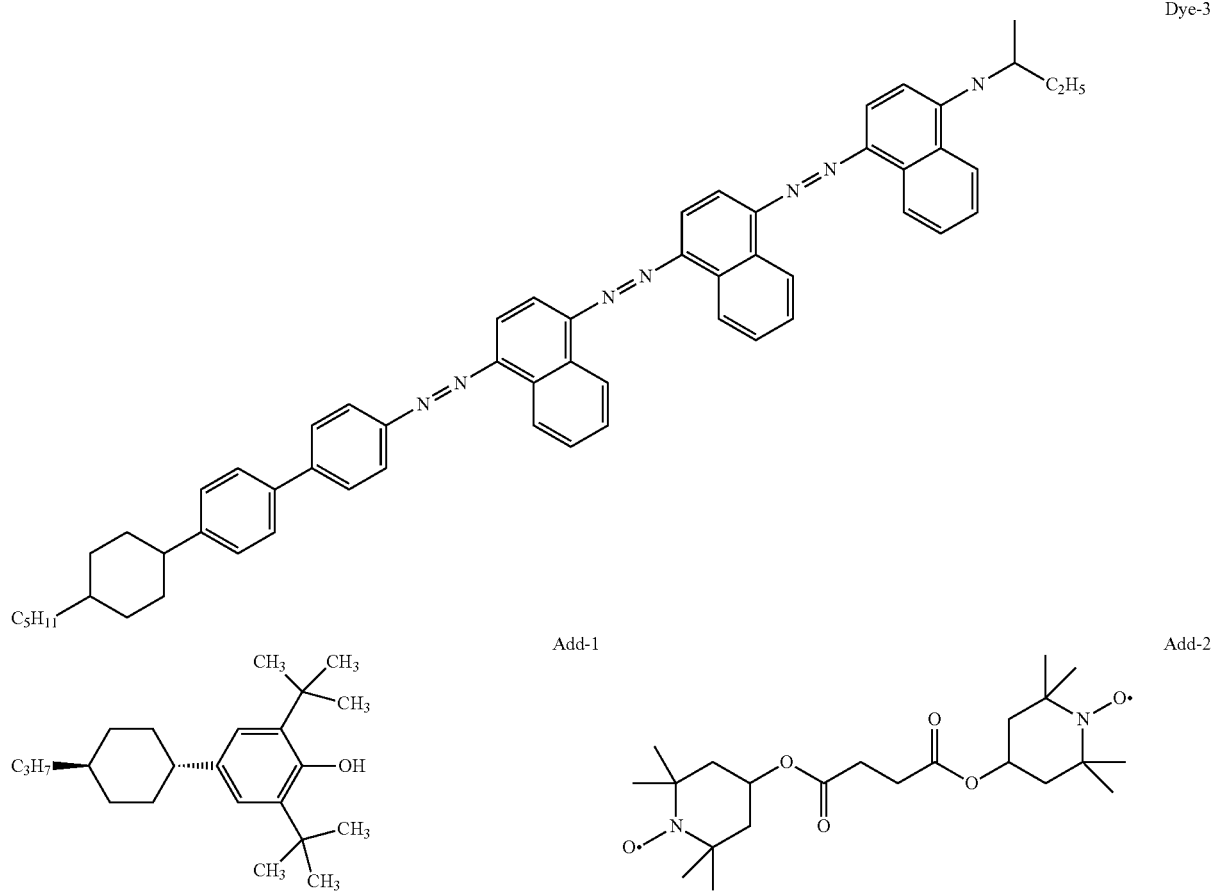
Comparative Example GHC1
| component | weight proportion |
|---|---|
| C1 | 100.0 |
| Dye-1 | 0.338 |
| Dye-2 | 0.511 |
| Dye-3 | 0.950 |
Example GH2
| component | weight proportion |
|---|---|
| M2 | 100.0 |
| Dye 1 | 0.338 |
| Dye 2 | 0.338 |
| Dye 3 | 0.338 |
Example GH1
| component | weight proportion |
|---|---|
| M1 | 100.0 |
| Dye-1 | 0.338 |
| Dye-2 | 0.511 |
| Dye-3 | 0.950 |
Example GH3
| component | weight proportion |
|---|---|
| M2 | 100.0 |
| Dye 1 | 0.338 |
| Dye 2 | 0.511 |
| Dye 3 | 0.950 |
| Add-1 | 0.100 |
| Add-2 | 0.100 |

Example GH4

| component | weight proportion |
|---|---|
| M3 | 100.0 |
| Dye 1 | 0.338 |
| Dye 2 | 0.511 |
| Dye 3 | 0.950 |

Surprisingly, in the mixtures M1, M2 and M3 comprising the compound PCH-3 of formula I, the dye mixture consisting of Dye-1, Dye-2 and Dye-3 shows significantly better solubility than in the mixture of comparative example C1. In the case of Comparative Example GHC1, the concentration of dyes is very close to the saturation limit which bears the risk of crystallisation of dyes in display panels upon storage. In case of the Examples GH1 to GH4 the saturation limit is not reached.

The guest-host mixtures GH1, GH2, GH3 and GH4 have very good properties for applications in devices as for example light shutters, switchable windows and guest host displays because of their high clearing temperature and broad nematic phase ranges, low threshold voltage and very good low temperature stability. Due to the excellent solubility of the dyes Dye-1, Dye-2 and Dye-3 in the mixtures M1, M2 and M3, a high contrast can be achieved having a very good black (dark) state after application of a voltage.

The invention claimed is:

1. A liquid-crystalline medium, comprising one or more compounds
of formula I-1 or I-2

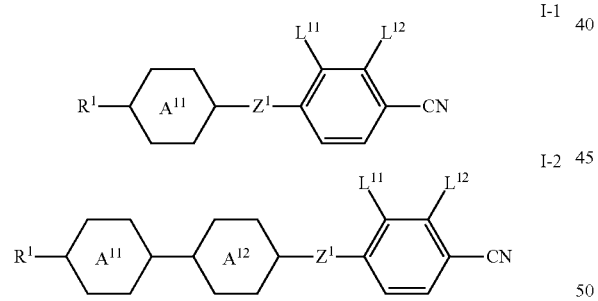

wherein
$R^1$ denotes alkyl having 1 to 7 C atoms or alkenyl having 2 to 7 C atoms,
$A^{12}$ denotes

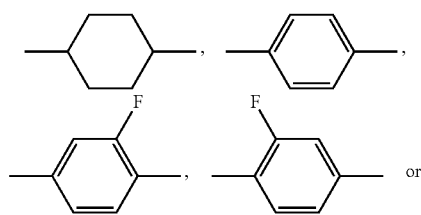

$A^{11}$ denotes

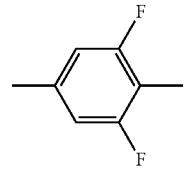

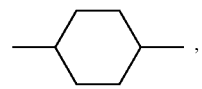

$L^H$ and $L^{12}$ independently of one another, denote H or F, and
$Z^1$ denotes —CO—O—, —O—CO—, —CH$_2$O—, —OCH$_2$—, —CH$_2$CH$_2$—, —OCF$_2$—, —CF$_2$O—, or a single bond,
and
one or more compounds of formulae IIA, IIB or IIC,

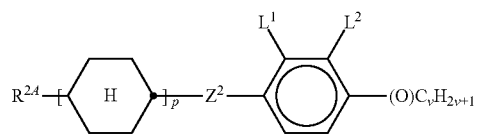

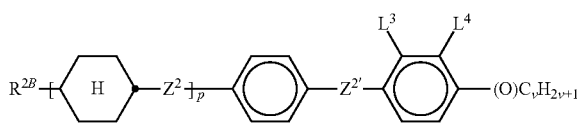

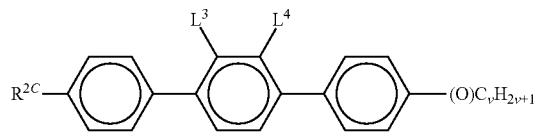

in which
$R^{2A}$, $R^{2B}$ and $R^{2C}$ each, independently of one another, denote H, an alkyl radical having 1 to 15 C atoms or alkenyl radical having 2 to 15 C atoms which is unsubstituted, monosubstituted by CN or CF$_3$ or at least monosubstituted by halogen, where one or more CH$_2$ groups in these radicals may be replaced by —O—, —S—, —C≡C—, —CF$_2$O—, —OCF$_2$—, —OC—O— or —O—CO— in such a way that O atoms are not linked directly to one another, or a cycloalkyl ring having 3 to 6 C atoms,
$L^{1-4}$ each, independently of one another, denote F, Cl, CF$_3$ or CHF$_2$,
$Z^2$ and $Z^{2'}$ each, independently of one another, denote a single bond, —CH$_2$CH$_2$—, —CH=CH—, —CF$_2$O—, —OCF$_2$—, —CH$_2$O—, —OCH$_2$—, —C(O)O—, —OC(O)—, —C$_2$F$_4$—, —CF=CF—, or —CH=CHCH$_2$O—, p denotes 1 or 2,
q denotes 0 or 1, and
denotes 1 to 6
and
one or more dichroic dyes selected from the following formulae
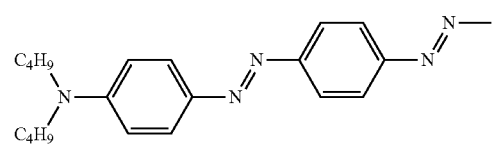
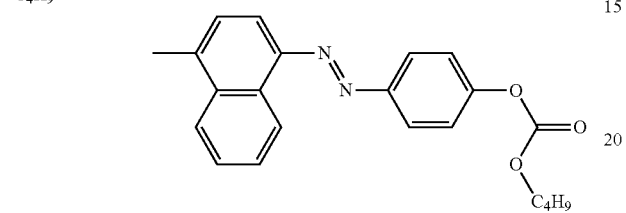
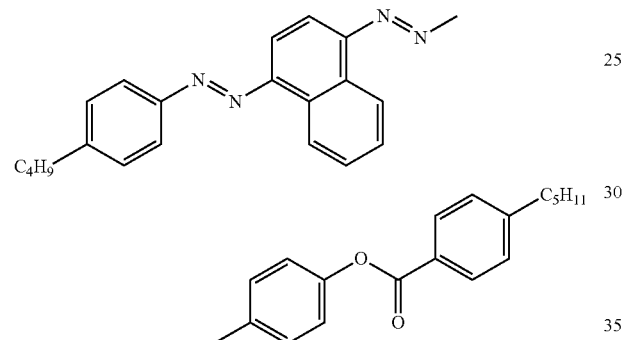
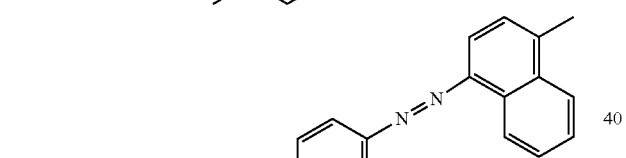
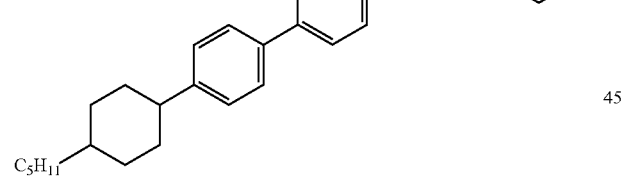
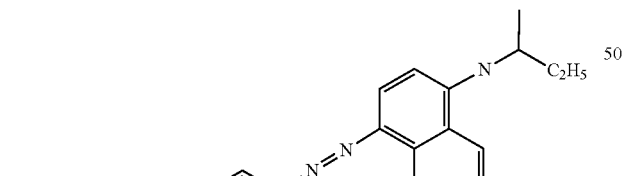
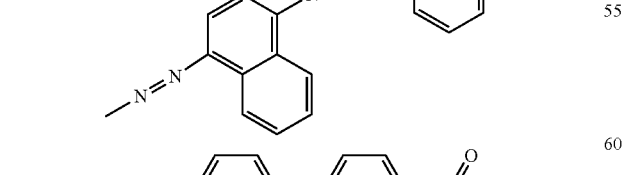
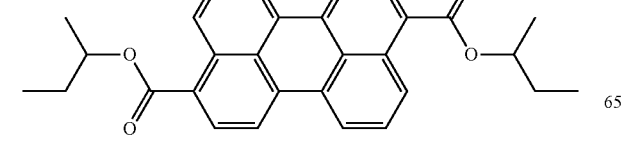
-continued
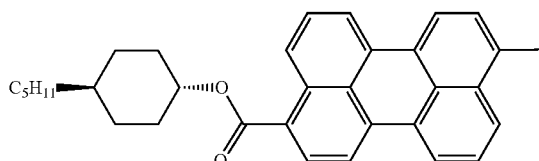
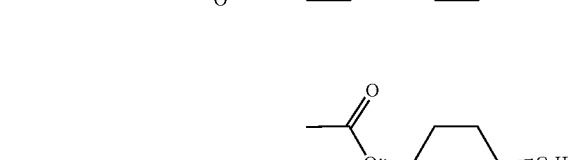
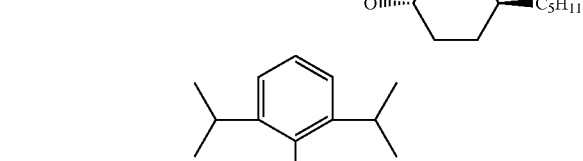
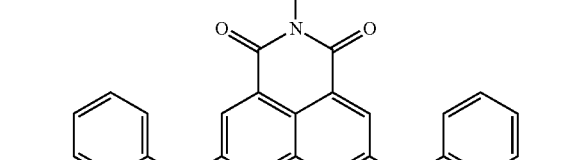
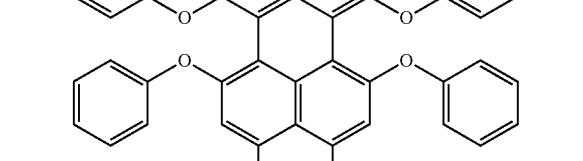
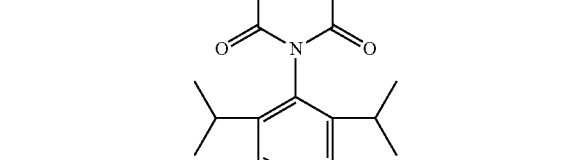
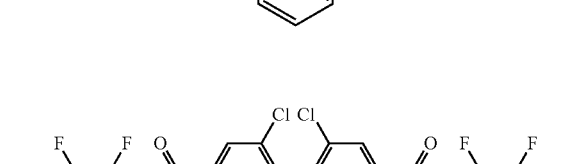
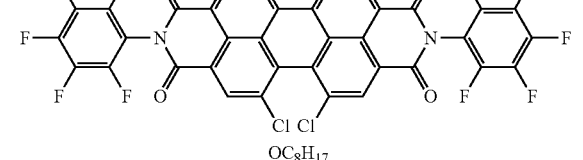
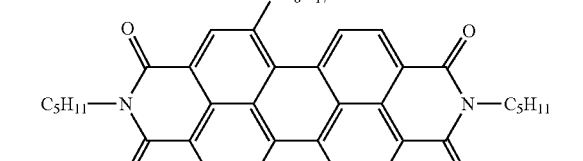
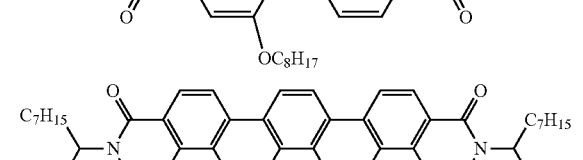
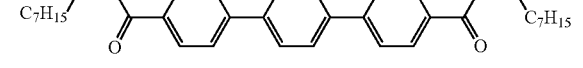

107
-continued
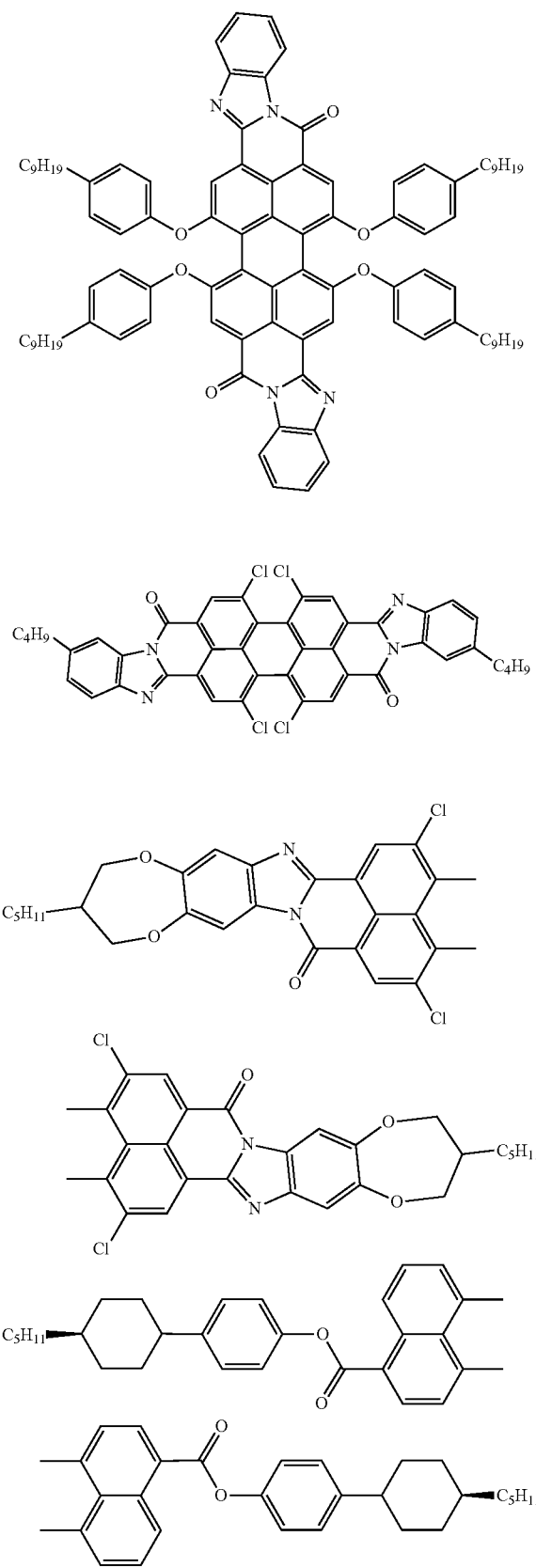
108
-continued
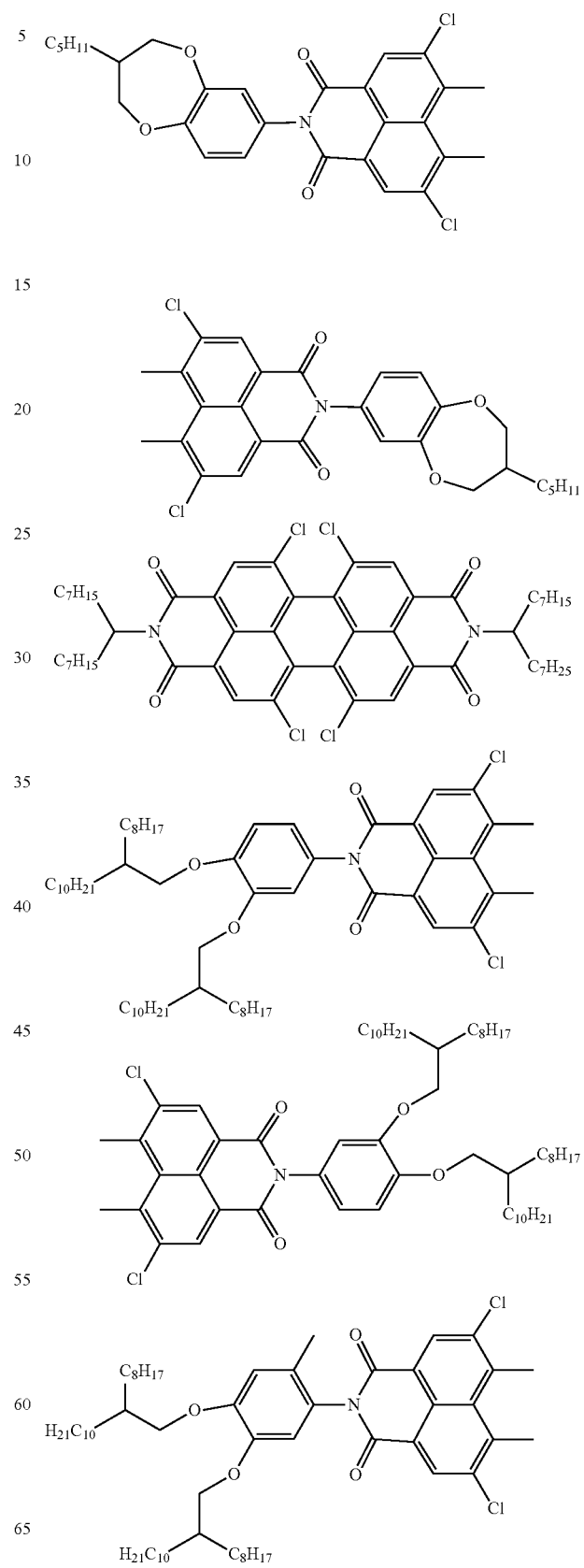

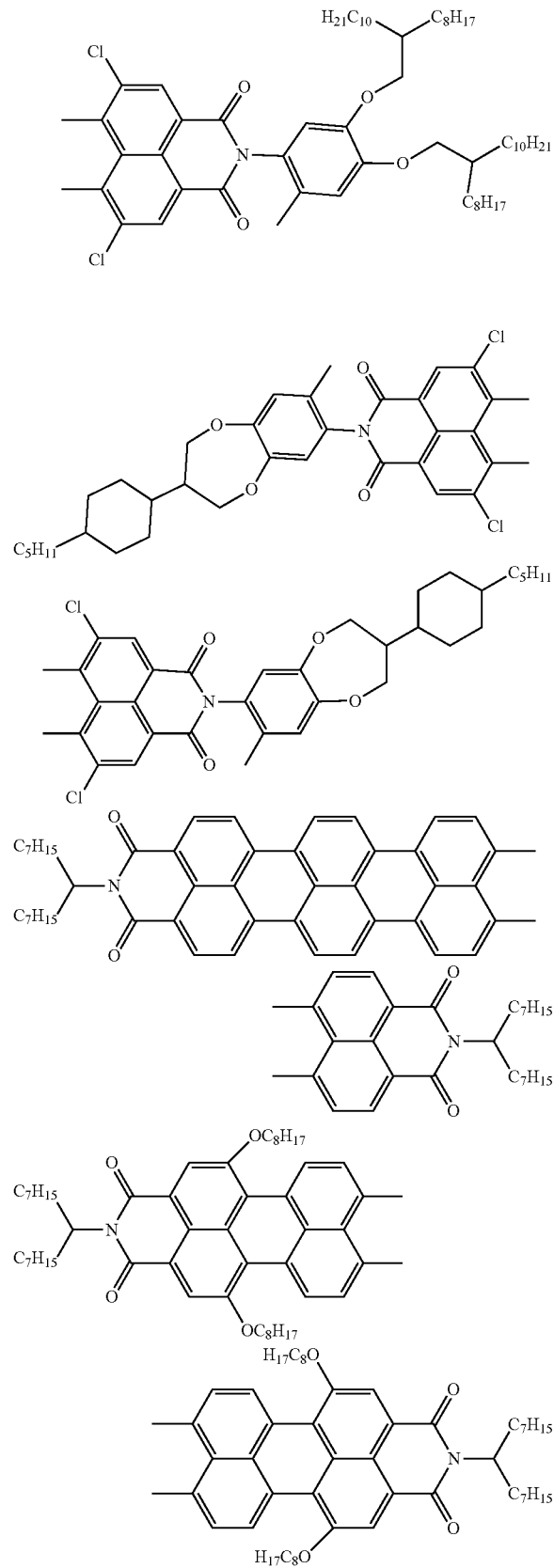
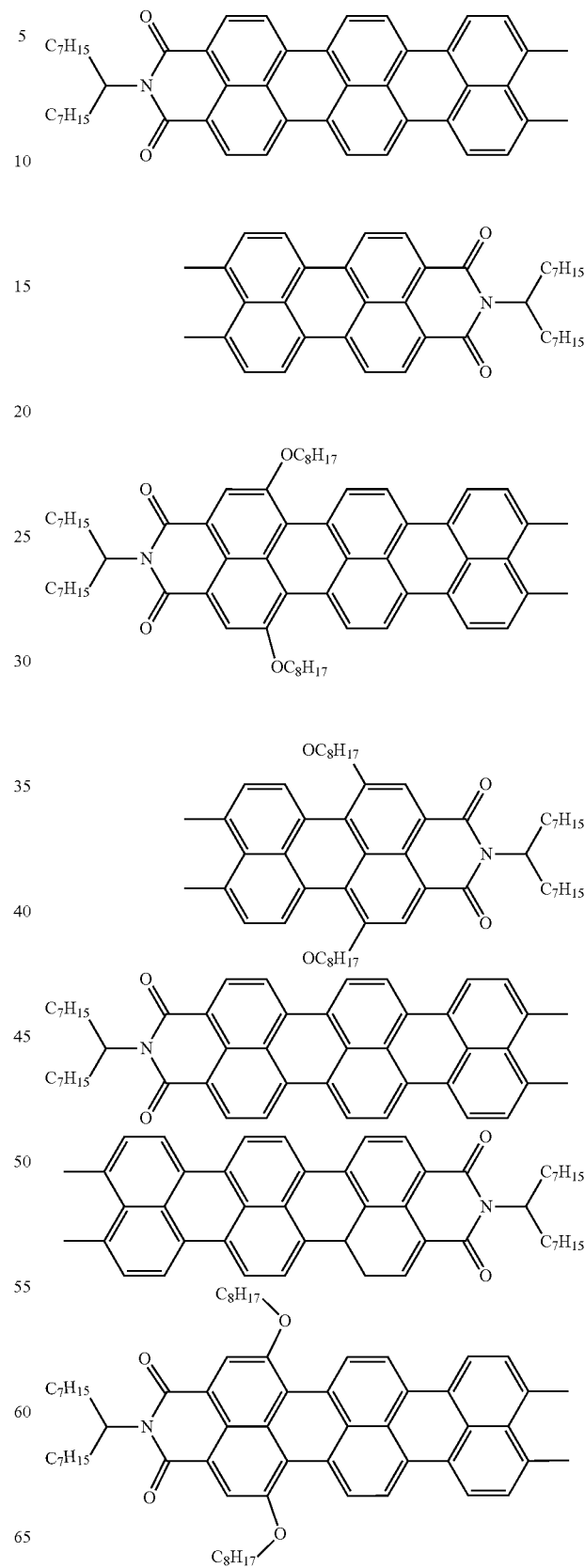

111
-continued

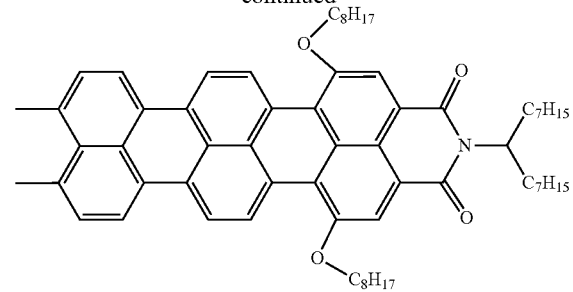

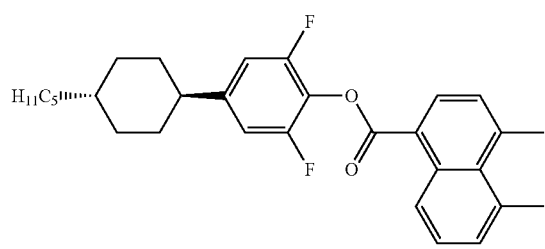

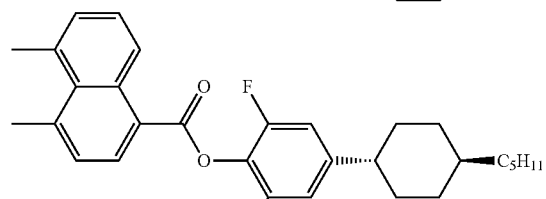

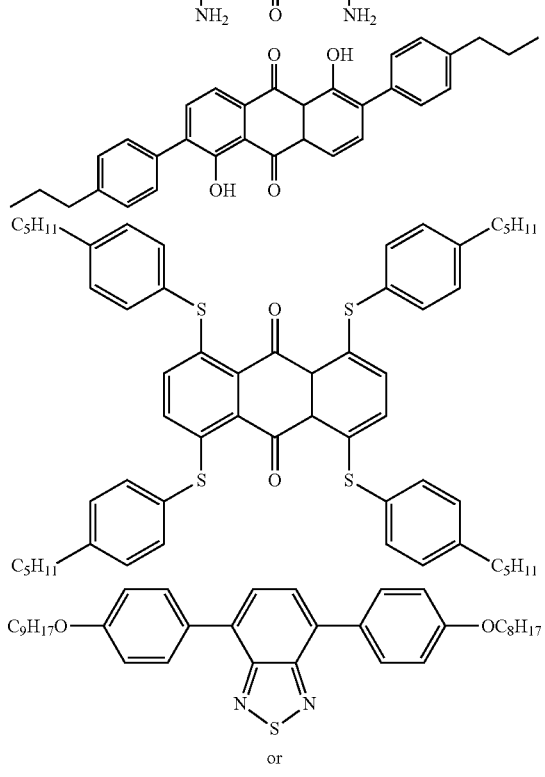

or

112
-continued

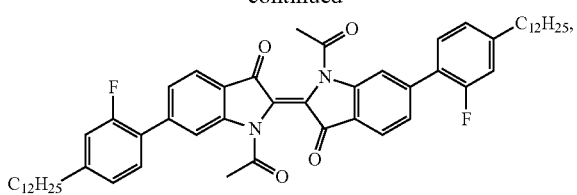

wherein said liquid-crystalline medium has a negative dielectric anisotropy and wherein the proportion of the one or more compounds of formula I-1 or I-2 in the mixture as a whole is up to 20% by weight.

2. The liquid-crystalline medium according to claim 1, wherein the one or more compounds is a compound of formula I-1.

3. The liquid-crystalline medium according to claim 1, wherein the compound of formulae IIA, IIB or IIC is of the following formulae:

IIA-2
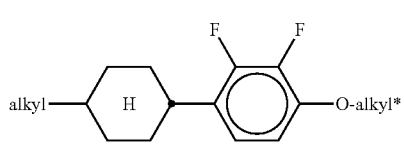

IIA-8
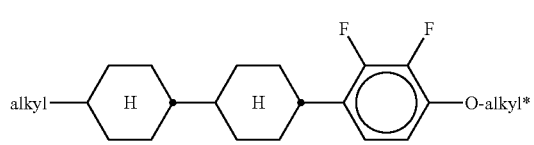

IIA-14
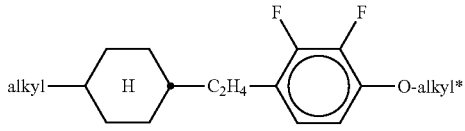

IIA-26
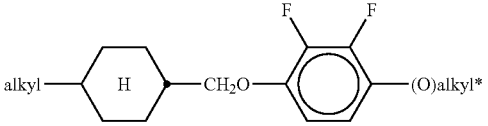

IIA-28
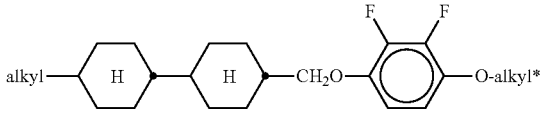

IIA-33
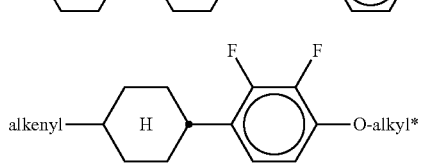

IIA-39
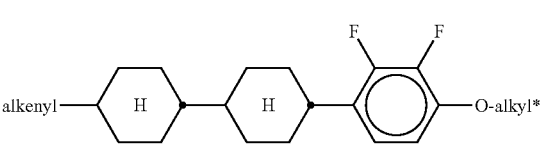

IIA-45
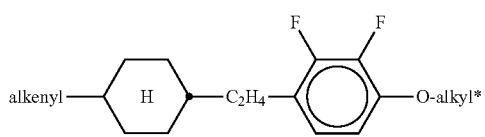

IIA-46
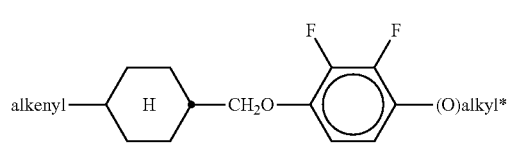

IIA-47
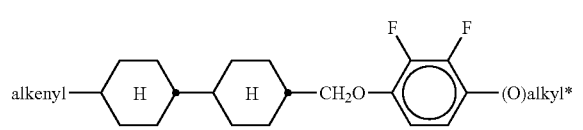

IIB-2
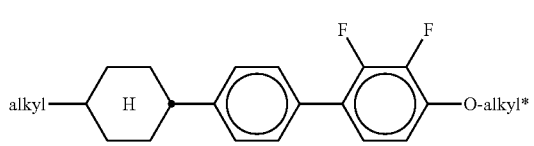

-continued

IIB-11
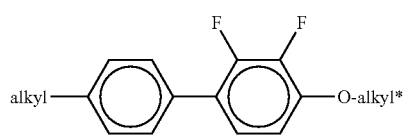

IIB-16
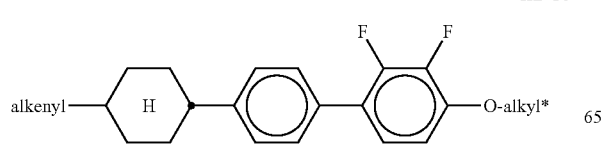

-continued

IIC-1
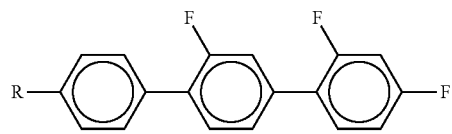

wherein alkyl and alkyl* each, independently of one another, denote a straight-chain alkyl radical having 1-6 C atoms, alkenyl denotes a straight chain alkenyl radical having 2 to 6 C atoms, and (O) denotes —O— or a single bond.

4. The liquid-crystalline medium according to claim 1, wherein the one or more dichroic dyes is a compound of formulae

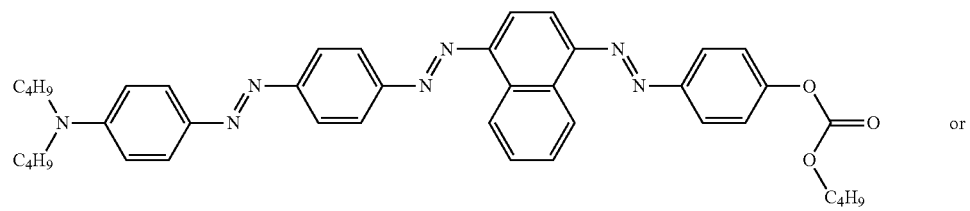 or

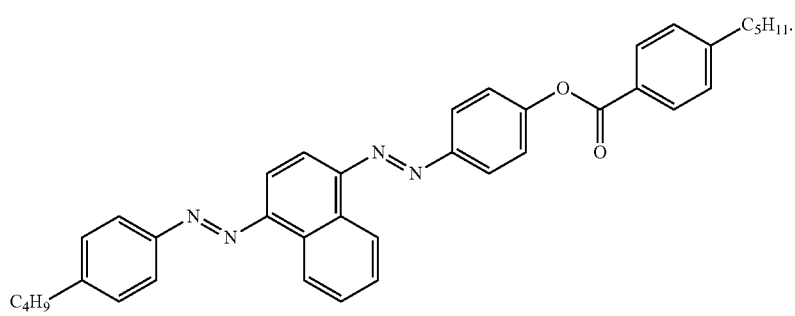

5. The liquid-crystalline medium according to claim 1, wherein the concentration of the dichroic dye or dyes is 1% by weight or more.

6. The liquid-crystalline medium according to claim 1, wherein the medium additionally comprises one or more terphenyls of formulae T-1 to T-21,

T-1

T-2
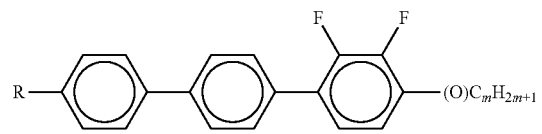
T-3
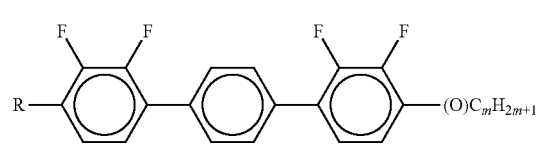
T-4
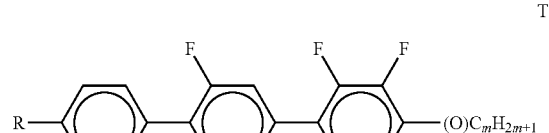
T-5
T-6
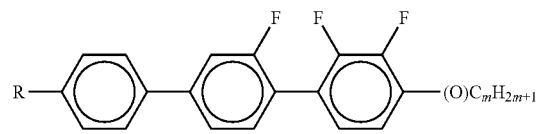
T-7
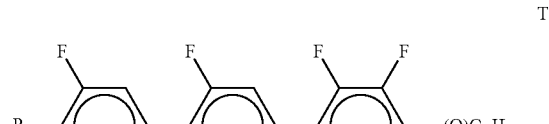
T-8
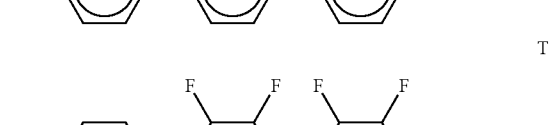
T-9
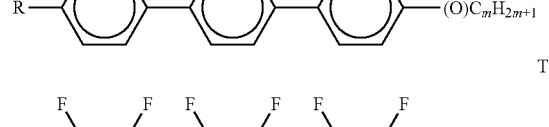
T-10
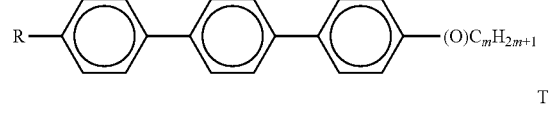
T-11
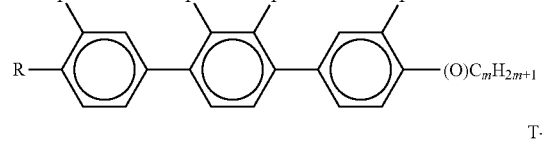
T-12
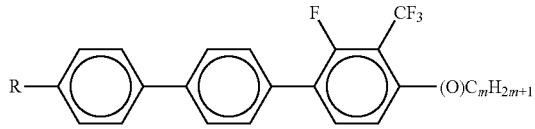
T-13
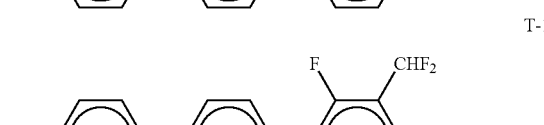
T-14
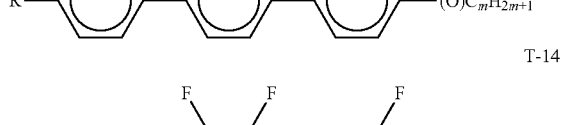
T-15
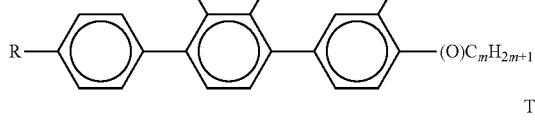
T-16
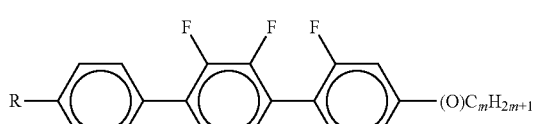
T-17
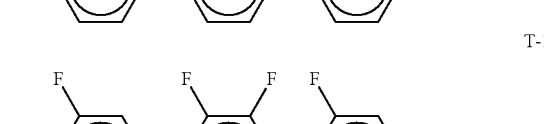
T-18
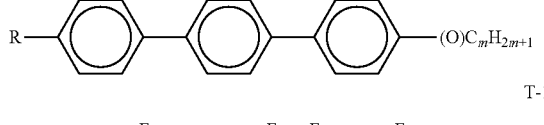
T-19
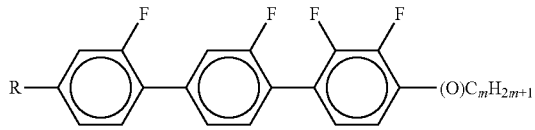
T-20
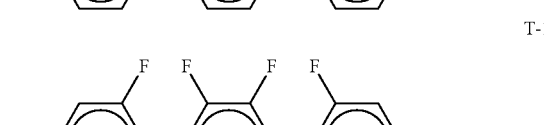
T-21
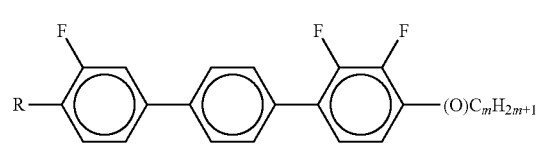

in which

R denotes a straight-chain alkyl or alkoxy radical having 1-7 C atoms or straight-chain alkenyl radical having 2-7 C atoms, and m denotes 1-6.

7. The liquid-crystalline medium according to claim 1, wherein the medium additionally comprises one or more compounds of formulae O-1 to O-16, O-1
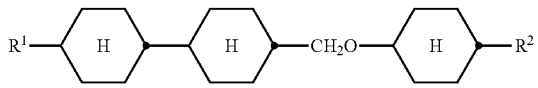

O-2
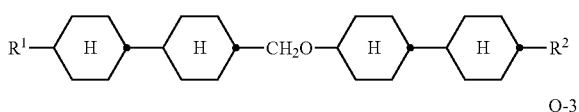

O-3
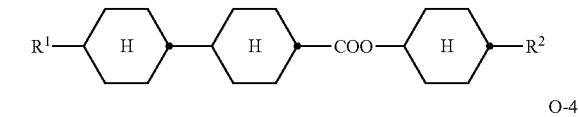

O-4
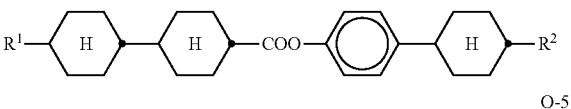

O-5
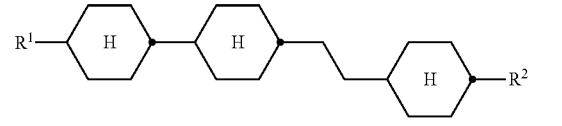

O-6
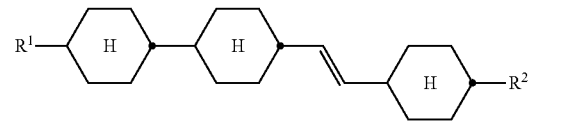

O-7
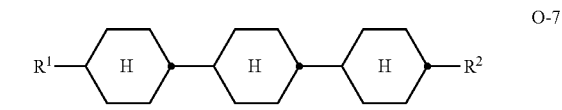

O-8
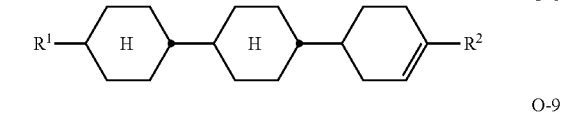

O-9
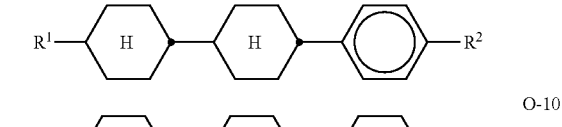

O-10
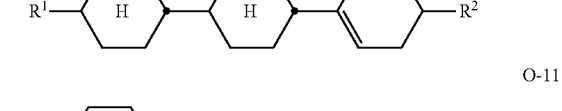

O-11

O-12
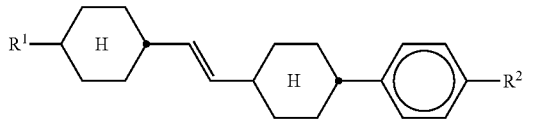

O-13
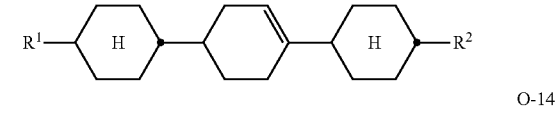

O-14
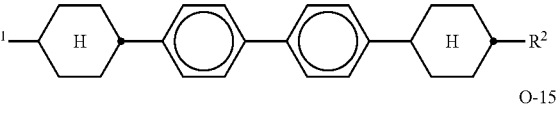

O-15
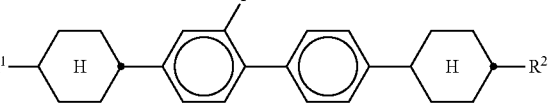

O-16
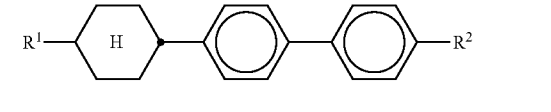

in which $R^1$ and $R^2$ each, independently of one another, denote H, an alkyl radical having 1 to 15 C atoms or alkenyl radical having 2 to 15 C atoms which is un-substituted, monosubstituted by CN or $CF_3$ or at least monosubstituted by halogen, where one or more $CH_2$ groups in these radicals may be replaced by —O—, —S—, —$CF_2$O—, —$OCF_2$—, —OC—O— or —O—CO— in such a way that O atoms are not linked directly to one another, or a cycloalkyl ring having 3 to 6 C atoms.

8. The liquid-crystalline medium according to claim 1, wherein the proportion of the one or more compounds of formula I-1 or I-2 in the mixture as a whole is 5-10% by weight.

9. A process for the preparation of a liquid-crystalline medium according to claim 1, wherein the one or more compounds of the formula I-1 or I-2 is mixed with one or more compounds of formulae IIA, IIB or IIC, and one or more of the dichroic dyes, and optionally one or more additives and optionally at least one polymerisable compound.

10. A method which comprises adding the liquid-crystalline medium according to claim 1 into a light shutter, switchable window, guest-host display or automotive mirror.

11. An electro-optical device, comprising as dielectric, a liquid-crystalline medium according to claim 1.

12. The electro-optical device according to claim 11, wherein the device is a light shutter, a switchable window, a guest-host display or a switchable mirror.

13. The liquid-crystalline medium according to claim 1, wherein the proportion of the one or more compounds of formula I-1 or I-2 in the mixture as a whole is up to 15% by weight.

14. The liquid-crystalline medium according to claim 13, wherein the proportion of the one or more compounds of formula I-1 or I-2 in the mixture as a whole is up to 12% by weight or less.

15. The liquid-crystalline medium according to claim 5, wherein the concentration of the dichroic dye or dyes is 1.5% by weight or more.

16. The liquid-crystalline medium according to claim 15, wherein the concentration of the dichroic dye or dyes is 2% by weight or more.

17. The liquid-crystalline medium according to claim 1, wherein the one or more compounds is a compound of formula I-1, in which $Z^1$ denotes a single bond.

18. The liquid-crystalline medium according to claim 1, wherein the one or more compounds is a compound of formula I-2.

\* \* \* \* \*